United States Patent [19]

Shalon et al.

[11] Patent Number: 5,331,394
[45] Date of Patent: Jul. 19, 1994

[54] AUTOMATED LENSOMETER

[75] Inventors: Tadmor Shalon, Brentwood; Marvin L. Pund, Chesterfield, both of Mo.

[73] Assignee: Metaphase Corporation, St. Louis, Mo.

[21] Appl. No.: 867,313

[22] Filed: Apr. 10, 1992

[51] Int. Cl.$^5$ ............................................ G01B 9/00
[52] U.S. Cl. ................................. 356/124; 356/127
[58] Field of Search ............... 356/124, 125, 126, 127

[56] References Cited

U.S. PATENT DOCUMENTS

| | | | |
|---|---|---|---|
| 3,487,069 | 12/1969 | Maselli | 250/218 |
| 3,572,909 | 3/1971 | Vanpatten et al. | 351/6 |
| 3,634,003 | 1/1972 | Guyton | 351/17 |
| 3,664,631 | 5/1972 | Guyton | 351/27 |
| 3,669,530 | 6/1972 | Guyton | 351/17 |
| 3,879,113 | 4/1975 | Howland et al. | 351/7 |
| 3,880,525 | 4/1975 | Johnson | 356/127 |
| 3,883,233 | 5/1975 | Guilino | 351/6 |
| 3,981,589 | 9/1976 | Spitzberg | 356/127 |
| 4,021,102 | 5/1977 | Iizuka | 351/13 |
| 4,115,924 | 9/1978 | Kleinkopf | 33/174 |
| 4,162,828 | 7/1979 | Trachtman | 351/9 |
| 4,180,323 | 12/1979 | Persson et al. | 356/3 |
| 4,180,325 | 12/1979 | Humphrey | 356/127 |
| 4,182,572 | 1/1980 | Humphrey | 356/127 |
| 4,275,964 | 6/1981 | Vassiliadis | 356/125 |
| 4,281,926 | 8/1981 | Cornsweet | 356/124 |
| 4,293,198 | 10/1981 | Kohayakawa et al. | 351/13 |
| 4,293,199 | 10/1981 | Wada et al. | 351/13 |
| 4,304,468 | 12/1981 | Wada | 351/13 |
| 4,353,625 | 10/1982 | Nohda et al. | 351/13 |
| 4,367,019 | 1/1983 | Kitao et al. | 351/211 |
| 4,370,058 | 1/1983 | Trotscher et al. | 356/125 |
| 4,372,655 | 2/1983 | Matsumura et al. | 351/206 |
| 4,373,787 | 2/1983 | Crane et al. | 351/210 |
| 4,390,255 | 6/1983 | Nohda et al. | 351/212 |
| 4,410,243 | 10/1983 | Fürste | 351/211 |
| 4,421,391 | 12/1983 | Matsumura et al. | 351/211 |
| 4,444,476 | 4/1984 | Simon et al. | 351/211 |
| 4,453,808 | 6/1984 | Takahashi et al. | 351/208 |
| 4,533,221 | 8/1985 | Trachtman | 351/203 |
| 4,534,645 | 8/1985 | Nohda | 356/125 |
| 4,601,575 | 7/1986 | Tamaki | 356/124 |
| 4,609,287 | 9/1986 | Kohayakawa | 356/124 |
| 4,637,700 | 1/1987 | Krueger | 351/211 |
| 4,641,962 | 2/1987 | Sueda et al. | 356/124 |
| 4,641,964 | 2/1987 | Mitani et al. | 356/124 |
| 4,660,945 | 4/1987 | Trachtman | 351/203 |
| 4,697,895 | 10/1987 | Sekiguchi et al. | 351/243 |
| 4,730,917 | 3/1988 | Krueger | 351/211 |
| 4,761,070 | 8/1988 | Fukuma | 351/205 |
| 4,772,114 | 9/1988 | Fukui et al. | 351/211 |
| 4,828,381 | 5/1989 | Shindo | 351/211 |
| 4,848,896 | 7/1989 | Matsumoto | 351/211 |
| 5,198,867 | 3/1993 | Campbell | 356/127 |

OTHER PUBLICATIONS

Allergan Humphrey, "Auto Keratometer", 1989 (2 pages).
Marco, "Keratometer I and Keratometer II", 1989 (2 pages).
Topcon, "Computerized Lensmeter CL-2000", 1989, (4 pages).
Allergan Humphrey, "Humphrey Lens Analyzer", 1989, (2 pages).
Topcon, "Digital Projection Lensmeter LM-P5", 1989, (3 pages).
Marco, Lensmeter 101 and Lensmeter 201, (1 page).
Topcon, "Topcon Lensmeter LM-6/LM-6E", 1988, (4 pages).
Topcon, "Lensmeter LM-S1", 1989, (2 pages)
Topcon, "KR-3000 Auto Kerato-Refractometer", 1990, (4 pages).
Marco Technologies, "ARK-2000 Automatic Refractor/Keratometer", (2 pages).
Marco Technologies, "LM-870 Automatic Lensmeter", (2 pages).
Terence C. Honikman, PhD, *Trends In Iols & Refractive Surgery*, date unknown 8 pages.

Primary Examiner—F. L. Evans
Attorney, Agent, or Firm—Zarley, McKee, Thomte, Voorhees & Sease

[57] ABSTRACT

An automated lensometer including a mounting device to support and center a lens to be tested along an axis. First and second arrays of light source patterns are positioned at different optical distances from the mounted lens and are projected along the axis through the lens. The images of the projected patterns are captured and stored in a camera imaging device located along the axis. A comparison of the patterns by a processor allows derivation of refractive power of the lens.

26 Claims, 31 Drawing Sheets

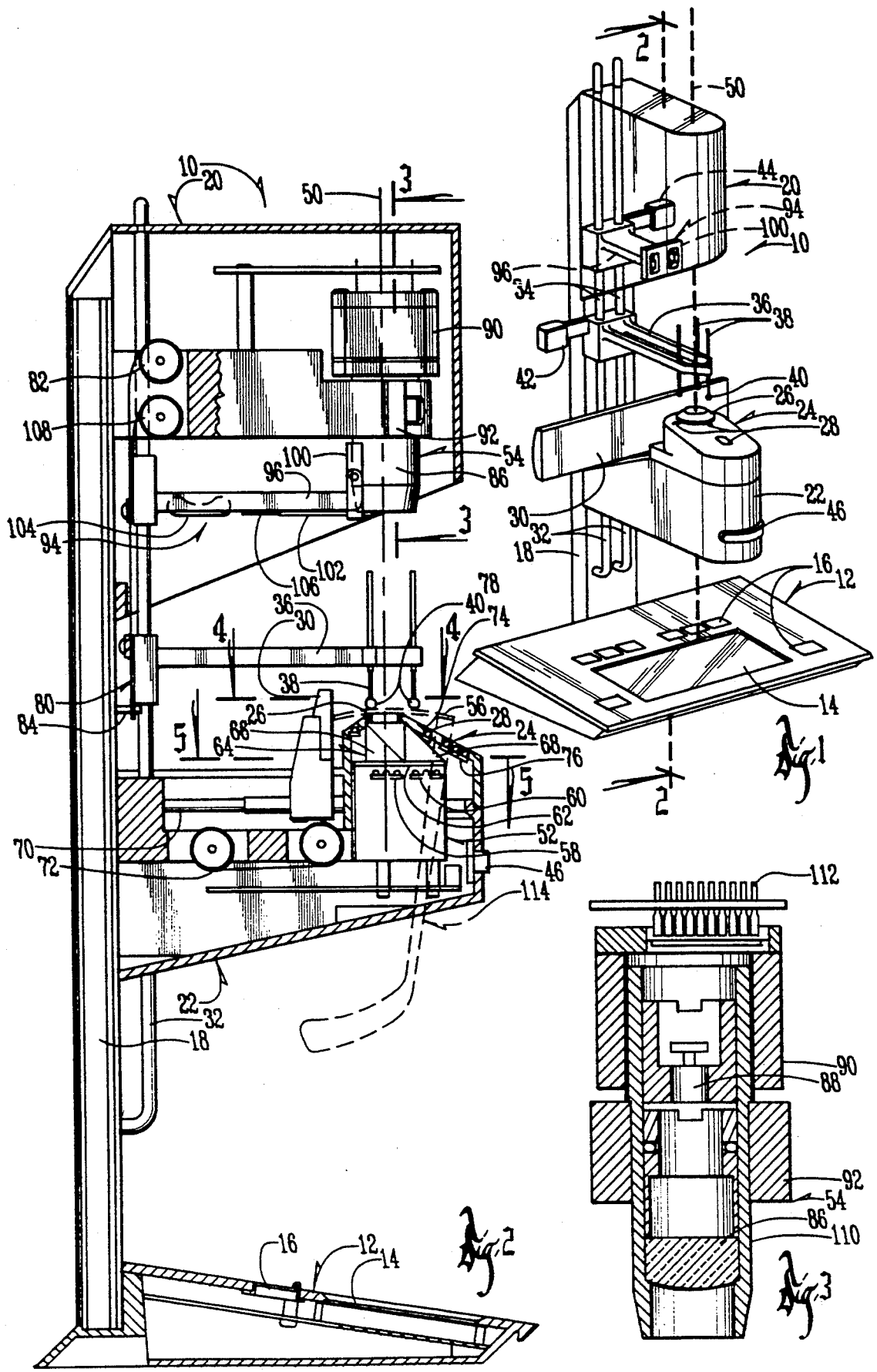

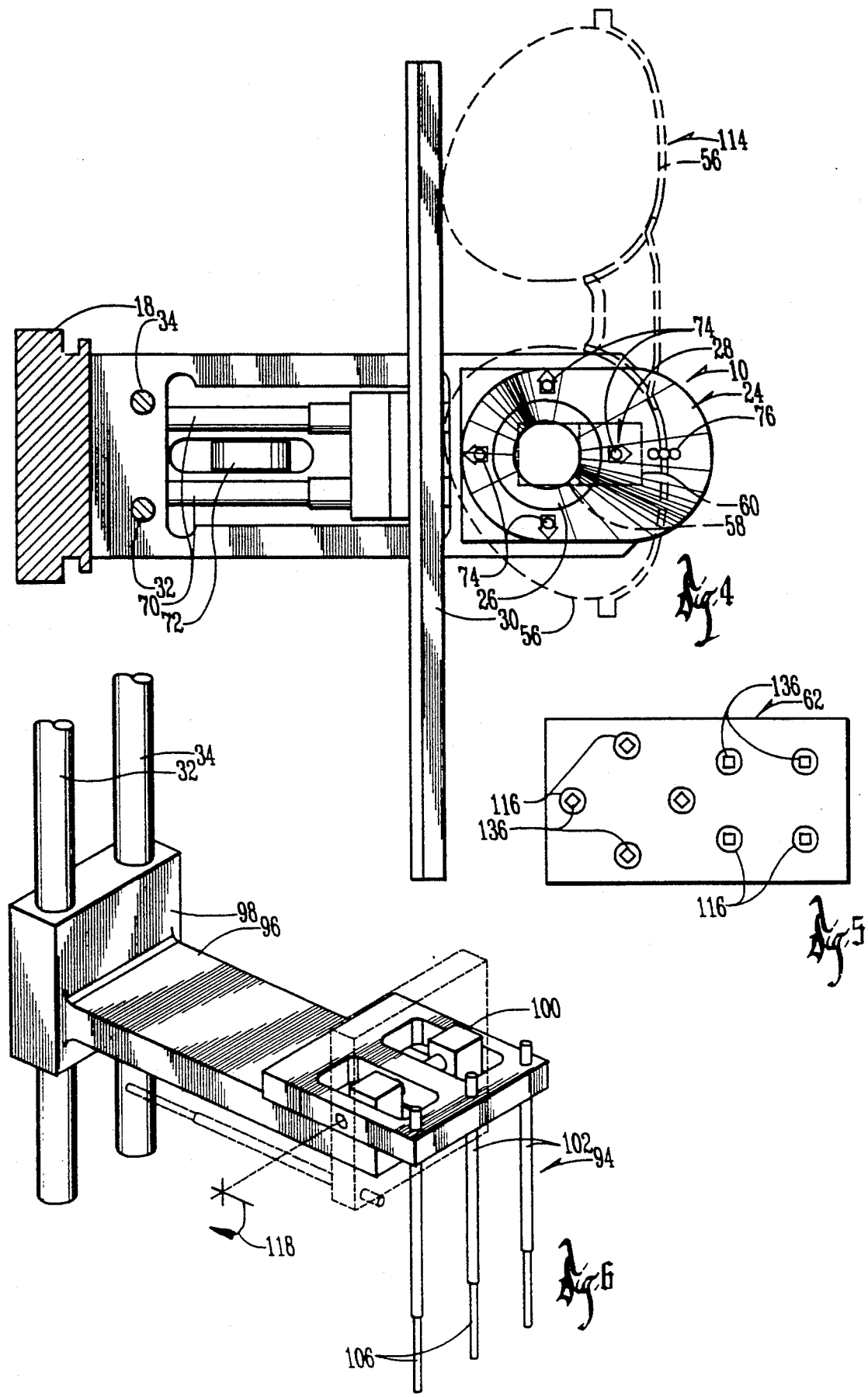

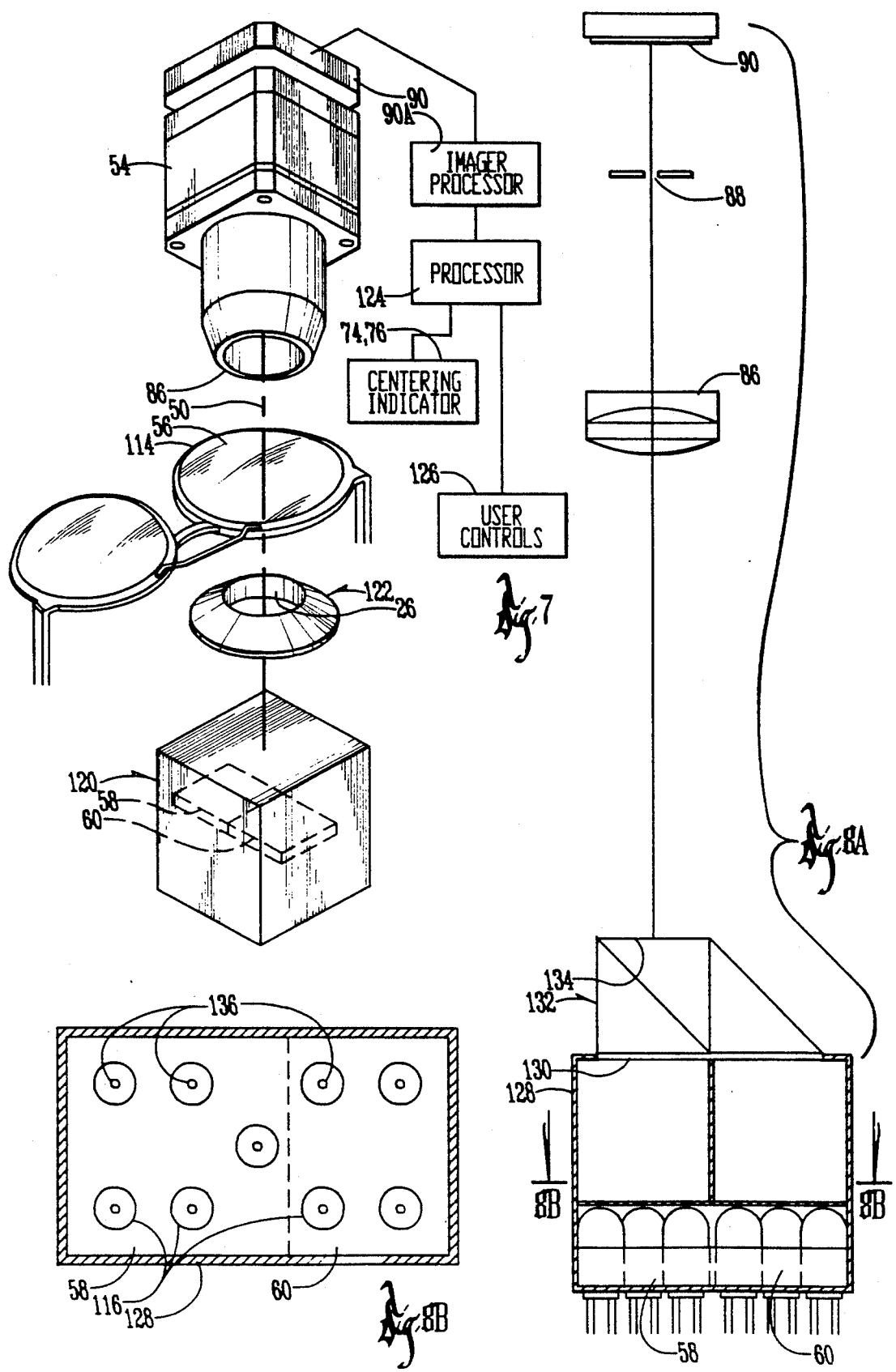

| | ACTION | RESULT |
|---|---|---|
| 159A | TURN LENSOMETER ON | -- POWER ON DEVICE |
| 159B | INSERT RIGHT OR LEFT GLASSES LENS OR CONTACT HOLDER ON MOUNT | -- ALLOWS PLACEMENT OF LENS |
| 159C | MANEUVER LENS UNTIL YELLOW LIGHT ON | -- ALLOWS AUTOMATED CENTERING OF LENS BY VISUAL ARROWS (CONFIRMS CENTERING) |
| 159D | ADJUST LENS UNTIL GREEN LIGHT ON | |
| 159E | DROP AND LOCK LENS CLAMP | -- SECURES LENS FOR ACCURACY |
| 159F | MARK LENS WITH MARKER IF DESIRED | -- ALLOWS MARKING |
| 159G | PUSH MEASUREMENT BUTTON | -- AUTOMATICALLY READS, STORES AND DISPLAYS |
| 159H | REPEAT FOR OTHER LENS, IF NEEDED | -- EASY AND QUICK REPEAT |
| 159I | PRINT RESULTS, IF DESIRED | -- HARD COPY FOR FILES |

Fig. 15

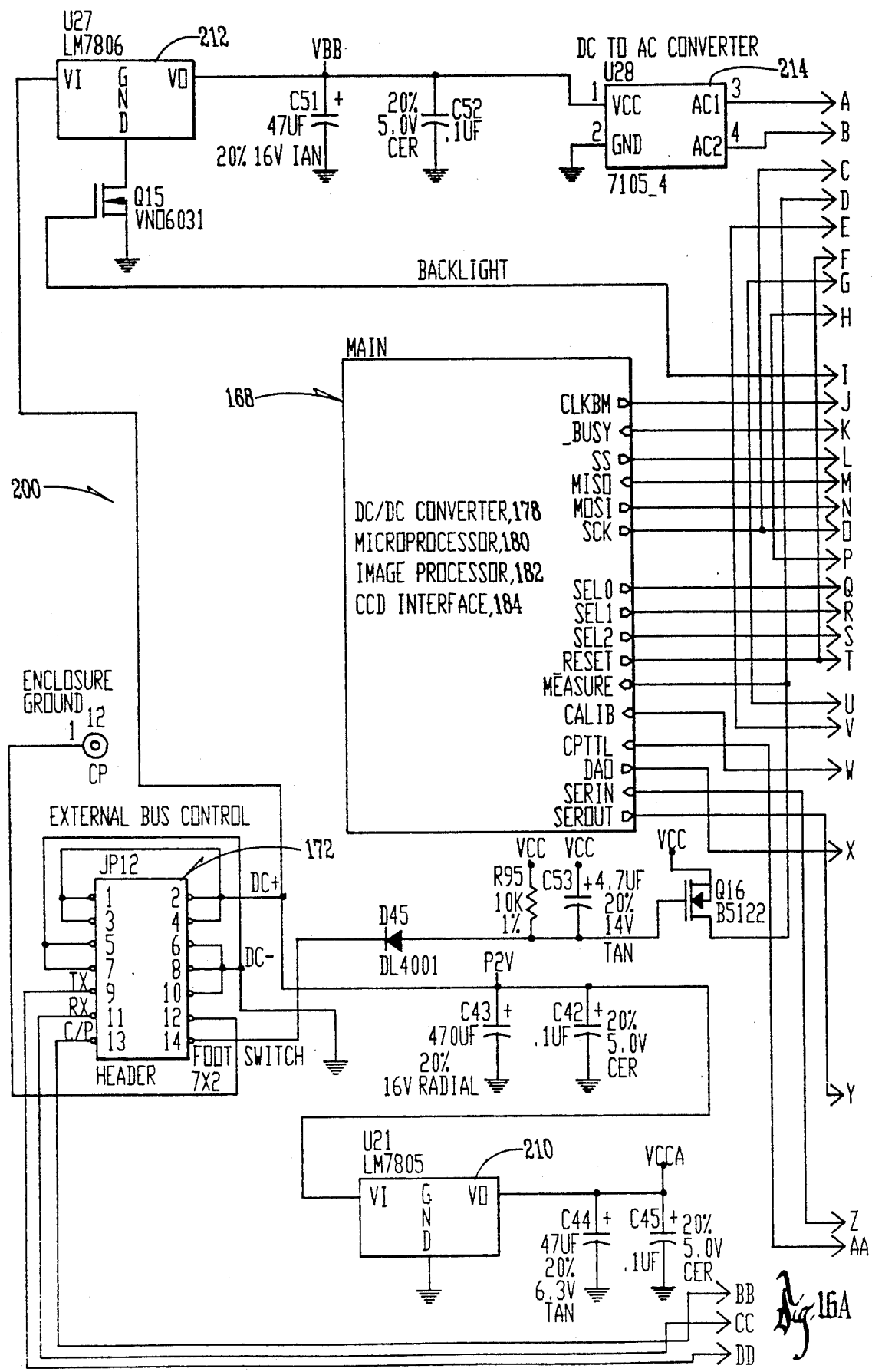

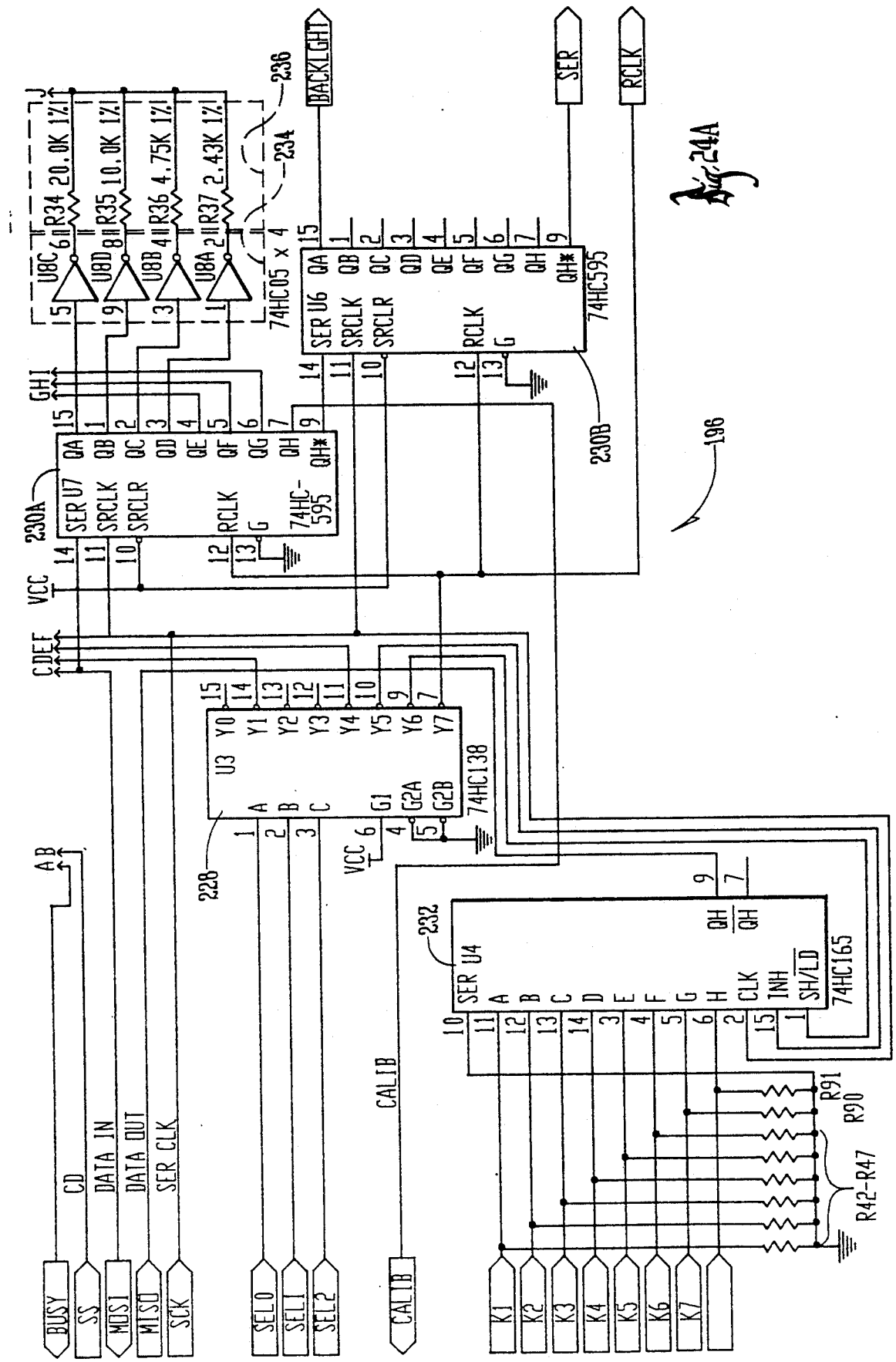

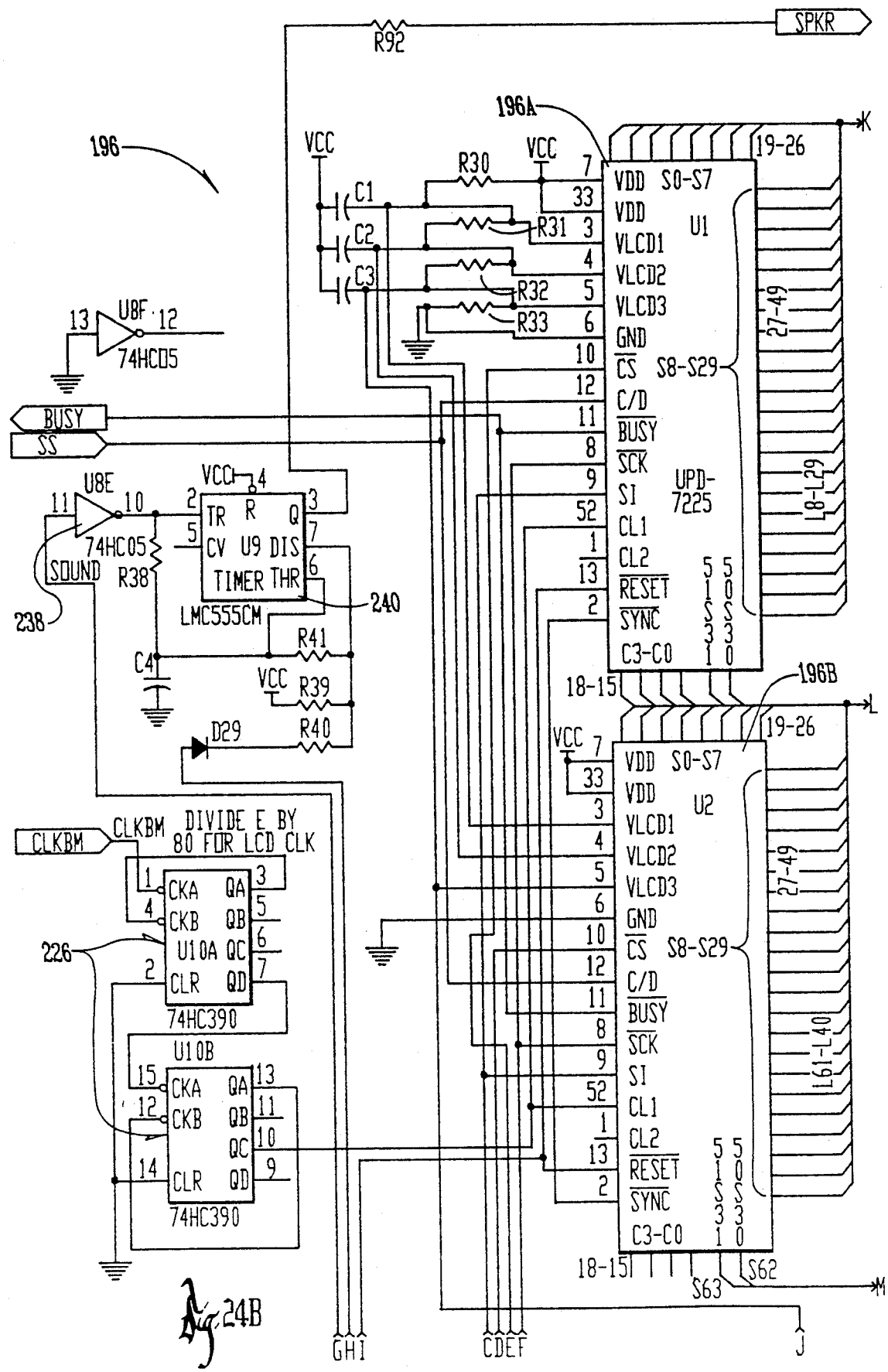

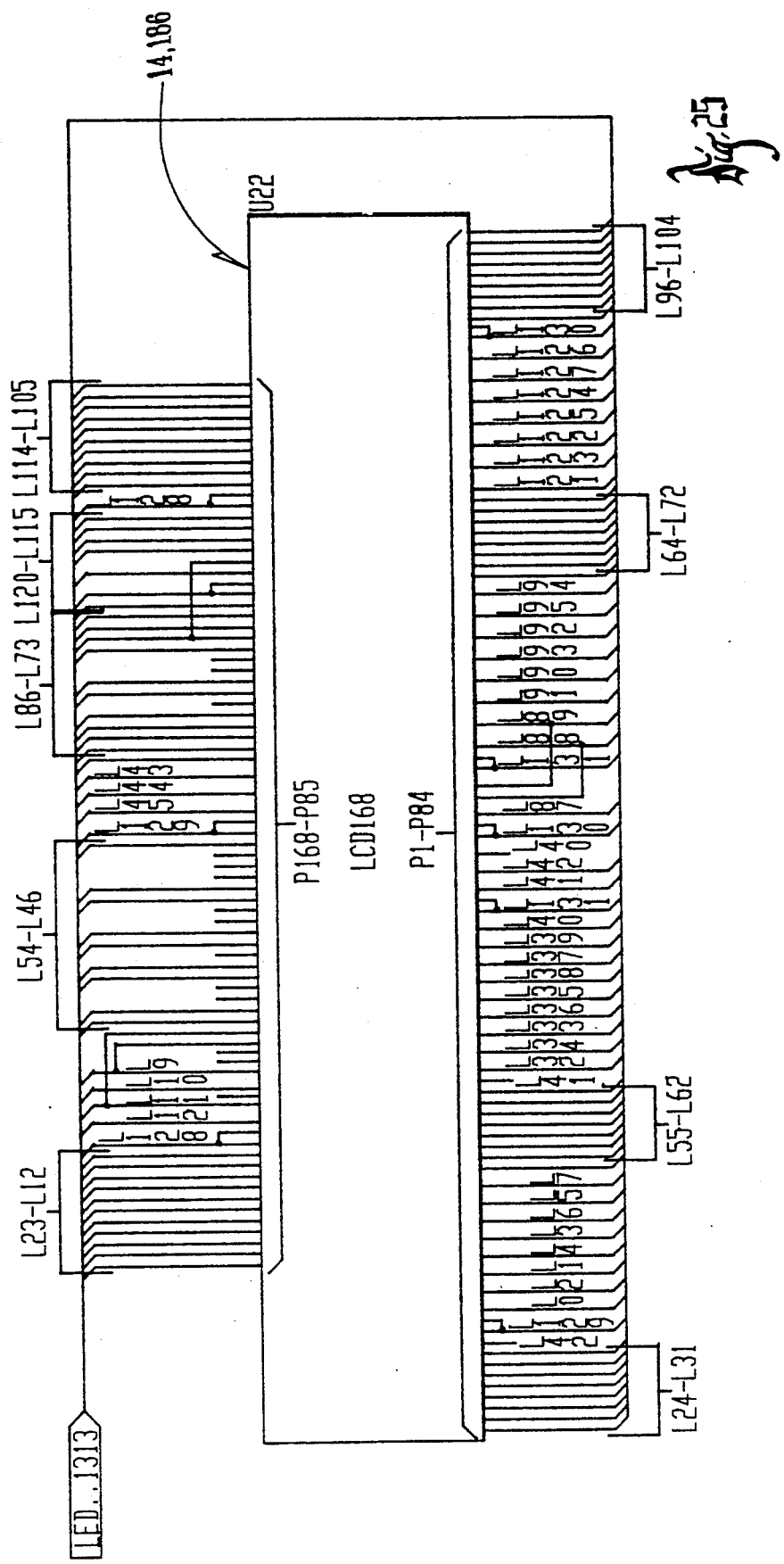

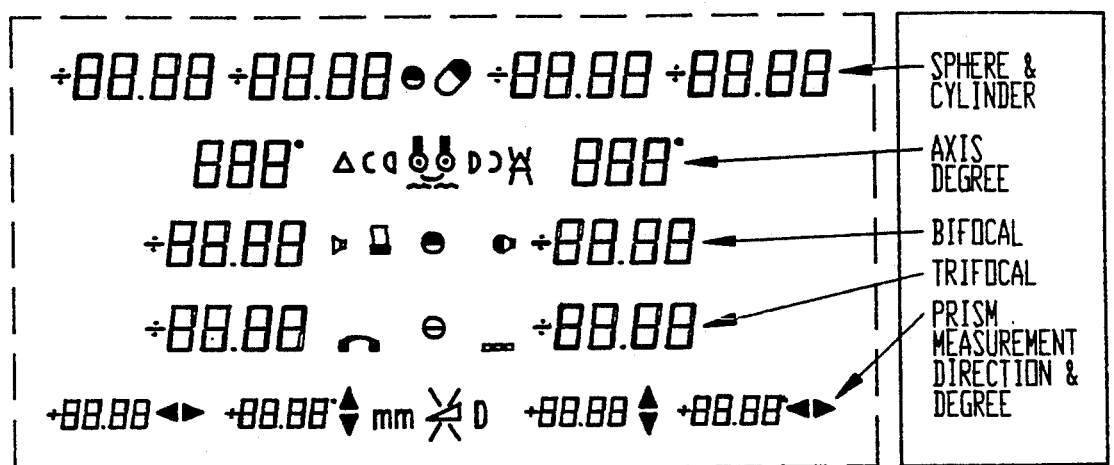
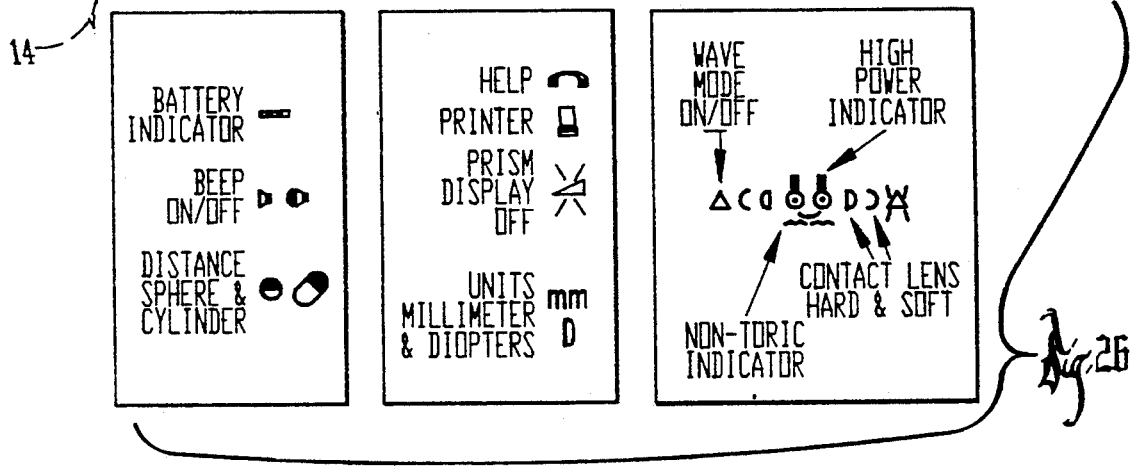
Fig. 26
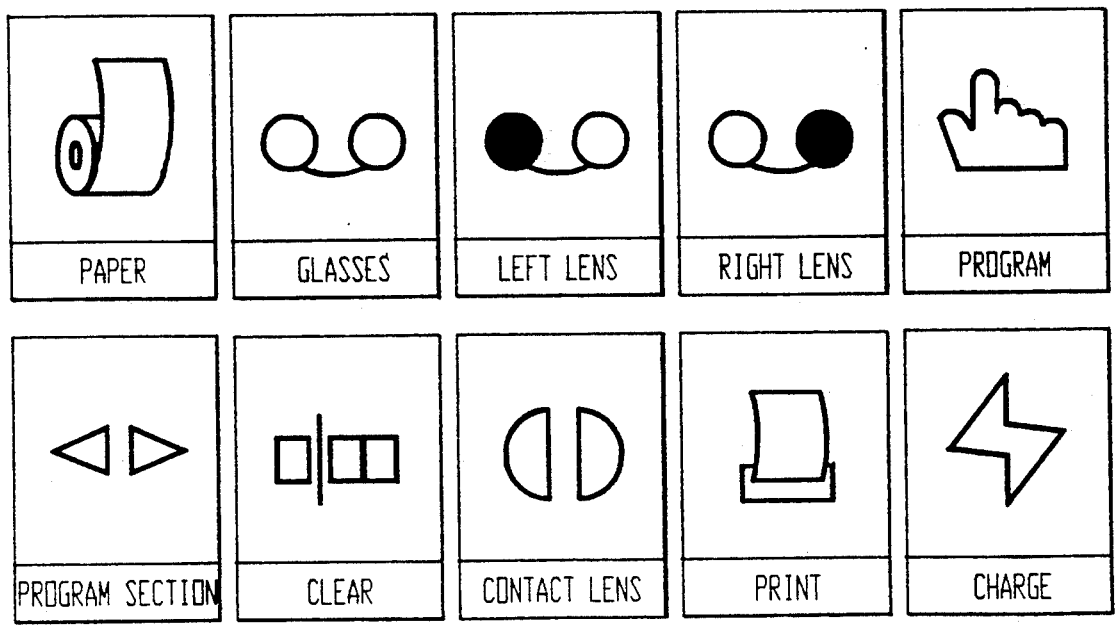
Fig. 27

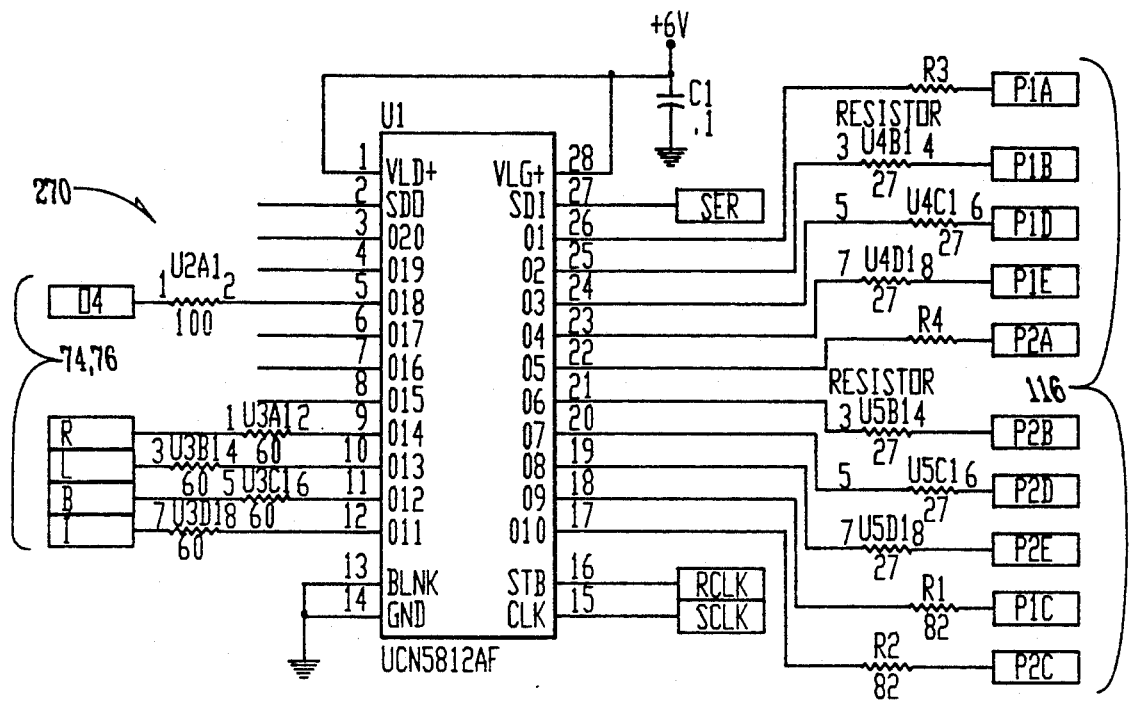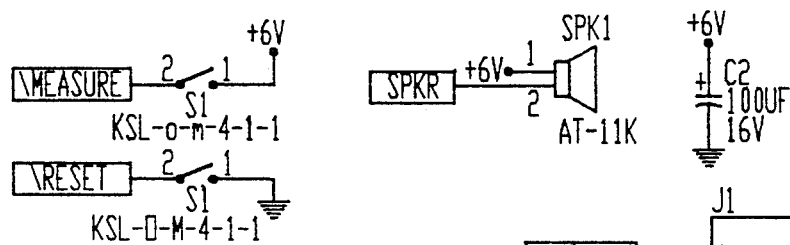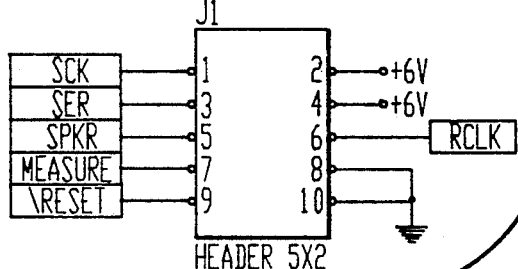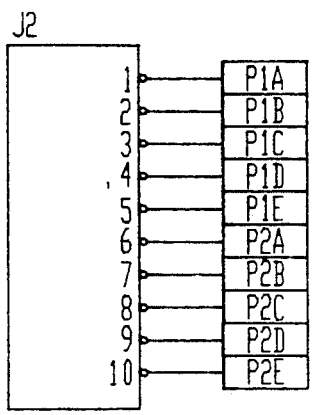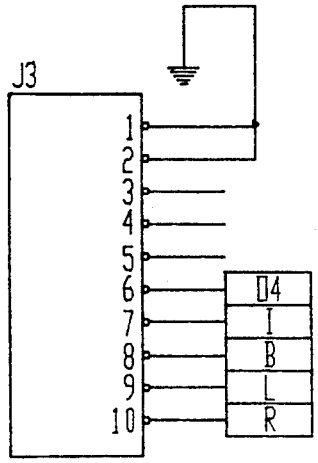
Fig. 28

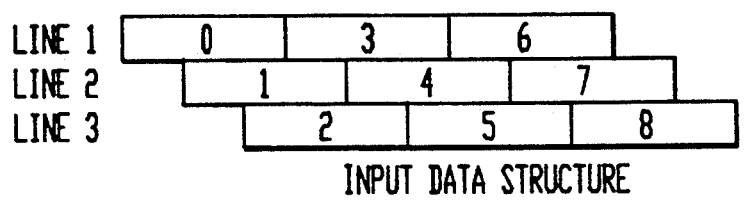
INPUT DATA STRUCTURE
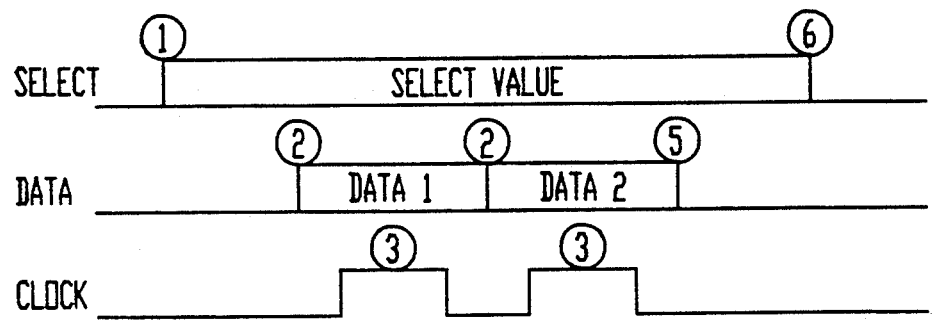

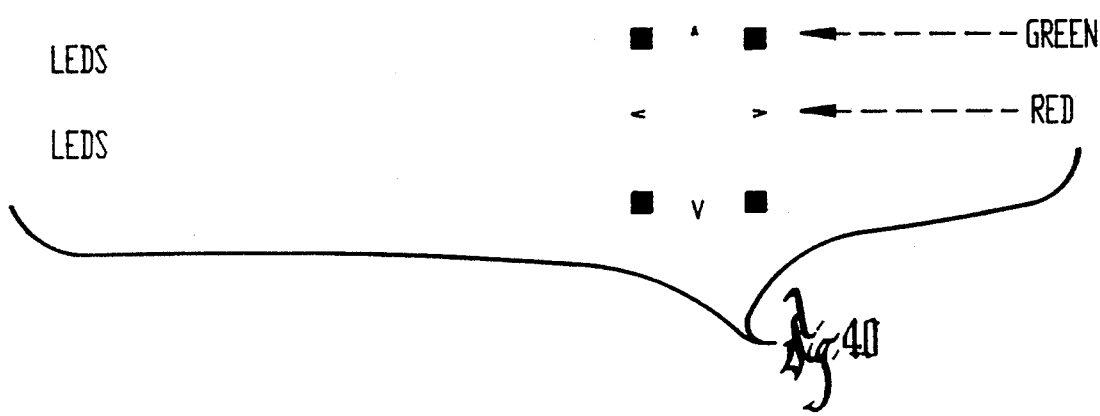

AUTOMATED LENSOMETER

BACKGROUND OF THE INVENTION

A. Field of the Invention

This invention relates to a lensometer, and in particular, to an automated lensometer.

B. Problems in the Art

1. Definition of Lensometer: Lensometers are devices to measure the refractive power of eye glasses or contact lenses. Ophthalmologists, optometrists, and opticians, as well as their staff and technicians, can obtain these readings by removing the eye glasses or contacts from the patient, positioning them in the lensometer, and then operating the lensometer.

2. Manual Lensometers: Manual lensometers utilize various systems to allow a user to manually adjust the device to obtain the refractive power readings. Most manual lensometers operate in a manner similar to a microscope. The lens must first be positioned in the device, and then the user looks through an eye piece. An optical system then requires the manual adjustment of optical elements to adjust a target or perpendicular lines. Precalibration of the device allows correlation of refractive power for that particular lens, the readings are generally indicated on mechanical dials or other indicators.

The size and cost of manual lensometers are factors which favor their continued use. Problems and deficiencies with these devices exist, however.

Accurate calibration is essential to their accurate operation. The risk of miscalibration of these mechanical elements exist. Secondly, manual operation requires substantial training. On the one hand, this contributes to the overall expenditure of resources for the device. Manual operation also relies on the skills and desire for accuracy by the operator. If the ophthalmologist, optometrist, or optician is to learn and operate the device, it takes away valuable time from other activities.

In addition to operational errors, the presence of human error in taking or transcribing the readings to a written record also exists.

3. Automated Lensometers: Several attempts have been made to create lensometers which operate semi-automatically or automatically. Devices of this type generally utilize substantial electronic components to either assist in taking the readings, or at least electronically record the readings.

These devices generally continue to rely to some extent on mechanical optical systems for obtaining the readings. These devices are relatively large requiring a substantially sized table or supporting structure. Many also require some significant calibration and/or manual adjustment to obtain a reading.

These types of units again require substantial training for anyone using them. The calibration and operation steps may not represent a substantial improvement over the amount of time demanded to use manual lensometers.

Still further, human error again comes into play. If the operator needs to visually align targets or otherwise verify some condition before the reading is taken, the accuracy depends a good deal on the operator.

4. Practical Considerations: Although ophthalmologists, optometrists, and opticians provide medical or vision-related services, they also in most cases are involved in businesses. Business efficiency therefore plays a significant role in these practices. Efficiency and economy are constant goals.

Time savings is an obvious goal. The more quickly procedures can be accomplished and patients or customers processed, the number of patients which can be seen increases, and the more revenues can be generated. Related to this is the concept that the easier the equipment and procedures are to learn, the more quickly staff members or anyone can reliably perform the procedures.

Cost savings is another primary factor. Some of the automated lensometers available are extremely costly as compared to manual lensometers. This deters some from using automated lensometers. The trade-off is the requirement of more time and a greater margin of error in readings.

Space considerations are a subtle but important factor in this field. The more area and floor space required to position or support a lensometer, translates into the need for more room for other equipment, examination rooms, etc. This in turn translates into more rent or building expenses, and less examination rooms. The fewer examination rooms means that patient flow and through-put is more restricted and less flexible.

Staff considerations are also a factor. The more procedures that can be delegated to staff or technician personnel, the more time the ophthalmologist, optometrist, or optician has to deal with higher revenue-producing tasks. The ability to delegate procedures is related to the complexity of the procedure. It is also related to the ability to train staff, which in this field tends to have a high turnover rate.

A related factor is the accuracy and reliability of results from tasks such as utilizing lensometers. Again, a complex machine, one that requires substantial training or one that requires manual operation or translation of results, raises the margin of error for those results.

Training on manual lensometers is somewhat difficult because it requires a user to know and understand how the equipment works and how to achieve the most accurate readings. It also requires a high skill level of the user. Training of most present automated lensometers is complex because it also generally requires some high level of technical skill or expertise.

Another factor involved in the practical business is the actual or perceived need to have high technology equipment. The present automated lensometers can generally be considered higher technology than the manual lensometers. The perception of patients or customers is that higher technology means better service. This perception must be balanced against all the above discussed factors such as time, cost, size, training, in deciding whether automated lensometers are more cost effective than cheaper manual devices.

An additional subtle but important factor at play in this field is the struggle of small offices or establishments to effectively compete with larger offices or establishments. Larger offices generally utilize more staff, more space, and have economies of scale. For a smaller office to compete, it is especially urgent that efficiency and economy be maximized.

5. Needs in the Art: It can therefore be seen that there is a real and identifiable need in the art for a lensometer which addresses and improves over or solves the problems and deficiencies in the art.

The need exists for an automated lensometer which eliminates to a substantial degree any margin of human error involved in taking such readings. The need exists for an automated lensometer which is as small as possible, yet can take all necessary readings reliably and accurately. It must be easy to operate and to learn how to operate. It must also be economical to manufacture and to purchase.

6. Objects: It is therefore a principal object of the present invention to provide an automated lensometer which improves over or solves the problems and deficiencies in the art.

Another object of the present invention is to provide an automated lensometer which is quick and easy to operate, and produces reliable and accurate readings.

Another object of the present invention is to provide an automated lensometer which is small in size when compared to other automated lensometers, and which is as small or smaller than most manual lensometers.

Another object of the present invention is to provide an automated lensometer which can take readings from both eye glasses and contact lens easily and accurately.

Another object of the present invention is to provide an automated lensometer which is efficient, economical, reliable and durable.

These and other objects, features and advantages of the present invention will become more apparent with reference to the accompanying specification and claims.

SUMMARY OF THE INVENTION

The invention is an automated lensometer for measuring the refractive power of lenses and contacts. It includes a mount for the positioning of the lens of eye glasses or a contact lens during the measurement process. A projection system is positioned a fixed distance away from the mounted lens, and a camera is positioned on the opposite side of the lens from the projector system, all along a common axis.

The projection system includes two identical geometric arrays of light sources each positioned a different optical distance from the lens being tested. Each array is illuminated separately and images of each array, as modified by the lens being tested, are captured by the camera and processed in an imaging means and a processing means. The arrangement is telecentric in the sense that, for the cone of light rays from each light source that is collected by the camera optics, the central ray of the cone is parallel to the camera lens optical axis after exiting from the lens being tested. The camera, imaging means and processing means captures and stores the images of the two arrays. Because the optical distance to both arrays is known, the refractive power of the lens being measured can then be derived using known in the art principles.

The invention also can include a means for releasably securing the lens in position. It also can utilize the projector means and camera/imaging means to automatically instruct the user to correctly position the lens to the holding means. It is important that the lens be correctly centered prior to measurement.

The invention also includes, in association with the processing means, a display means and/or a printer means for providing a record of the measurements. It can also include a variety of controls such as buttons or levers for various operational features.

The projector and camera/imaging system allows the invention to be relatively small, and to take up only a small space on a table top. There are few mechanical or moving parts and little human manipulation is required, which reduces the error possibilities for the system.

BRIEF DESCRIPTION OF THE DRAWINGS

FIG. 1 is a perspective view of a preferred embodiment of the invention.

FIG. 2 is an enlarged side elevational view taken along line 2—2 of FIG. 1.

FIG. 3 is a further enlarged sectional view taken along line 3—3 of FIG. 2.

FIG. 4 is an enlarged sectional view taken along line 4—4 of FIG. 2.

FIG. 5 is an enlarged sectional view taken along line 5—5 of FIG. 2 (but showing only one LED array).

FIG. 6 is an enlarged partial perspective view of a lens marking system for the preferred embodiment of FIG. 1.

FIG. 7 is a simplified diagrammatical view of the optic system of the preferred embodiment of the invention.

FIG. 8A is a diagrammatical view of the optic system of the present invention.

FIG. 8B is an enlarged isolated plan view of one light array that can be used with the invention.

FIG. 15 is a flow chart of the operational steps of the preferred embodiment of the present invention.

FIGS. 16A-B are a top-level electrical schematic of the general circuit board for the preferred embodiment of the present invention.

FIG. 24A-C are a more detailed electrical schematic of the LCD drivers and display of the I/O section of FIG. 16B.

FIG. 25 is a more detailed schematic of the LCD display of the I/O section of FIG. 16B.

FIG. 26 is a diagrammatical view of the display for the preferred embodiment of the invention that includes a legend indicating the meaning of the icons on the display.

FIG. 27 is a diagrammatical view of icons and their meaning for the preferred embodiment of the present invention.

FIG. 28 is an electrical schematic of the lensometer nose board.

FIG. 31 illustrates the image processor's input data structure.

FIG. 32 illustrates the serial load process steps for the image processor.

FIG. 40 illustrates the eight alignment LEDs.

DETAILED DESCRIPTION OF THE PREFERRED EMBODIMENT

Figure 9:
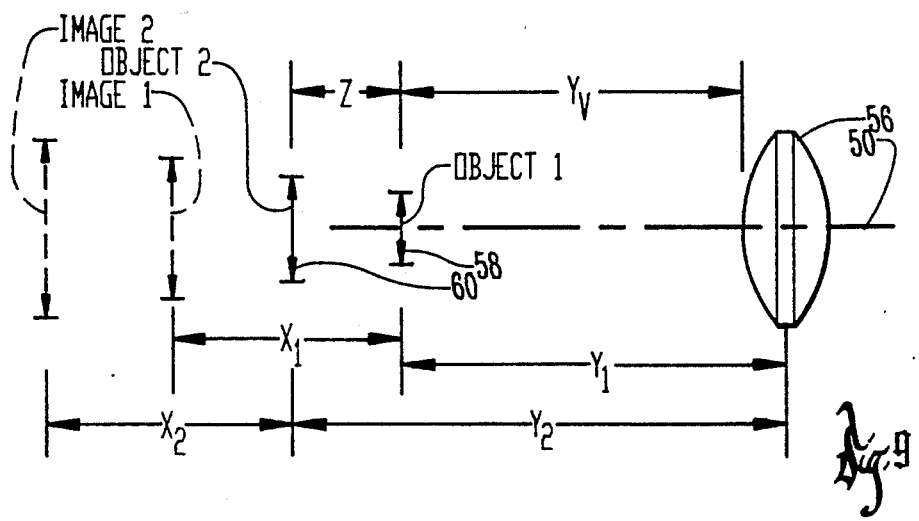
FIG. 9 is a diagrammatical view of a portion of the optic system of the present invention.

To assist in a better understanding of the invention, a preferred embodiment of the invention will now be described in detail. It is to be understood that this is but one form the invention can take, and is not inclusive of possible embodiments.

The preferred embodiment is set forth in drawings comprising FIGS. 1–40. Reference numerals are utilized to indicate specific parts and locations in the drawings. The same reference numerals will be used for the same parts and locations in all of the drawings, unless otherwise noted.

This description will begin first with a simplified discussion of the general structure of the preferred embodiment. Thereafter, a more detailed explanation of specific structured components and the structural relationship allowing these components to function as an automated lensometer, will be set forth.

A discussion of the combination of structural, optical, and electronic components will then be addressed with a description of the operation of the preferred embodiment. The detailed electronic circuitry that allows the lensometer to operate will be referenced.

A. General Structure

FIG. 1

By referring to FIG. 1, a preferred embodiment of automated lensometer 10 in accordance with the invention is depicted in perspective. A base 12 includes a display 14 and several control buttons 16. An arm or spine 18 extends upwardly from the back side of base 12. Arm 18 is secured in that relationship to base 12.

A housing 20 is mounted generally along the side of, but at the top of arm 18. Housing 20 includes a camera and imaging system which will be described in detail later. A second housing 22 is mounted to the side of arm 18 in between housing 20 and base 12. Housing 22 contains a projector system, which will be described in more detail later. A lens mount unit 24 is positioned at the top and outer end of housing 22. A circular ring 26 on unit 24 indicates the position an eyeglasses lens, or contact lens (in a holder) should be placed on lensometer 10. Unit 24 also includes indicators 28 which visually indicate whether the eyeglass or contact lens is correctly centered on ring 26.

An eyeglass stop or rest bar 30 is mounted to housing 22. Stop 30 is adjustable towards and away from ring 26 to provide a stabilizing support for eyeglasses when positioned on lensometer 10.

FIG. 1 also shows parallel rails 32 and 34 which extend at a spaced apart positions along arm 18 between housings 22 and 20.

Rails 32 and 34 support a slidable arm 36 (which is perpendicular to arm 18). Three spring loaded rods 38 are positioned at the end of arm 36 and have rubber tips 40. Rods 38 are positioned above and around basically the perimeter of ring 26. A lever 42 extends laterally from arm 36 to allow mount control of vertical movement of arm 36. Tips 40 can be brought vertically downward to hold an eyeglass lens in position on ring 26. To remove the lens, lever 42 is moved upwardly. Rods 38 are spring-loaded so that they will not damage the lens, but will hold it in a secure position during measurement.

FIG. 1 shows an additional lever 44 extending transversely from lensometer 10. As will be described in more detail later, lever 44 operates a marking device which can descend from housing 20 and impose an erasable mark on a lens being measured to indicate its optical center.

Housing 22 also includes a start button 46 which is pushed to start the measurement sequence for a lens. It can also be seen that display 14 in base 12 is angled downwardly to allow better viewing by the user. In the preferred embodiment, base 12 is approximately 7 inches wide and 6 inches deep. It is a little more than a ½ inch thick at its front edge and angles up to approximately 1½ inches thick at its highest point. Lensometer 10 is approximately 13 inches tall with housings 20 and 22 extending 5 or so inches laterally outward from arm 18. It can therefore be seen that lensometer 10 is a compact device and takes up only a small "footprint" on any supporting table or cabinet. Additionally, because it has a minimum of moving parts and utilizes substantial electronics and processing circuitry, it is lightweight and therefore easily moveable and does not require a bulky supporting surface.

FIG. 2

FIG. 2 illustrates in enlarged detail lensometer 10, including components in the interior of housings 20 and 22. As can be seen in both FIGS. 1 and 2, an axis 50 extends generally vertically through housings 20 and 22. A projector system 52 in housing 22, as well as ring 26, are aligned along axis 50. A camera 54, is also aligned along axis 50. The relationship between these elements is therefore said to be telecentric. Any positioning of camera 54, projector system 52, and the lens being measured is always along axis 50.

It is to be noted that the projection system 52 and the lens 56 being measured (shown in dashed lines as a part of eyeglasses 114), are always in a fixed relationship. This distance is therefore always known. However, camera 54 can be adjusted relative to the fixed lens/projector combination without materially effecting the operation of the device.

FIG. 2 shows that housing 22 surrounds projector system 52. Projector system 52 includes two arrays of LEDs (Light Emitting Diodes) 58 and 60 positioned basically side-by side and horizontally, with the LEDs pointing upwardly. A mask 62 exists directly above arrays 58 and 60 and includes pin holes vertically above each LED. This arrangement creates basically a point source of light from each pinhole of mask 62. A prism/beam splitter assembly 64 is positioned above mask 62. Light from the pinholes of mask 62 that are illuminated by LED array 60, strikes mirrored prism surface 68 and is directed toward cube beamsplitter surface 66 where the light is split into two beams of equal intensity. One of the two beams is directed parallel to axis 50, and after passing through lens 56, is collected by camera 54. The second split beam from LED array 60 is not used. Light from the pinholes of mask 62 that are illuminated by LED array 58, strikes cube beamsplitter surface 66 where the light is split into two beams of equal intensity. One of the two beams passes directly through beamsplitter 66 parallel to axis 50, and after passing through lens 56, is collected by camera 54. The second split beam from array 58 is reflected at beamsplitter 66 and is not used. Ring 26 surrounds the top of prism/beam splitter assembly 64. As shown, eyeglasses lens 56 is positioned on top of ring 26 during measurement.

FIG. 2 also shows that stop 30 is slidable along rods 70 inside housing 22. A spring 72 is connected to stop 30 and exerts a somewhat downward force on stop 30. This allows stop 30 to be slid along rods 70 but holds stop 30 in any position along rods 70. It therefore serves as a moveable backstop or rest bar for holding eyeglasses 56 (both lenses) in position on lensometer 10.

FIG. 2 also shows several other LEDs on unit 24. By referring also to FIG. 1, four LEDs 74 are distributed in equally spaced apart locations around ring 26 on lens mount unit 24. These LEDs 74 serve as some of the indicators 28 described previously. A set of three LEDs 76 also exist towards the top and front of lens mount unit 24. As will be described in detail later, when lensometer 10 is operating, LEDs 74 will operate to show the user which direction to move lens 56 to center it on ring 26, which is concentric about axis 50. LEDs 76 will indicate by red, yellow and green lights respectively, when the user is getting close to correct centering of lens 56.

Both housings 20 and 22 are fixed in relative position on arm 18 and cannot be moved. FIG. 2 shows how arm 36 can be slid on rails 32 and 34 so that rubber tips 40 of rods 38 push the top of eyeglasses lens 56 towards ring 26. Rods 38 slide within tubes 78 which are secured to arm 36. Springs (not shown) enclosed in the upper end of tube 78 bias rods 38 downwardly.

Carriage 80 of arm 36 slides on rails 32 and 34. A spring 82 is attached to carriage 80 and biases arm 36 upwardly. A locking device 84 is connected to arm 18 and serves to lock arm 36 in the 'down and locked' position as shown in FIG. 2. When locking device 84 is released, spring 82 will pull arm 36 upwardly and out of the way so that the glasses can be removed. Locking device 84 automatically operates when arm 36 is moved downwardly by lever 42 into the "down and locked" position. The spring loaded rods 38 accommodate for different thicknesses and shapes of lenses 56 to hold them in a secure position.

Housing 20 contains camera system 54. In simplified form, camera system 54 includes a lens 86 (see FIG. 3), a pin hole assembly 88, and an imaging device 90. Pinhole assembly 88 is positioned at the back focal point of lens 86 to establish a telecentric condition for the camera optics. In the telecentric condition the central light ray, for the cone of light rays, from each pinhole is mask 62, that is collected by the camera optics 54 is parallel to the camera optical axis 50 after exiting from the eyeglasses lens 56. With the camera in a telecentric condition the magnification of the pinhole 62 image patterns formed on the CCD imaging device 90 are related directly to the refractive characteristics of the eyeglasses lens 56. The distances from the pinhole images formed by lens 56 and the camera position has no impact upon the magnifications of the pinhole images formed on CCD imaging device 90. Each of these devices is aligned along axis 50. A mounting block 92 extends horizontally from rails 32 and 34 to hold the camera system 54 in that position. It is to be understood that if desired block 92 could be vertically adjusted along rails 34 and 36.

Also enclosed within housing 20 is marking device 94. Marking device 94 consists of an arm 96 mounted to a carriage 80 slidable along rails 32 and 34. A yoke 100 pivots on the end of arm 96. Marking pens 102 are mounted to yoke 100, and a marking pad 104 is mounted on arm 96 adjacent to the tips, 106 of pens 102. By referring also to FIG. 1, lever 44 can be depressed to overcome the upward biasing force of spring 108 to push arm 96 downwardly. Marking pad 104 keeps tips 106 of pens 102 inked. (This is not apparent from FIG. 2, since 104 does not touch 106.) When partially moved downwardly, yoke 100 is pivoted to move pens 102 into a vertical position directly along axis 50. Lever 44 is further depressed to bring the spring loaded tips 106 into contact with lens 56. Pens 102 will mark the point of intersection of axis 50 with lens 56, and can also mark additional spots with a known relationship to that center spot. The marking pens 102 are used after the lens 56 has been correctly centered on ring 26.

FIG. 3

FIG. 3 is a sectional view taken along line 3—3 of FIG. 2. It shows the relationship of the components of the camera system 54. In particular, it illustrates the exact position of lens 86 within lens holder 110, as well as the pin hole assembly 88 and imaging device 90. Connectors 112 are also shown for connecting imaging device 90 to processing devices, as will be discussed further later.

FIG. 4

FIG. 4 depicts a top view of lens mount unit 24 and indicators 28, including LEDs 74 and 76. It also illustrates how stop member 30 cooperates with glasses 114.

FIG. 5

FIG. 5 shows the position and geometric pattern for LEDs 116 in arrays 58 and 60. There are eight LEDs 116 to each array. There are two sets of four LEDs arranged in two squares with one square tilted at 45° to the other. FIG. 5 also shows the pin holes 136 which are centered above each LED 116. The LED arrangement illustrated in FIG. 5 is the preferred arrangement; other arrangements are discussed within this application.

FIG. 6

FIG. 6 shows in more detail the structure of the marking device 94. The folded position for yoke 100 is shown in dashed lines. In position to where it is brought in alignment with axis 50 is shown in solid lines. Arrow 118 indicates the pivot axis for yoke 100. The pivoting arrangement insures that marking pens 102 will be in a vertical position when yoke 100 is brought to the solid lines position.

B. Optical System

FIG. 7

FIG. 7 depicts diagrammatically the basic optical and electrical components of the invention. A light pattern source 120 includes the first and second light source arrays 58 and 60 and the optics described previously positioned on one side of glasses/lens holder 122, which comprises the lens mounting unit 24. Camera 54 and imaging device 90 are positioned on the opposite side of glasses/lens holder 122. An image processor, 90A, is connected to the imaging device 90. A processor 124 controls operation of the system. A control portion 126 includes the buttons the operator utilizes to select modes and to start the system. The centering indicators (LEDs 72 and 74), are also depicted.

It can therefore be seen, in conjunction with the other Figures, that in the preferred embodiment, glasses 114 can easily be positioned in the system. The light source patterns are projected through the glasses/lens 56 and captured by camera 54. Imaging device 90 then preserves the captured image and converts it into a form which is usable by the image processor 90A. The image processor extracts image information and converts it to a form usable by the digital processor 124.

FIG. 7 diagrammatically depicts the basic format of the invention. FIG. 8A shows a more precise depiction of the optical components. LEDs 116 of first and second arrays 58 and 60 are positioned in the same pattern as the pinholes in mask 62. Mask 62 is positioned directly above LEDs 116. The top 134 of prism 132 forms a plane that is perpendicular to axis 50. Beam splitter 66 is angled at 45° (plus or minus 0.1°) from the plane through top 134. Prism mirror surface 68 is also at a 45° angle (plus or minus 0.1°) from the plane through the top of 134. Additionally, each beam splitter 66 and mirror 68 are parallel.

Beam splitter 66 passes one half of the light in the direction from array 58 of LEDs 116 to camera 54. Mirror 68 reflects the light from array 60 of LEDs 116 to the top surface of beam splitter 66, which reflects one half of that light up along axis 50 to camera 54. The difference in the optical path lengths from each of the two pinhole masks to lens 56 is known.

FIG. 8A

FIG. 8A also shows that in the preferred embodiment, lens 86 of camera 54 is a compound lens. Pin hole assembly 88 is located at the lens 86 back focal point. It forms the camera lens system aperture stop. Imaging device 90 in the preferred embodiment is CCD imager available from Texas Instruments under product number TC245.

FIG. 8B

FIG. 8B is a top plan view of an alternative configuration for 58 and 60 of LEDs 116.

FIG. 9

FIG. 9 schematically illustrates how the images 1 and 2 of the pinhole arrays in front of LED arrays 58 and 60 (or objects 1 and 2) respectively, would optically be perceived by camera 54. The geometric pattern of the portion of mask 62 in front of second array 60 of LEDs 116 (object 2) would appear as an image 2 to be behind the pattern of the portion of mask 62 in front of first array 58 of LEDs 116 (object 1). Therefore, because object 2 would be a fixed distance (in the preferred embodiment 8.3 mm) from object 1 and since object 1 is a fixed distance Yv from lens 56, this knowledge together with measurements of the image sizes by imaging device 90 can be used by processor 124 to calculate the refractive characteristics of lens 56.

Figure 10:
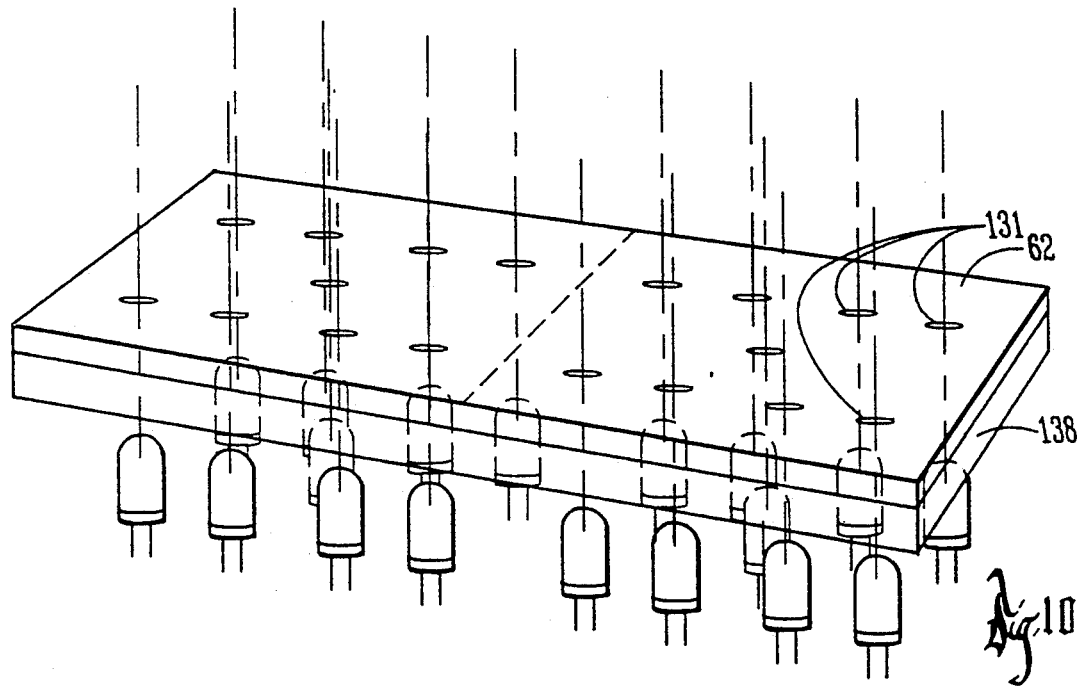
FIG. 10 is an isolated enlarged perspective view of the arrays of light sources and associated components for the projector means of the preferred embodiment of the present invention.
Figure 11:
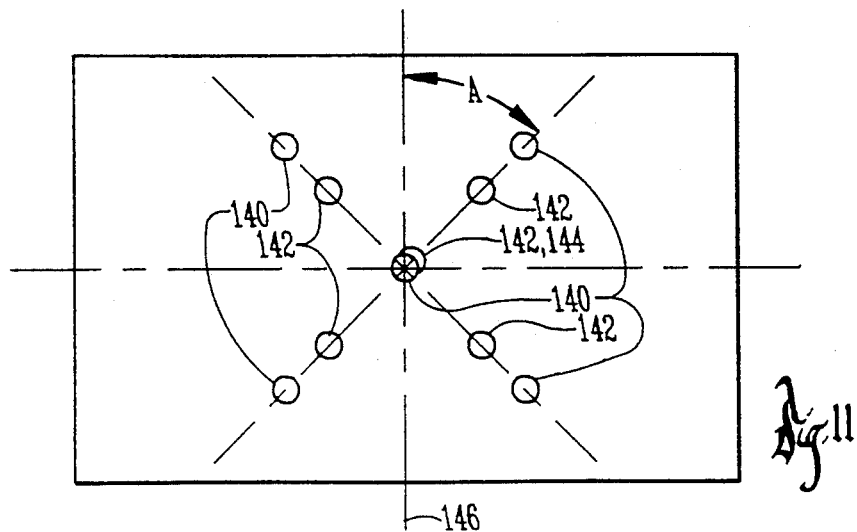
FIG. 11 is a diagrammatical view of some of the projected images that could be received at the camera means for the preferred embodiment of the present invention.

FIGS. 10 and 11

FIG. 10 shows the preferred structure for each array 58 and 60. Mask 62 includes pin holes 136. A glass plate 138 is positioned between mask 62 and the LEDs 116. An entire unit can then be pre-assembled and positioned in place in lensometer 10.

FIG. 11 is a diagrammatic view of the images received at camera 54 and imaging device 90. Dots 140 represent the captured image of the pattern of array 58, which is closer to camera 54. Dots 142 represent the captured image of the pattern of array 60 which is farther from camera 54. Dots 144 represent the image of the pattern of array 60 if lens 56 is a positive power lens. Angle A represents the angle between an axis 146 and dots 140 and 142. If the lens 56 power is negative then the spot pattern 142 will produce a smaller image on imaging device 90 than the image produced by spot pattern 140. If the lens 56 power is positive then the image produced by spot pattern 142 will be larger than the image produced by spot pattern 140.

The magnification of each image will be determined by comparing the size of each image to the corresponding image size with no lens inserted at lens position 56.

These computed magnifications and the known geometry of the projections and lens 56 position are used to compute the refractive characteristics of lens 56.

C. Contact Lens Holder

FIG. 12
FIG. 13

Figures 12, 13:
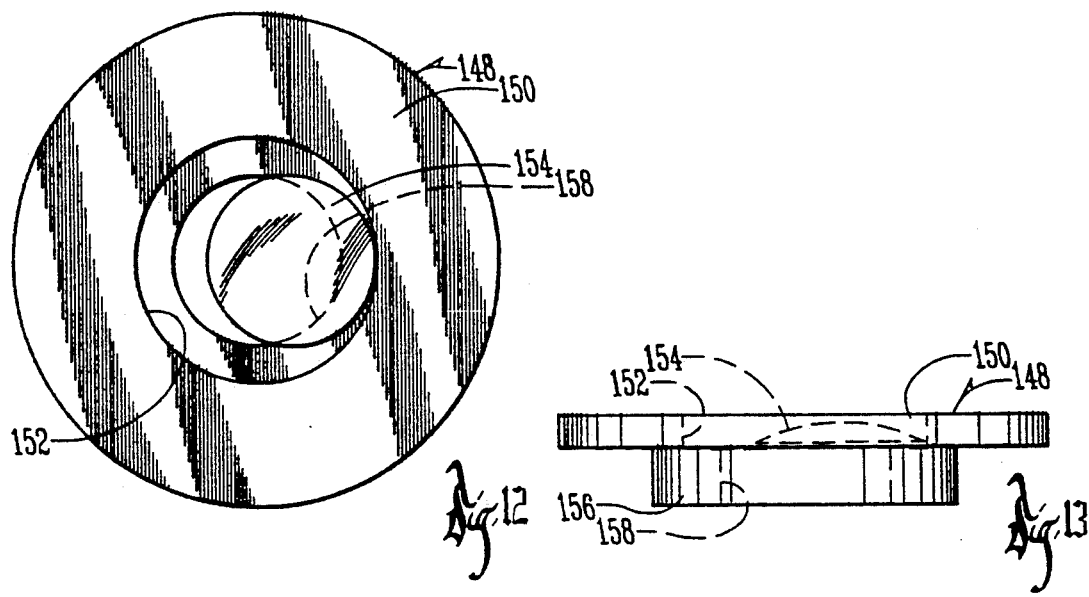
FIG. 12 is a top plan view of a contact lens holding attachment according to the preferred embodiment of the present invention.
FIG. 13 is a side elevational view of FIG. 12.

FIGS. 12 and 13 show an optional feature of the preferred embodiment. A contact lens holder 148 can consist of a circular plate 150 having a center aperture 152. A contact lens 154 can be laid into aperture 152 as shown. FIG. 13 shows a side elevational view of holder 148. A bottom plate 156, of smaller diameter than plate 150 includes an aperture 158 smaller than aperture 152. The entire holder 148 with contact lens 154 can then be placed on lens mount unit 24 of lensometer 10 and held in position by rubber tips 40 or rods 38 just like an eyeglasses lens. Holder 148 can decenter the lens 154 so that only certain LEDs pass through it.

D. Electrical Circuitry (Generally)

FIG. 14A
FIG. 14B
FIG. 14C
FIG. 14D

FIG. 14 depicts the electrical circuitry for the preferred embodiment of the invention in block diagram form. The projectors, prisms, camera, and imager have previously been discussed. Processor 124 is connectable to a keyboard 160 (control buttons), a keyboard encoder 161, a display 162, and a power supply 164. The processor therefore controls, pursuant to instructions entered through the keyboard, the functioning of lensometer 10. Thus, lensometer 10 is basically automated.

Figure 14A:
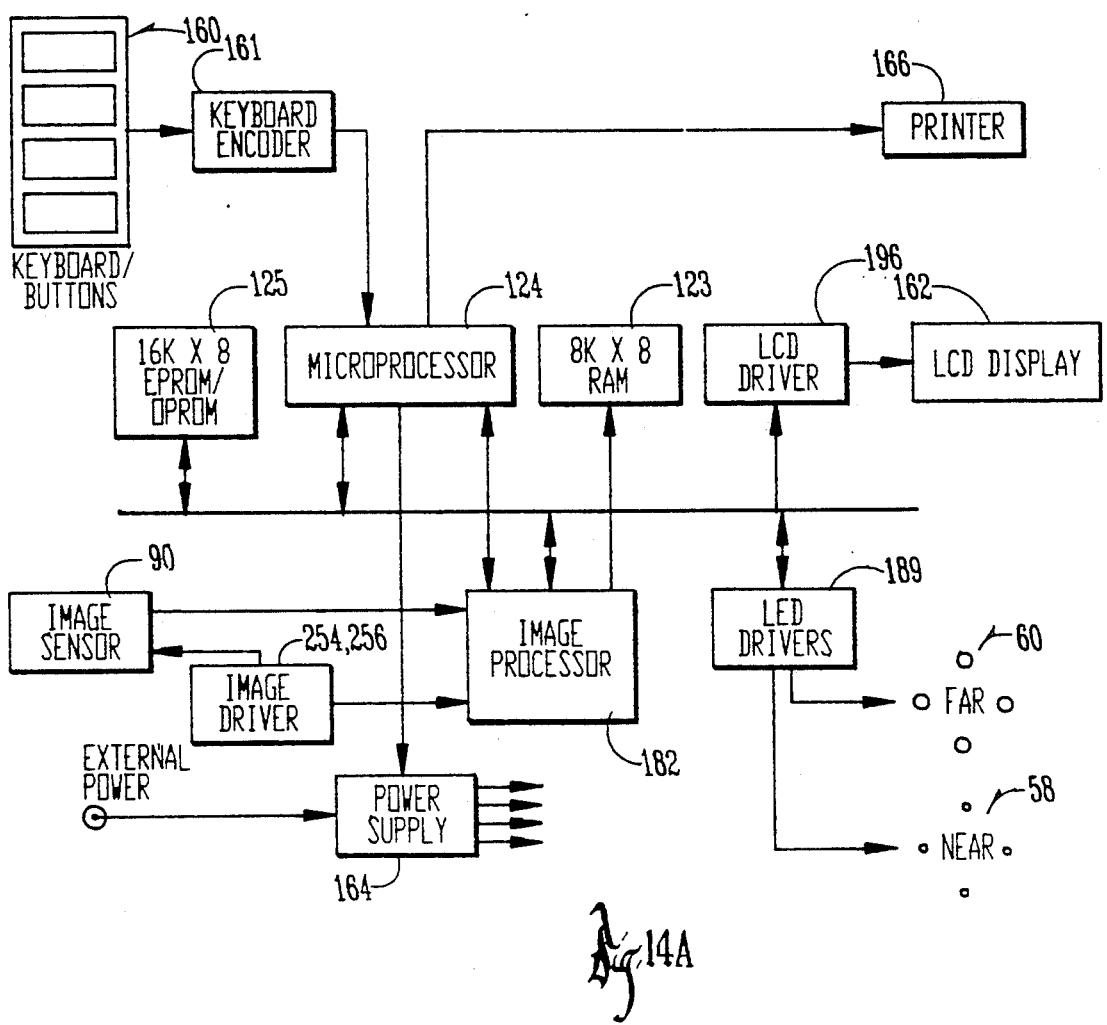
FIG. 14A is a simplified block diagram of the electronic circuitry according to the preferred embodiment of the present invention.
Figure 14B:
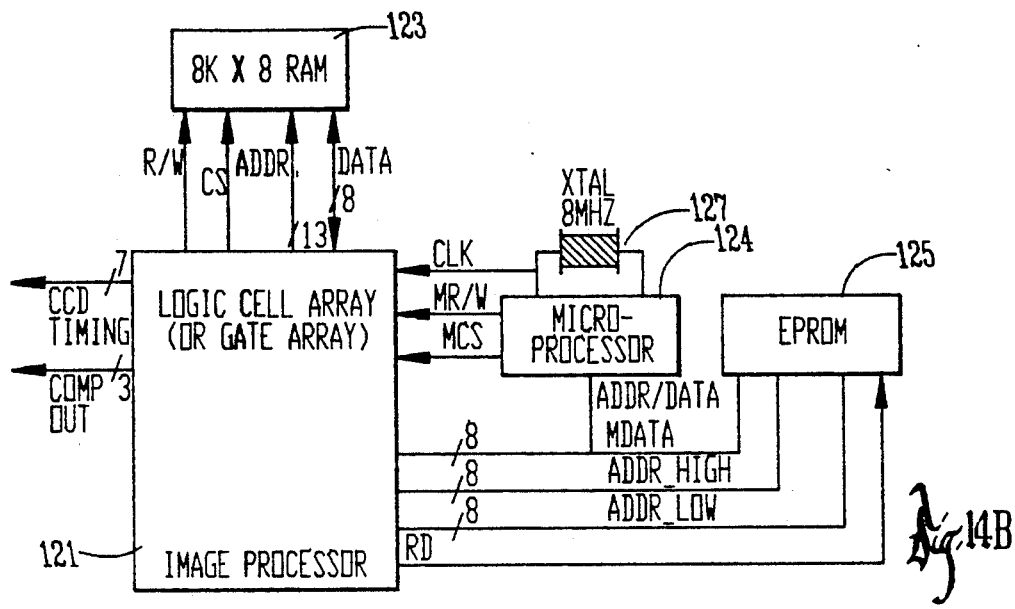
FIG. 14B-D are block diagrams of portions of the electronic circuitry of FIG. 14A.
Figure 14C:
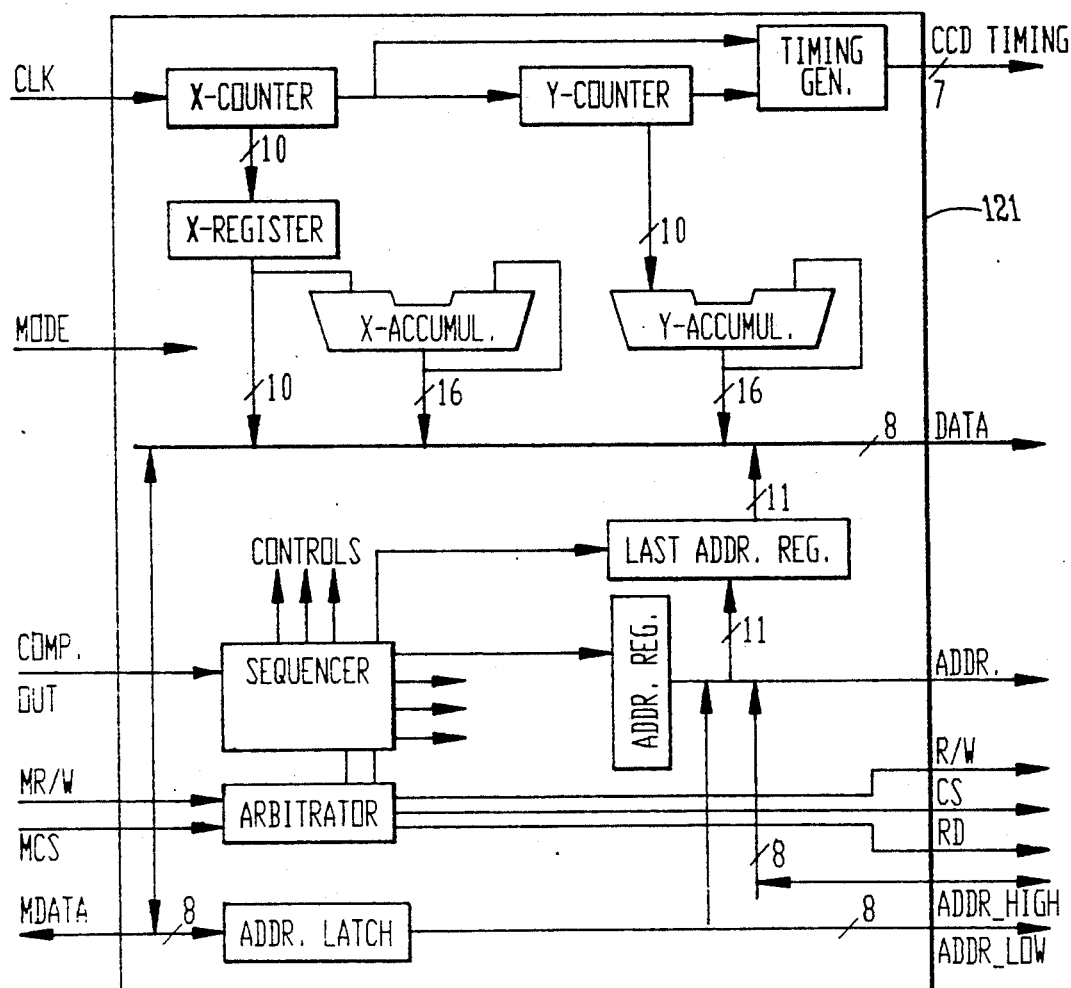
Figure 14D:
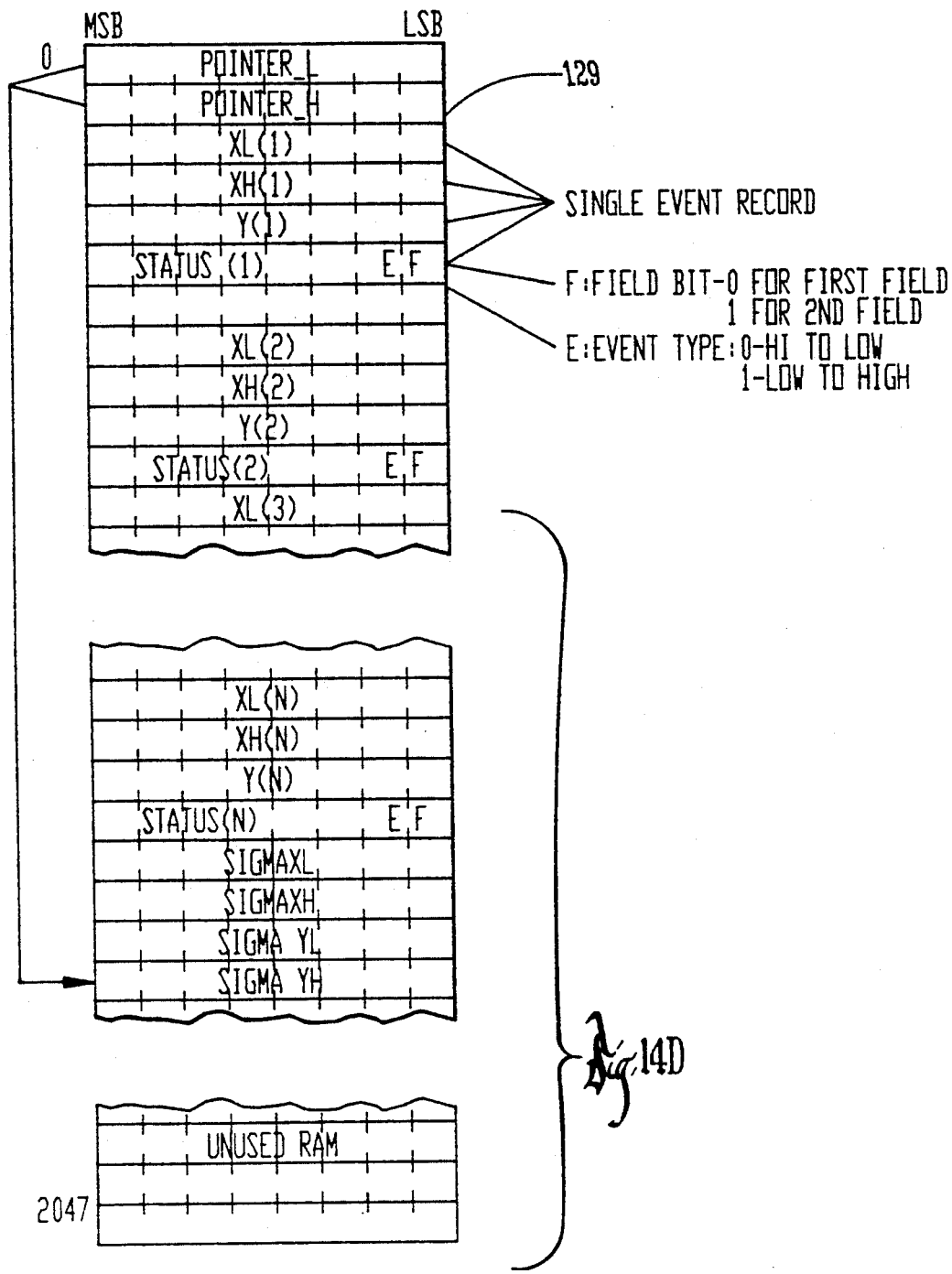
Figure 21:
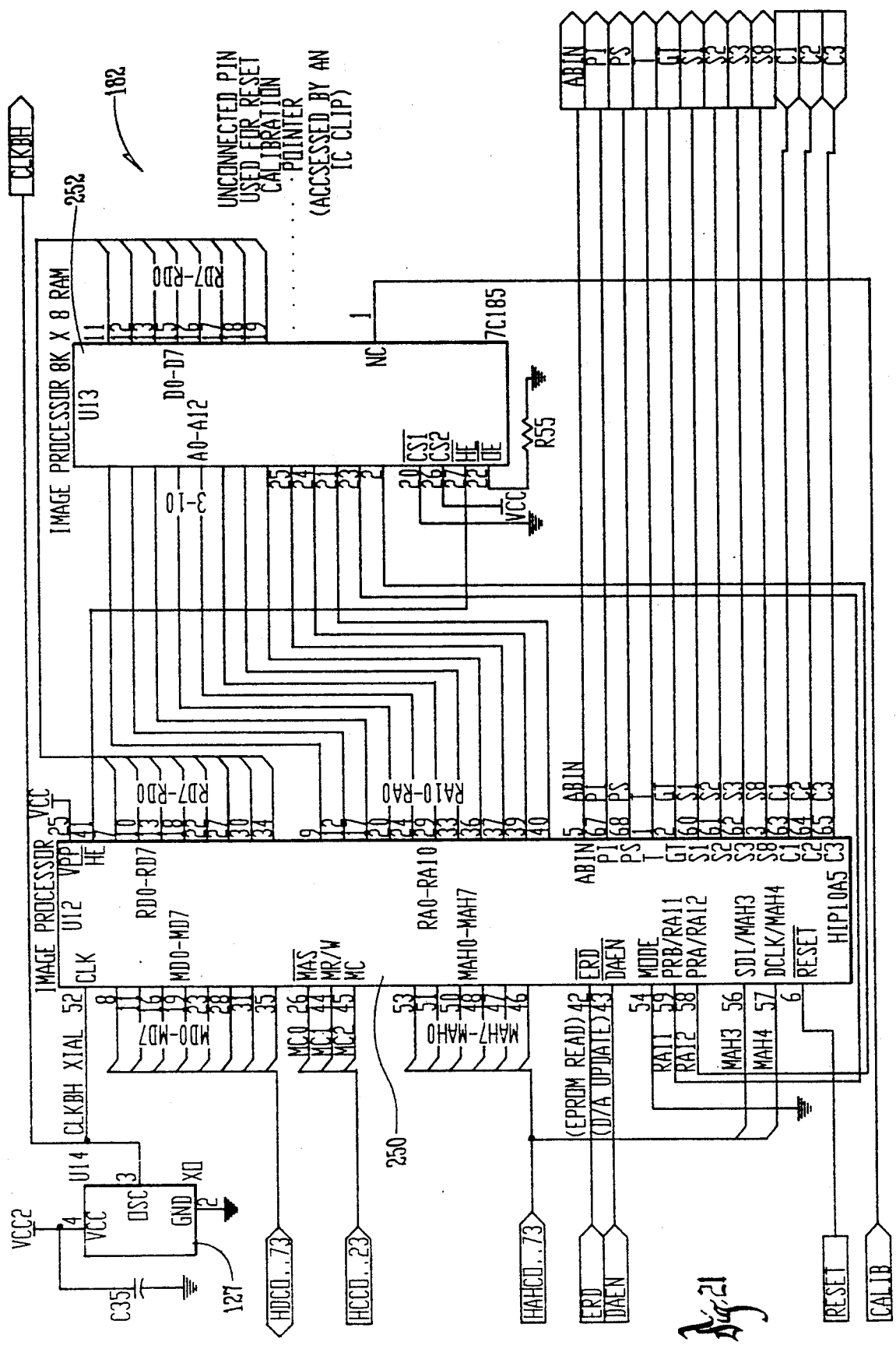
FIG. 21 is a more detailed electrical schematic of the image processor circuit of the main circuit board of FIGS. 16A and 17.

FIG. 14A shows an image sensor 90 (see FIG. 3), an image driver (see FIG. 22), and an image processor (see FIGS. 16A and 21). FIG. 14A also shows a LCD readout 162 powered by LCD driver circuit 196 and LED sets 58 and 60 powered by LED driver 189. FIG. 14B depicts more specifically the memory associated with processor 124, including logic gate array (121, 8K×8 RAM 123, EPROM 125, and 8 MHz crystal 127. FIG. 14C shows in further detail a preferred configuration of logic gate array 121. FIG. 14D is a memory map used with the RAM.

FIG. 15

FIG. 15 sets forth a flow chart of actions that occur during operation of lensometer 10 (box 159A). Initially, button 46 is pushed to start lensometer 10. Eyeglasses 114 are positioned so that one of the lenses 56 is roughly centered on circular ring 26 of lens mount unit 24 (box 159B). Processor causes the projection of first array 58 of LEDs 116 through lens 56. The image is captured on imaging device 90. An algorithm analyzes the image to see if lens 56 is correctly centered. If the lens is not centered, processor 124 instructs one of the LEDs 74 to indicate the direction lens 56 should be adjusted to be centered. This process continues until lens is moved close to being centered. The yellow LED of LEDs 76 will then light indicating to the user that centering has almost been achieved (box 159C). Fine adjustment of lens 56 is then made until the green LED of LEDs 76 lights up indicating correct centering (box 159D).

When this occurs, arm 36 is brought down and locked into position (box 159E). Rods 38 and rubber tips 40 then hold the lens in its centered position. If desired, arm 96 is lowered and marking pens 102 are brought into position along axis 50. Arm 96 is then further lowered to mark the center of the lens (box 159F).

Lensometer 10 would then alternatively illuminate first array 58 and second array 60 of light sources (box 159G). Each of these images would be captured by camera 54 and imaging device 90. An algorithm in processor 124 would then determine the diffractive power of lens 56 by comparing those images. The process can then be completed for the other lens of the eyeglasses if desired (box 159H). The readings will automatically be stored and/or displayed on lensometer 10. Alternatively or additionally, they can be printed out on a printer device 166, if desired (box 159I).

E. Electrical Circuitry (Specifically) and Operations

FIGS. 16–40

FIGS. 16 through 40 depict the specific electronic circuitry of the preferred embodiment of the invention in electrical schematic form. FIG. 16 (comprised of FIGS. 16A and 16C) sets out the contents of the general circuit board 200 (which is mounted in base 12 of lensometer 10). The general board 200 includes a main circuit section 168, I/O section 170, external bus connector 172, RS-232 converter 174 and analog switch 176.

The main circuit section 168 includes a DC/DC converter 178, a microprocessor circuit 180, an image processor circuit 182 and a CCD interface 184. The I/O section 170 includes a LCD display circuit 186, and a keyboard circuit 188. It also includes LED outputs 189.

The external bus connector 172 allows these components to be communicated to an outside PC, or a printer. The RS-232 converter 174 allows serial communication of data.

FIG. 16B

Figure 16B:
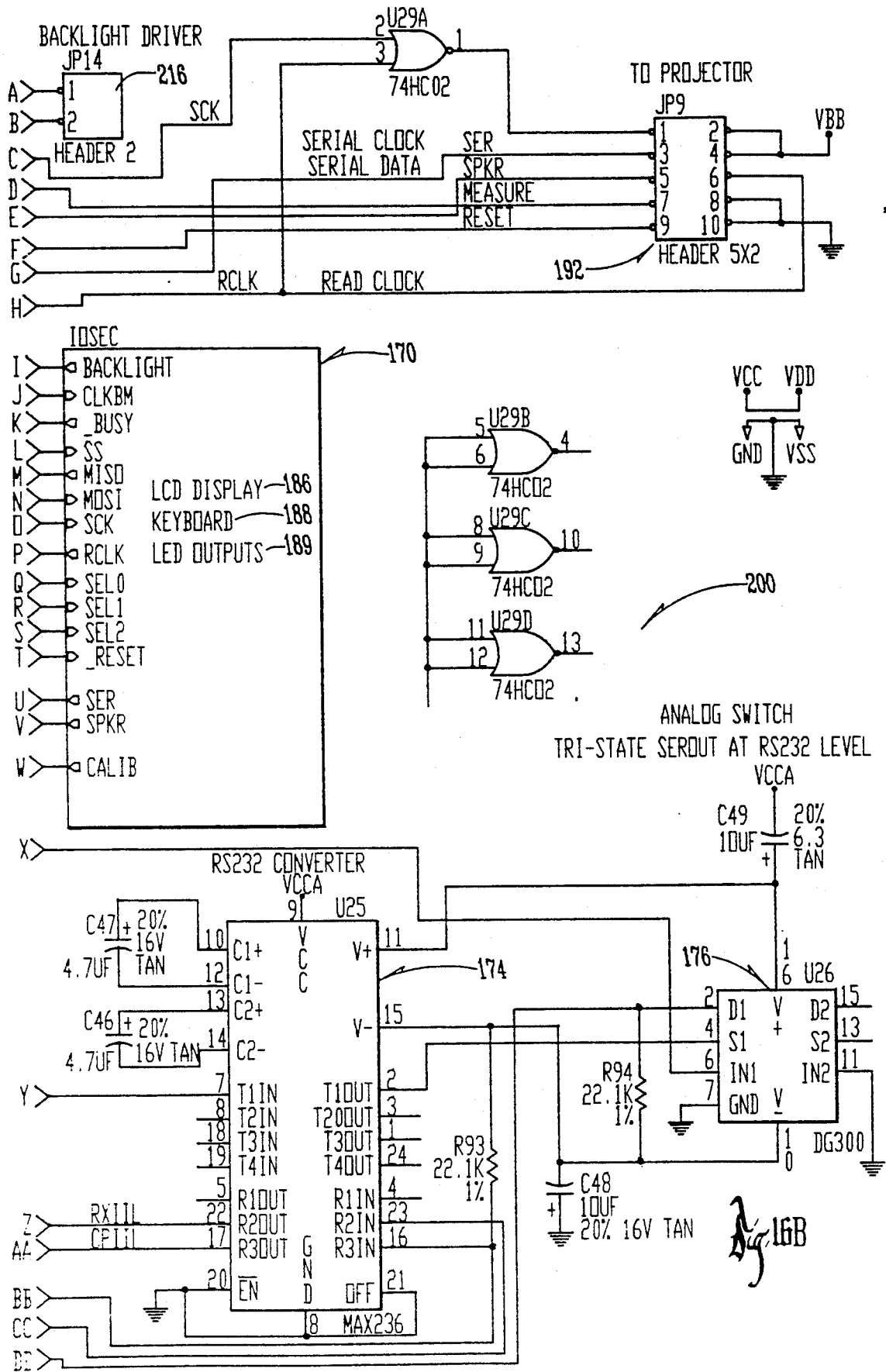

FIG. 16B also shows a header 192 which allows communication with the first and second arrays 58 and 60 of LEDs.

FIG. 17

Figure 17:
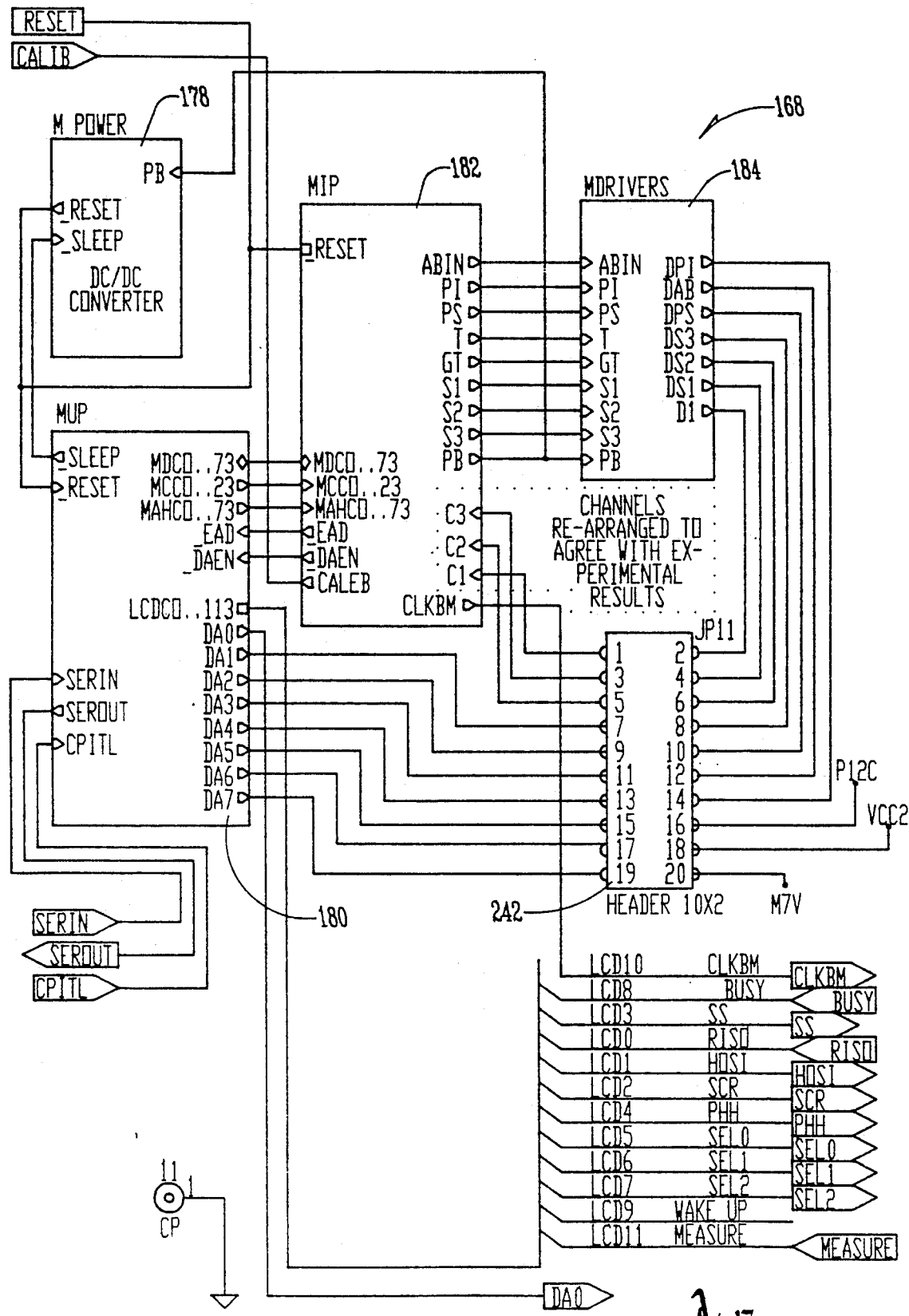
FIG. 17 is a more detailed electrical schematic of the "main" section of the general circuit board of FIG. 16A.

FIG. 17 shows more specifically the interconnection of the components of main circuit section 168 of FIG. 16A.

FIG. 18

Figure 18:
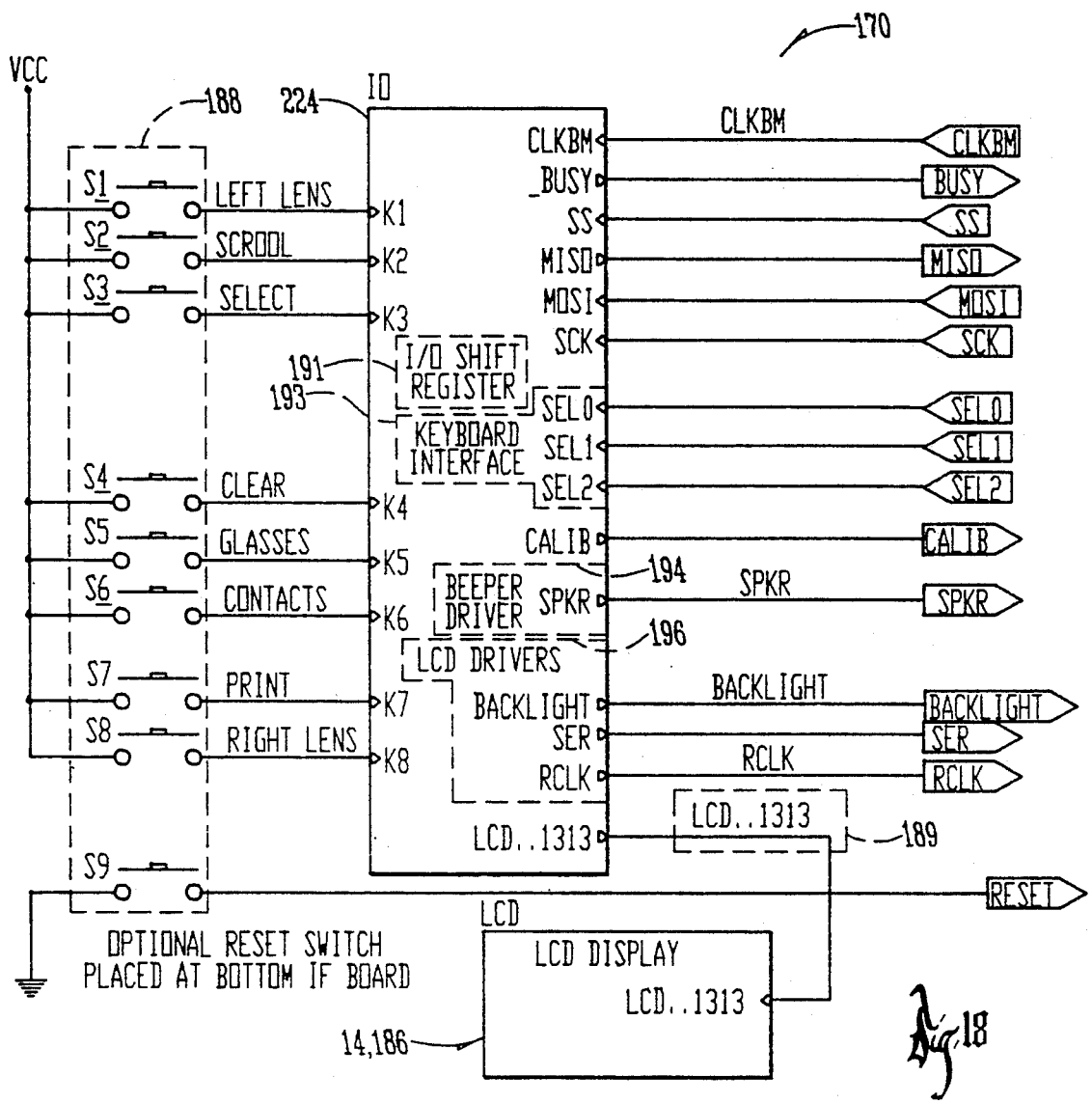
FIG. 18 is a more detailed electrical schematic of the input/output (I/O) section of FIG. 16B.

FIG. 18 schematically shows with more specificity I/O section 170 including an I/O shift register 191, a keyboard interface 193, beeper driver 194, and LCD drivers 196, as well as LCD display circuit 186.

FIG. 19

Figure 19:
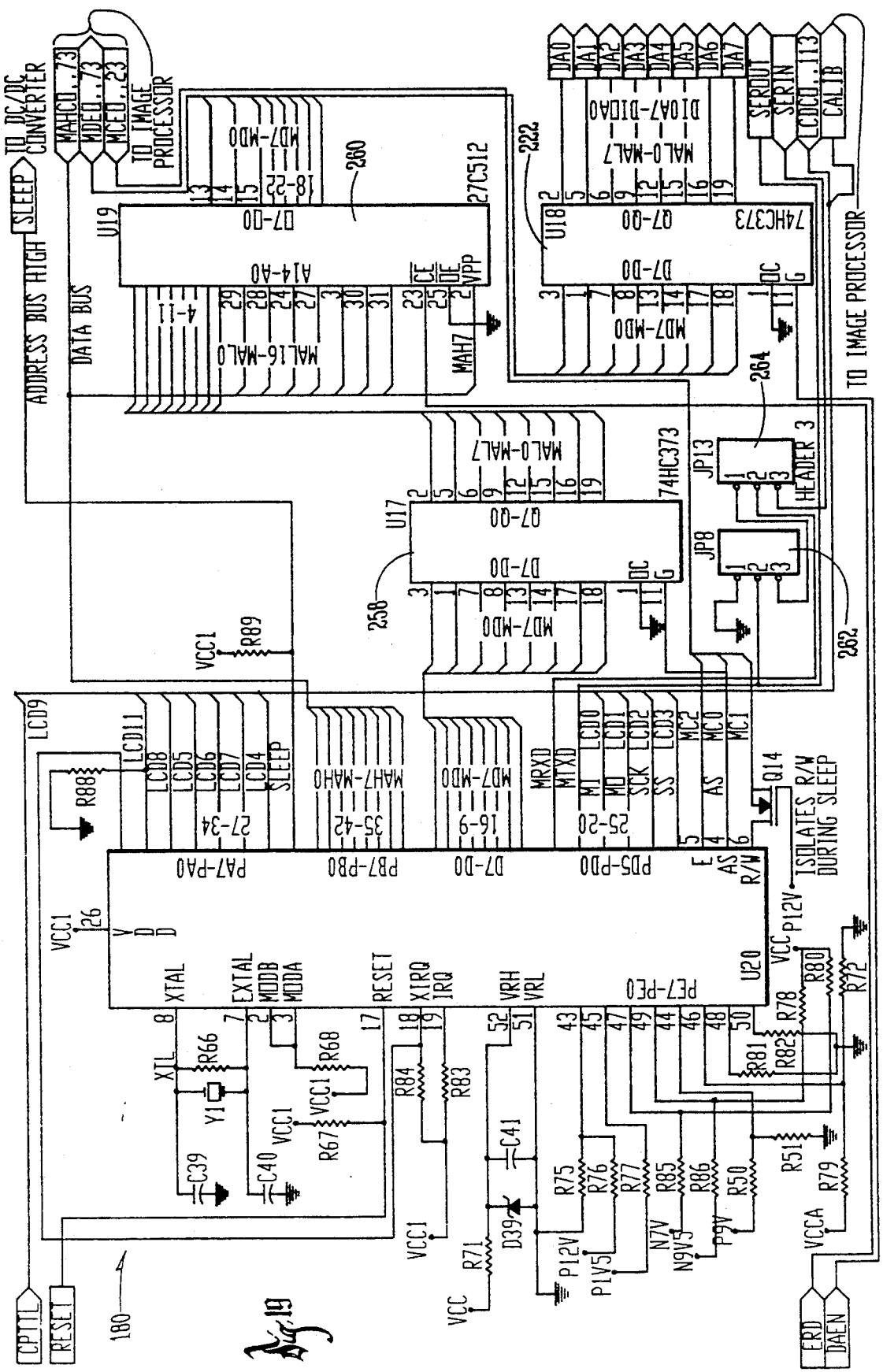
FIG. 19 is a more detailed electrical schematic of the microprocessor circuitry of the main circuit board of FIGS. 16A and 17.

FIG. 19 depicts the microprocessor circuit 180 of main circuit 168.

FIG. 20

Figure 20:
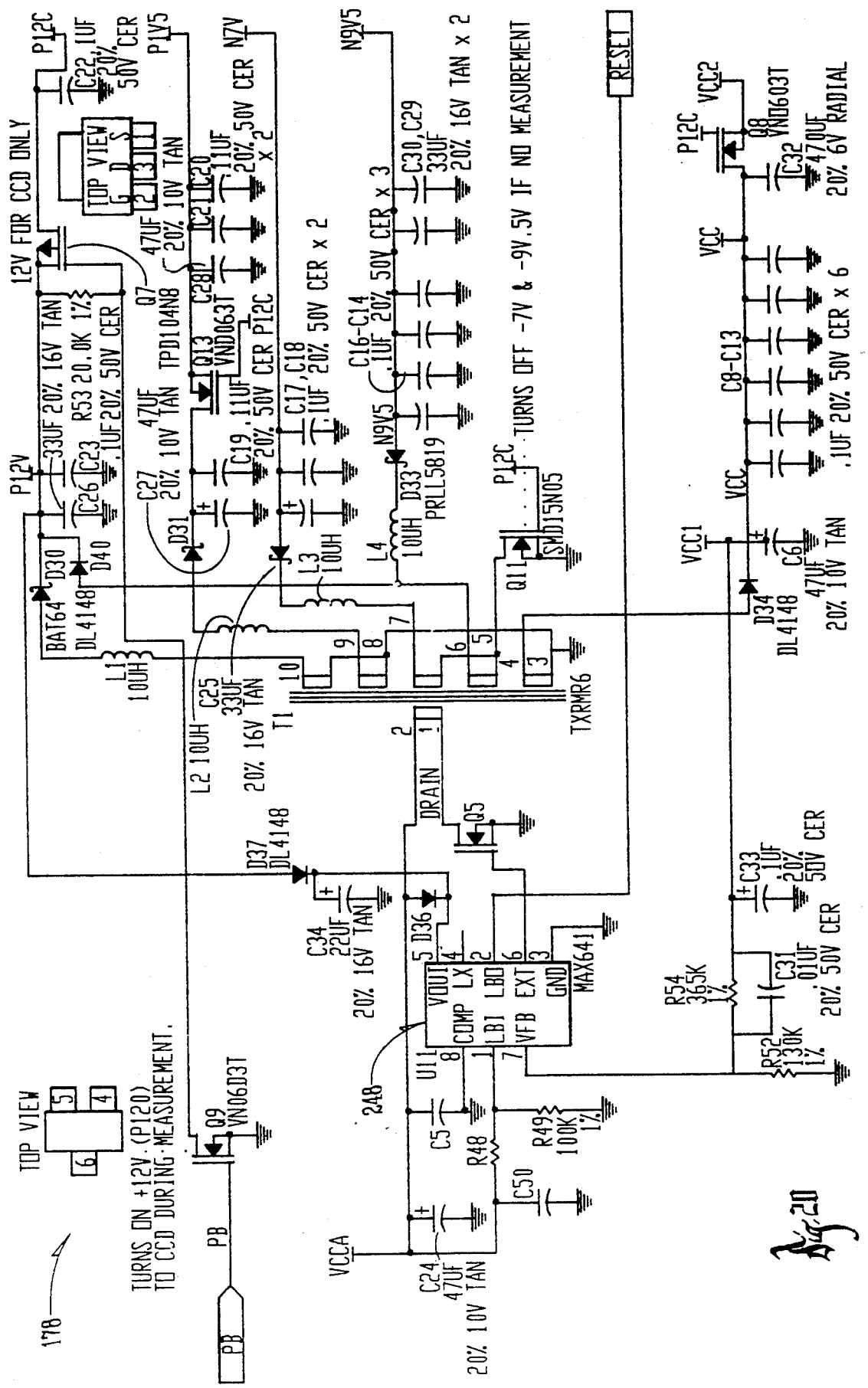
FIG. 20 is a detailed schematic of the power supply circuit of FIGS. 16A and 17 according to the preferred embodiment in the invention.

FIG. 20 shows the power supply circuit 178 of main circuit 168.

FIG. 21

FIG. 21 depicts in detail the image processor circuitry 182 of main circuit 168.

FIG. 22

Figure 22:
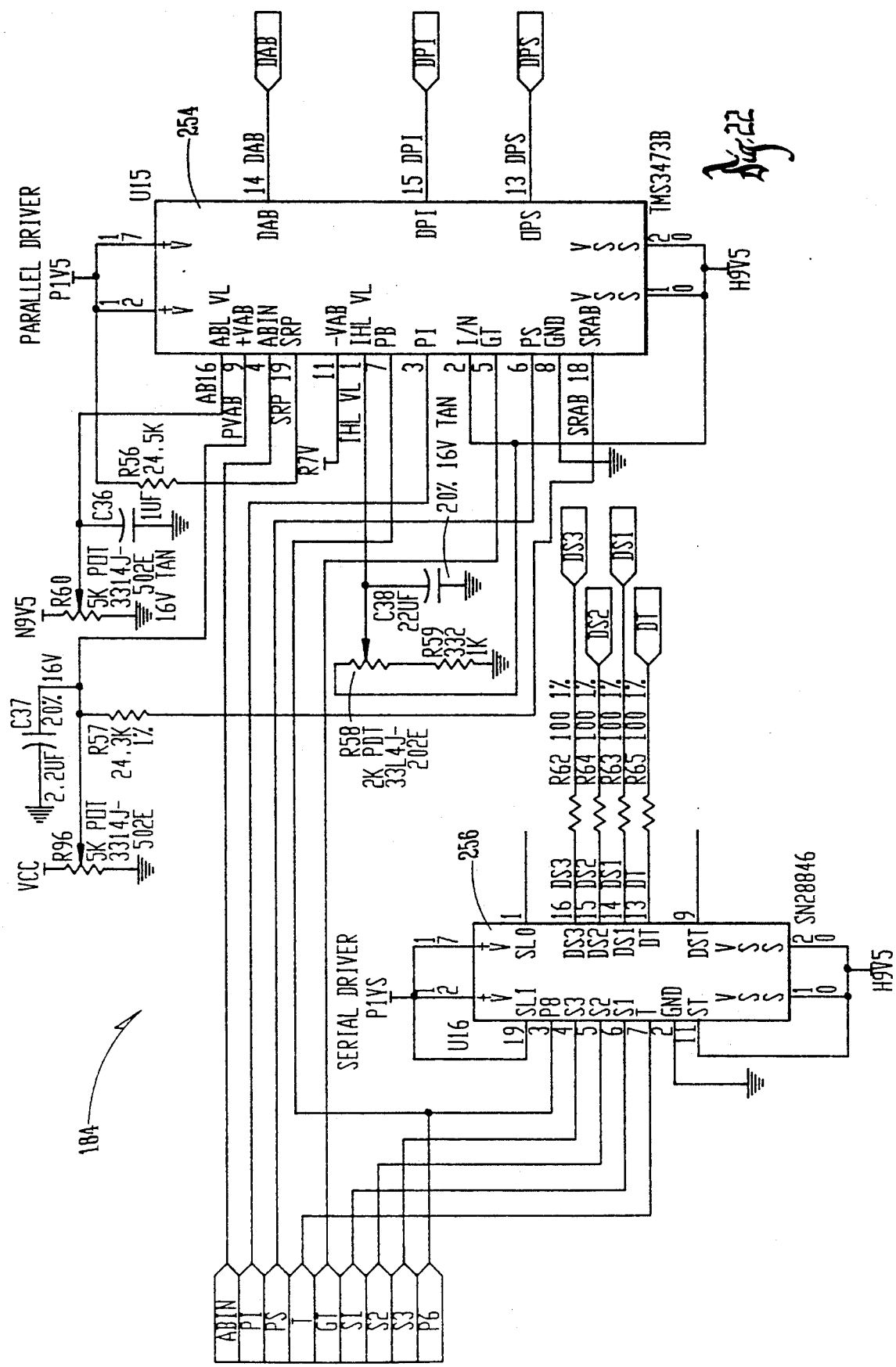
FIG. 22 is a more detailed electrical schematic of the CCD drivers section of the main circuit board of FIGS. 16A and 17.

FIG. 22 depicts with more specificity CCD driver section 184 of circuit 168.

FIG. 23

Figure 23:
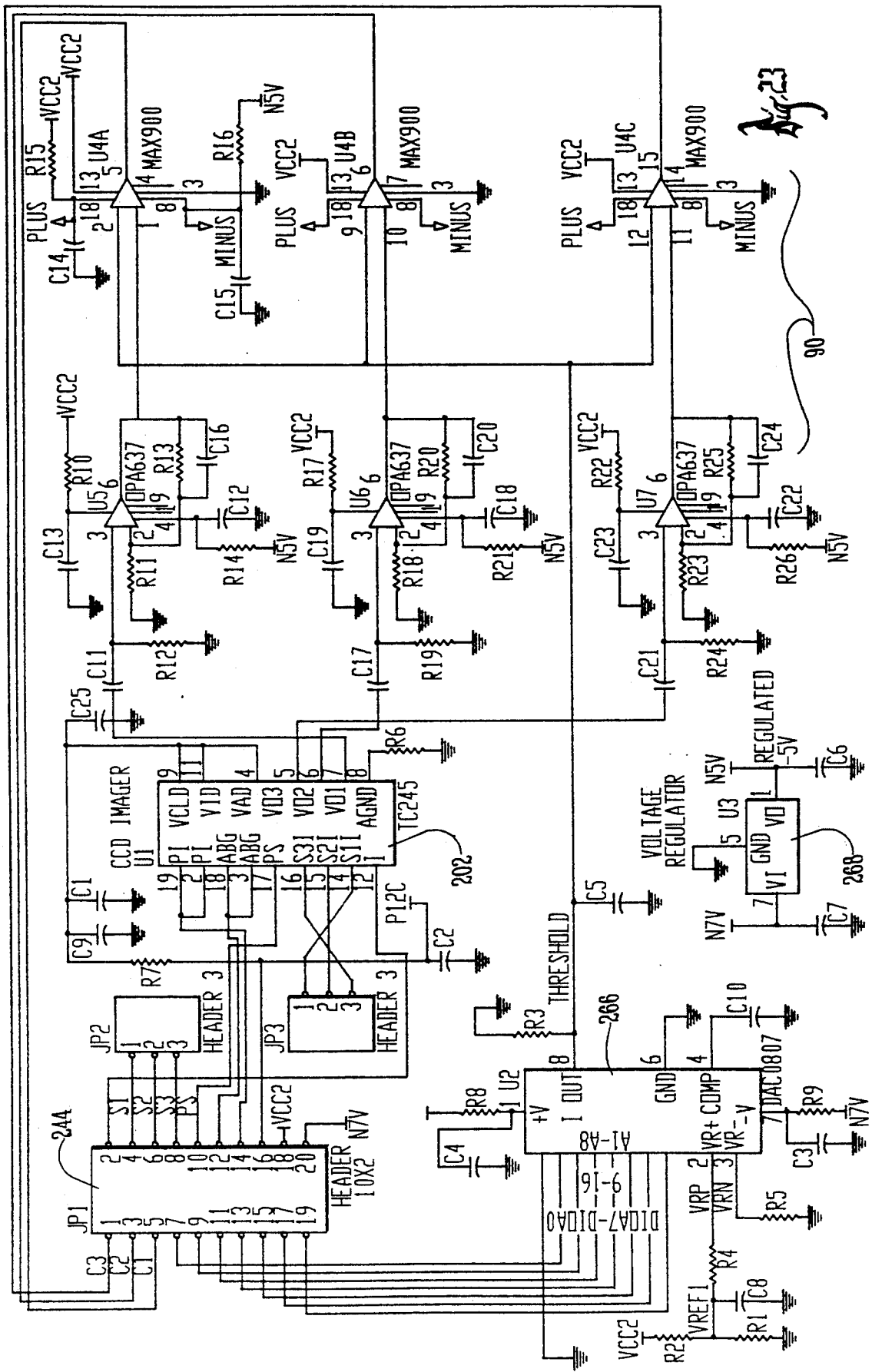
FIG. 23 is a more detailed electrical schematic of the CCD circuit according to the present invention.

FIG. 23 shows the CCD imager circuit (a segment of the general board 200) including CCD imager component 202 of imager 90.

FIG. 24

Figure 24C:
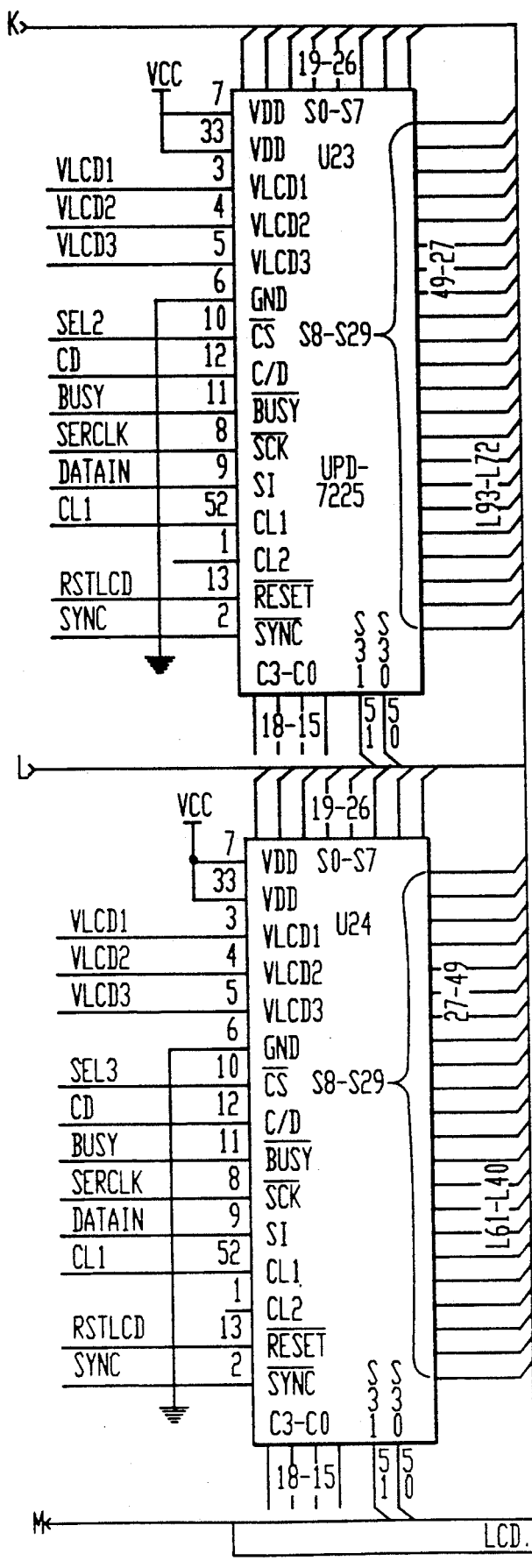
Figure 29:
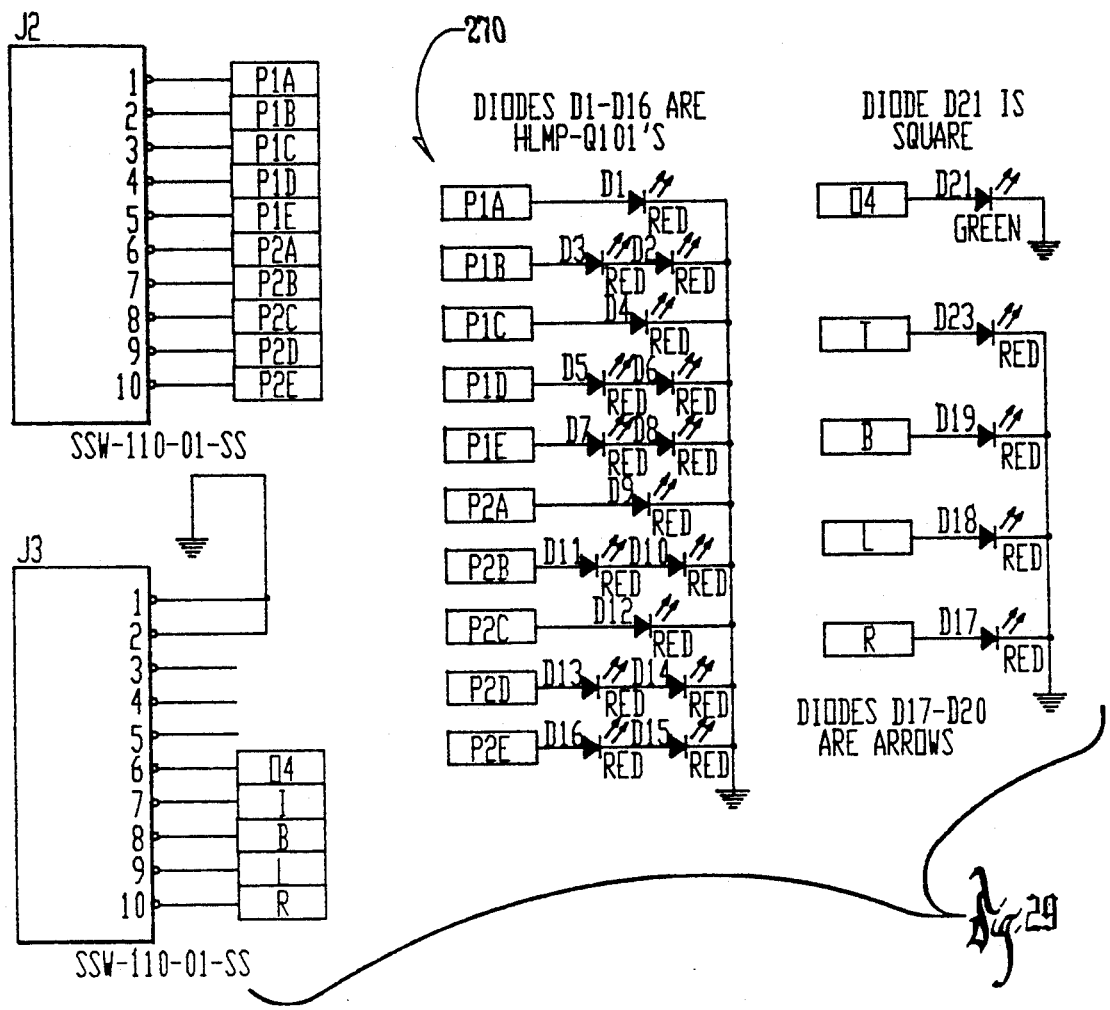
FIG. 29 is an electrical schematic of the lensometer projector board.

FIG. 24 (comprising FIGS. 24A-24C) shows with more specificity the LCD drivers 196 for the LCD display 14.

FIG. 25

FIG. 25 shows with more specificity the actual connections for the LCD display circuit 186.

FIG. 26

FIG. 27

FIGS. 26 and 27 depict the LCD display 14 (FIG. 26) and icons (FIG. 27) utilized with regard to the preferred embodiment of the present invention, The top row of FIG. 26 displays the sphere and cylinder of a tested lens. The remaining rows and sections are labeled according to one embodiment of the invention.

It will be appreciated that the present invention can take many forms and embodiments. The present preferred embodiment described above does not nor is it intended to describe all forms and embodiments the invention can take. The scope of the invention is determined by the following claims and is not intended to limit the scope of the invention.

In the following sections entitled "Electronic Circuit Description" and "Lensometer Operation", references to such things as the CCD imager board, nose board, and projection board as well as other components are corresponded to the figures. Examples are as follows:

|  | Figure |
|---|---|
| CCD Imager Board | 23 |
| Nose Board | 28 |
| Projection Board | 29 |

In the following section entitled "Image Processor Description" references to certain components are corresponded to the figures.

The following sections entitled "Image Processing Algorithm" and "Lensometer Software Theory of Operation" are also corresponded to the figures.

The description also cross-references certain figure numbers with section headings within each of the following sections.

The final portion of the description comprises a detailed parts list including reference designation members, part descriptions, package type, etc. for the lensometer electronic circuitry according to the preferred embodiment.

LENSOMETER ELECTRONIC CIRCUIT DESCRIPTION

1. Introduction

1.1. General

The following is a technical description of the preferred embodiment of the electronic part of the Lensometer. The electronic part of the Lensometer, discussed in this document, includes three Circuit Boards. The 'Main Board', the 'CCD Imager Board' and the 'Projection Board'. The Main Board is located at the base of the instrument, while the CCD board is located near the top of the instrument, facing downwards towards the Projection Board. The CCD and Projection boards are connected to the Main Board via ribbon cables and connectors.

1.2. Scope

This description sets forth the electronic circuits implemented on these boards. The description relies on the Boards' schematics (see particularly FIGS. 16-29). The level of detail is sufficient to understand the basic functions and operations of the Lensometer's boards. The operation of the circuit is described in another section of this description.

1.3. Schematics Structure and Conventions

The schematics of the Main Board are hierarchically structured in FIGS. 16-29. The CCD board is confined within FIG. 23. The Main Boards' schematic (FIGS. 16A-16B) includes only two sub blocks: IOSEC and MAIN, that are detailed on FIGS. 17-24 respectively. FIG. 18 contains some circuits and one sub-schematic detailed on FIGS. 24-25. The schematics in FIG. 17 contains sub-schematics detailed on FIGS. 19-22.

The electrical connection between schematics is implemented using a terminal (also called 'module port') designated with a unique name, two identical names of module ports on different schematics are connected together. Two identical names within the same schematic Figure are also connected together, but have no meaning outside the Figure. For example, on FIG. 16 of the Main Board schematics, the block called MAIN has an input called 'CALIB' which comes from a port carrying the same name in block IOSEC, these signals are connected together. On FIG. 17 (which contains the content of block MAIN on FIG. 16A), the CALIB input is visible at the top left corner, and it is connected to the MIP block which is further described in FIG. 21.

2. Main Board Schematics Description

2.1. Main Board Portion 1 (FIGS. 16A-B) External Bus Header 172 (JP12)

The External Bus Header 172 is located at the bottom left of FIG. 16A and is used as the main connection of the Lensometer to the outside world. It contains the following leads:

TABLE 1

| \_\_\_\_External Bus Connector 172 (JP12)\_\_\_\_ | | |
| Pins | Name | Description |
| --- | --- | --- |
| 1, 2, 3, 4 | DC+ | External power connection of 9V DC power supplied by an external power supply |

TABLE 1-continued

| \_\_\_\_External Bus Connector 172 (JP12)\_\_\_\_ | | |
| Pins | Name | Description |
| --- | --- | --- |
| | | and provides the power source for the Lensometer |
| 5, 6, 7, 8, 10 | AC− | See AC+ |
| 12 | Enclosure GND | Enclosure Ground: Connected to a terminal (J2) used to ground the electronic circuits with the mechanical structure of the Lensometer to an external ground reference in pin 12. |
| 9, 11 | TX, RX | These signals (Transmit and Receive respectively) are used to establish serial communication between the Lensometer and a host computer, or a printer (to produce hard copy results). The TX and RX lines fully comply with standard serial 9600 Baud UART communication, that are electrically defined by the EIA (Electronic Industry Association) standard RS-232C. |
| 13 | C/P | This is an external indication whether the host computer or the printer are occupying the external RS-232 bus. |
| 14 | Foot Switch | This line is routed to a an external foot switch, when depressed, the foot switch will provide ground connection to this pin (see measure activation). |

Measure Activation

The beginning of a measurement can be activated from two alternate sources: a foot switch (not shown) which is connected through the External Bus Connector 172 (pin 14), or from a switch located on the Light Pattern Source Board (connected through JP9 pin 7—see FIG. 16A at 192). When the foot switch is depressed, a ground (logic low level) is provided to the transistor Q16 that provides an active high 'MEASURE' signal, that is sent to the microcontroller 180 (FIG. 19) to begin measurement operation. When the Light Pattern Source switch is depressed it provides a positive voltage directly to the same 'MEASURE' line.

Primary Power Regulation

The DC power that is provided to the board through the External Bus Connector 172 is regulated by an integrated voltage regulator 210 (U21) to provide the primary regulated voltage designated VccA which is the main source for the DC to DC converter 178 (see FIG. 20).

LCD Back-Light Power Supply

The LCD 14 (Liquid Crystal Display) requires an active back light which is implemented with a 110 Volts 400 Hz Electro-Luminescent light source. The external DC voltage (DC+) source (not shown) is supplied to an integrated power regulator 212 (U27 FIG. 16A) that can be switched on or off by a signal called 'BACK-LIGHT' controlled by the microcontroller 180. The 5 Volts from U27 designated $V_{BB}$ drives a DC to AC converter 214 (U28) that provides the required back light voltage and frequency through connector 216 (JP14) (see FIG. 16B).

Projector Header

The projector header 218 provides the required connections to the light pattern source and brings in two switch signals. The following table describes the connector pins.

TABLE 2

| Light Pattern Source Connector 192 (JP9) | | | |
|---|---|---|---|
| Pins | Name | I/O | Description |
| 1 | Serial Clock | Out | Carries the serial clock for the load of the light pattern source. |
| 2,4 | VBB | Out | +5 Volts for the light source board. This voltage is generated by the backlight regulator, and activated only when the back light is active (see Back Light description). |
| 3 | SER- Serial Data | Out | Carries the serial data for the load of the light pattern source. |
| 5 | SPKR- Speaker | Out | Provides the required signals for audible alarm (see details in the description of FIG. 24 where this signal is generated). |
| 6 | Read Clock | Out | Enables the loading of the light pattern board |
| 7 | MEASURE | In | Activated by the foot switch when measurement is requested |
| 8 | Ground | Out | Ground. |
| 9 | _RESET | In | Input signal that activates a master reset |
| 10 | Ground | Out | Shorted to pin 8 |

The Serial Clock (pin 1), Serial Data (pin 3), and Read Clock (pin 6) are generated by the microcontroller 180 to provide the loading mechanism of the required light pattern. The serial clock is gated by the 'Read Clock' signal to prevent the clock from entering the projector when not enabled. Detailed explanation of these signals and the serial load mechanism is provided with the description of FIG. 24 where these signals are generated.

Serial Communication

Serial communication is provided by two lines SERIN and SEROUT connected to the asynchronous port of the microprocessor (FIG. 19). Conversion between TTL voltage levels and RS-232 levels are done by device 220 of FIG. 16B (U25). The external TX bus line (pin 9 of header 172 (JP12)), is shared by other devices, thus it requires a tri-state buffer, which is provided by the analog switch 176 (U26), controlled by bit DA0, taken from the D/A control latch (FIG. 19 at 222 (U17)). This bit is not used for D/A conversion, as 7-bits are sufficient for that purpose.

2.2. Main Board Portion 2 (FIG. 18)

FIG. 18 contains the operational push-button switches (51-59) and modular block of sub-schematic of FIGS. 24 and 25.

2.2.1. Operational Switches

FIG. 18 contains eight momentary push-button type switches (designated S1, S2, and S4 to S9) which are used to control the Lensometer operations. These switches are also collectively referred to as "the keyboard" (160). When a push button is pressed by the user, one of the inputs to the IO block 224 (designated K1 through K7) is momentarily shorted to ground or to the VCC potential, depending on the switch wiring. The switches' functions are defined by the system software. The microcontroller 180 always reads the status of all switches, thus functional assignment of these switches is arbitrary. As assigned by the microcontroller, the names of these switches are: Left Lens, Scroll, Select, Clear, Glasses, Contacts, Print, Right Lens and Reset. The Reset switch is hidden from the user, and is provided for testing purpose only, as the Lensometer can be reset by unplugging the power. A more detailed description of the functionality of these switches will be provided later.

2.3. Main Board Portion 3 (FIG. 25)

FIG. 25 contains the LCD device 14 or 186. This is a four-backplane, custom made liquid crystal display.

2.4. Main Board Portion 4 (FIG. 24)

FIG. 24 (comprised of FIGS. 24 A-C) contains most of the input output functions of the Lensometer. It contains the LCD drivers (collectively 196 or 196A-D) and the LCD contrast control, the serial load and read circuitry, the push button keys read function, the sound control and the serial data and clock sources for the projection board.

2.4.1. LCD Drivers and Display

The main board contains two LCD driver devices 196A-D (U1, U2, U23, and U24). These devices are loaded by the microcontroller 180 (see serial load control). The drivers provide all the required signals and voltages to the LCD 14 (U22 FIG. 25). The voltages to each driver (VLCD1, VLCD2, and VLCD3) are supplied by resistor voltage dividers, and a contrast control (VLCD3) that is described separately. The LCD 14 can be reset by the microcontroller 180 in pin 13 of drivers 196A-D (U1, U2, U23 and U24). The microcontroller 180 synchronizes its access to the driver 196 by sensing the 'busy' line from all the drivers 196 (pin 11 on the drivers that is driven to module port named '_BUSY'). The LCD driver requires a clock with a frequency of 100 KHz, the dual divider 226 (U10) provides this clock by dividing the 8 MHz main crystal 127 oscillator by 10 (U10A) and then by 8 (U10B), which provide the required division factor of 80. The Liquid Crystal Display 14 consists of various visual symbols (see FIGS. 26 and 27). The microcontroller 180 can address each symbol by sending a control sequence to either U1, U2, U23 or U24 (reference nos. 196A-D), addressing the desired symbol.

2.4.2. Serial Load Control Circuitry

The serial load circuit is used to load multiple registers by the microcontroller 180, and provides a method of setting control values with minimum use of outputs from the controller 180. The circuit includes a destination selector 228 (U3), which selects the device to be controlled by the microcontroller 180, and loading shift registers 230A, 230B (U7 and U6). These shift registers are loaded with several bits, each controlling the operation of another device, such as LED and speaker. The outputs of these registers is sent to the projector board by the two signals named SER and RCLK.

The devices to be selected by selector 228 (U3) are detailed in table 3. The serial load operation of bits from the microcontroller 180 includes the following steps, which are shown also in FIG. 32 (serial load process steps):

1) The microcontroller 180 sets the 3 'select' inputs of selector 228 (U3) (se10, se11, and se12) to the required destination value (between 1, 2, or 7, see table 3).
2) The microcontroller 180 sets the value to be loaded on its output port (module port MOSI, net called DATAIN).
3) The microcontroller 180 toggles the serial clock (module port SCK, net called SERCLK) to high value and then low. This operation causes the data on the MOSI line to be shifted into the shift register.
4) Steps 2 and 3 are repeated until all the bits are loaded to the selected device.
5) The microcontroller 180 removes the data value from the MOSI line.
6) The microcontroller 180 sets the selector inputs to value 0 for no operation.

TABLE 3

| | Select Inputs to the Destination Selector 228 | |
|---|---|---|
| Select | Device's Port | Description |
| 0 | Disabled | The serial shift load/read is disabled. |
| 1 | LCD driver U2 | Defines the display on the LCD. |
| 2 | LCD driver U23 | Defines the display on the LCD. |
| 3 | LCD driver U24 | Defines the display on the LCD. |
| 4 | LCD driver U1 | Defines the display on the LCD. |
| 5 | Switches Read Enable | Allows the microcontroller to scan the 8 external push button switches. |
| 6 | Lensometer controls | Includes the contrast control, LCD back light control, LCD reset, calibration enable, sound control, and the projector LEDs content. |
| 7 | Load Switches | When selected, the condition of the 8 push button keys is loaded to the shift register. |

2.4.3. Push button keys read function

The push button keys function is shown at the bottom left part of FIG. 24A (the keys are physically drawn in FIG. 18). Each of the keys 51, 52, 54–59 is an input to an eight bit parallel load shift register 232 (U4). The microcontroller 180 periodically reads the push buttons to check whether a button was pressed by the user. The read operation is a serial read which is similar to the serial load, and includes the following steps:

1) The microcontroller sets the 3 'select' inputs of U3 (se10, se11, and se12) to the value of 3 which cause the Y3 of the selector (U3) to become active (low). This operation loads the state of all switches to the shift register.
2) The microcontroller releases the condition of 'load serial' by loading 0 to the selector. 3) The microcontroller sets the selector to value 4 which enables the serial read operation (release the clock inhibit input of the U4).
4) The microcontroller reads the value at its input port (module port MISO, net called DATAOUT).
5) The microcontroller toggles the serial clock (module port SCK, net called SERCLK) to high value and then low. This operation causes the data in the shift register to move one cell and to present the next switch on the MOSI line.
6) Steps 4 and 5 are repeated 8 times until all switches have been read.
7) The microcontroller sets the selector inputs to value 0 for no operation.

2.4.4. LCD Contrast Control

The user can change the contrast of the LCD illumination to achieve maximum display clarity. The change in contrast is achieved by changing the voltage of VLCD3 (pin 5) of the LCD drivers 196 (U1, U23 and U24). The variable voltage to VLCD3 is set by the loaded bits Qa to Qd in 230A or U7. These four bits provide 16 steps of contrast. The value that is loaded to Qa, Qb, Qc, and Qd is fed to 4 inverters 234 (U8A, U8B, U8C, and U8D) that are feeding a resistor network 236 (R34, R35, R36, and R37), forming a basic 4 bit D/A function.

2.4.5. Sound Control

The Lensometer is equipped with a small speaker to provide audible indication to the user. The microcontroller has 2 bits to control the audible alarm: (1) the 'sound' enable which starts generation of a continuous tone, and (2) the 'High Pitch' bit, when this bit is set the sound is generated with higher frequency. The circuit contains a buffer/inverter 238 or U8E, and a tone oscillator 240 (U9) (See FIG. 24B). The tone frequency change is achieved by changing the time constant of the oscillator through the diode D29. The sound is delivered through a 100 ohm resistor to the module port designated 'SPKR', the speaker itself is located on the projector board.

2.5. Main Board (FIG. 17)

FIG. 17 contains the sub-schematic of the DC/DC converter (shown further in FIG. 20) that provides most of the necessary voltages used by the Lensometer. The microprocessor, also referred as microcontroller (shown in FIG. 19), the image processor (FIG. 21), and the CCD Imager drivers (FIG. 22) are also described here as sub schematics. The header JP11 (242) and ground pin JP1 connect the main board with the CCD board.

2.5.1. CCD imager connector

The CCD imager connector 244 (JP1), the same as header 242 (JP1) in FIG. 17, is described in the table 4 (see also FIG. 23).

TABLE 4

| | CCD Imager Connector 242 (JP11) | | |
|---|---|---|---|
| Pins | Name | I/O | Description |
| 1 | C1 | In | Serial CCD Data line (1 of 3) that contain the |

TABLE 4-continued

CCD Imager Connector 242 (JP11)

| Pins | Name | I/O | Description |
|---|---|---|---|
| 3 | C3 | In | Serial CCD Data line (1 of 3) that contain the picture's data. |
| 5 | C2 | In | Serial CCD Data line (1 of 3) that contain the picture's data. |
| 14 | DPI | Out | Shift CCD image to storage area located on CCD device below image area. |
| 12 | DAB | | Anti-blooming clock to improve CCD performance. |
| 10 | DPS | | Shift image from storage area on CCD to the output register |
| 8 | DS3 | | One of three phases of image read-clock in CCD device |
| 6 | DS2 | | One of three phases of image read-clock in CCD device |
| 4 | DS1 | | One of three phases of image read-clock in CCD device |
| 2 | DT | | Push image row to three phases of image shift register in CCD device. |
| 18 | VCC2 | | 5 Volts supply. |
| 16 | P12C | Out | 12 Volts supply. |
| 7 | DA1 | Out | D/A output for the CCD threshold (bit 1). |
| 9 | DA2 | Out | D/A output for the CCD threshold (bit 2). |
| 11 | DA3 | Out | D/A output for the CCD threshold (bit 3). |
| 13 | DA4 | Out | D/A output for the CCD threshold (bit 4). |
| 15 | DA5 | Out | D/A output for the CCD threshold (bit 5). |
| 17 | DA6 | Out | D/A output for the CCD threshold (bit 6). |
| 19 | DA7 | Out | D/A output for the CCD threshold (bit 7). |
| 20 | N7V | | −7 Volts supply. |

2.6. Main Board Portion 7 (FIG. 20)

FIG. 20 contains the circuit of the power supply that includes the voltage regulators, the transformer, the switching mechanism and the sleep-mode control.

2.6.1. Voltage Regulator and Transformer

The main IC that is used is the 'Step-Up Switching Regulator' 248 (U11). The purpose of this IC is to provide an accurate AC source for the transformer T1 to generate the various required voltages. The current source to the power supply is the DC power supply (VBAT, also called $V_{CC}A$). The input voltage drives regulator 248 (U11) to switch the FET gate Q5 and generate the required square wave AC signal to the transformer primary side.

The secondary side of the transformer generates the voltages required by various parts of the Lensometer, some are switched and turned on only during measurement. The following is a list of the generated voltages:

TABLE 5

Voltages Generated by the DC to DC Converter

| Name | Voltage (Volts) | Comments |
|---|---|---|
| P12V | +12 volts | continuous |
| P12C | +12 volts | switched |
| P1V5 | +1.5 volts | switched |
| N7V | −7 volts | switched |
| N9V5 | −9.5 volts | switched |
| VCC | +5 volts | continuous |
| VCC1 | +5 volts | continuous, for microcontroller |
| VCC2 | 5 volts | switched |

2.6.2 Power Supply Regulation

The power supply regulation is achieved by sensing the VCC, and feeding it back to the regulator to pin VFB (pin 7) of regulator 248 (U11). If VCC is too high, the driving of Q5 stops momentarily, until VCC returns to the desired level. All other voltages are also regulated indirectly, by the virtue of being fed from the same transformer T1 as the regulated VCC winding. This technique is used to ensure that all the voltages will be set accurately following this voltage.

2.6.3. Switching Mechanisms

As shown in the above table 5, all the voltages to the CCD Imager 90 can be switched off. These voltages are needed for a short period of time during measurement only. Switching the voltages is performed by the PB line (top left corner of FIG. 20) that is generated by the Image Processor 250 and stays active (high) during the whole measurement cycle. When PB is active, transistor Q9 is turned on, which turns on transistor Q7, that turns on the +12 volts to the imager. This 12 volt line is also connected to the gate of Q13, that turns on the 1.5 volts, and to the gate of regulator 248 (Q11) that pulls down terminal number 5 of the transformer T1 that causes the negative voltages −7 and −9.5 volts to become active. VCC2 which is the imager +5 volts supply (at the bottom right corner) is also controlled by the 12 volts that activates the gate of Q8.

2.7. Main Board Portion 8 (FIG. 21)

FIG. 21 contains the crystal oscillator 127, the image processor 250 and the random access memory 252 that is used by the microcontroller 180 and the image processor 250.

2.7.1. Crystal Oscillator

The 8 MHz crystal oscillator 127 (U14), serves both the image processor 250, and the LCD clock (described with FIG. 24).

2.7.2. Image Processor

The image processor 250 (U12) is a field programmable gate array ACTEL 1020. The content of the image processor and the processing algorithm are described elsewhere. The image processor's left side is basically connected to the microprocessor 180 with data lines, address lines and controls, these are described with some more details in the microprocessor section (FIG. 19). The image processor 250 generates all the necessary timing signals to the CCD 90 (right bottom of U12), and receives the 3 serial inputs C1, C2, and C3 that actually contain the digital description of the picture.

The signals that are generated by the image processor 250 and are used to drive the CCD via drivers (FIG. 22) are as follows:

TABLE 6

| The signals driving the CCD drivers | |
|---|---|
| Mnemonic | Name/Description |
| ABIN | Anti-Blooming Clock |
| PI | Imager Clock |
| PS | Storage Clock |
| T | Transfer Gate Clock |
| GT | Vertical Retrace |
| S1, S2, S3 | Serial Image read Clocks |
| PB | Power ON video circuitry |

2.7.3. Random Access Memory

The image processor is also connected to a Random Access Memory 252 (U13) that contains 8K bytes of data. During normal operation, the image processing function of the image processor 250 is disabled and the microcontroller 180 can access the 8K bytes memory 252. During measurement, which requires capture of a picture, the image processor takes priority of the memory and writes the processed image data to the memory. At the end of the measurement, the image processor 250 becomes inactive again, and the captured data in the memory is available to the microcontroller 180.

2.7.4. Calibration Provisions

During calibration of the CCD 90, as part of the manufacturing process, it is necessary to have a memory that is larger than the memory provided on board. For the calibration process, a special IC clip is hooked on top of the memory device 252 (U13), and connects to a special board that contains a control circuit and 32K RAM. Pin number 1 of RAM 252 (U13) which is usually not connected is used by the microcontroller 180 to clear the calibration control circuit. The calibration clip connects pin 22 of the onboard RAM 252 (U13) to ground to disable the on-board memory chip. During the calibration process, the microcontroller 180 also sets the image processor 250 to its calibration mode, and the data captured during these measurements is loaded to the external memory instead of the on-board memory. After the measurement, the microcontroller 180 can reset the external memory control and can read all the externally stored data in sequential order.

2.8. Main Board Portion 6 (FIG. 22)

FIG. 22 contains the drivers to the CCD imager 202, and the CCD voltage adjustments.

2.8.1. CCD Imager Drivers

The circuit contains two specific devices that are tailored to drive the Lensometer's CCD imager 202. The parallel driver 254 (U15) translates the parallel sync pulses that drive the CCD to the analog voltages DAB, DPI, and DPS that are required by the CCD specifications. The serial driver 256 (U16) drives the clocks that are 'pushing' the picture into the serial data lines for readout. The driving signals that enter the left side of FIG. 22 are generated by the image processor 250 and described along with the image processor description related to FIG. 21.

2.8.2. CCD Imager Voltage Adjustment

There are three adjustment potentiometers that set the voltages to the driver 254 (U15) during production of the Lensometer in order to match the performance to the specific CCD that is installed in the Lensometer.

2.9. Main Board Portion 9 (FIG. 19)

FIG. 19 contains the microcontroller 180 (U20), the address Latch 258 (U17), the program memory 260 (U19), the D/A latch 222 (U18), and optional TTL serial communication channel 262, 264 (JP8, and JP13).

2.9.1. Microcontroller

The microcontroller 180 is a Motorola 68HC11 which includes the following basic characteristics:
512 bytes RAM
512 bytes EEPROM (Electrically Erasable Read Only Memory)
Address, Data and I/O PORTS, allowing access to external memory
8 Analog Ports with internal A/D Converter Controls. The basic clock oscillator is generated inside the microcontroller 180 using an external 13.2 MHz crystal (Y1). The microcontroller can be reset externally by the _RESET line, this reset causes a complete initialization of the microcontroller on power up.

The following is a list of all the external ports of the microprocessor 180 and their uses, the list of ports can give the reader a better understanding of the available control and status. Some of these lines are explained elsewhere where used.

TABLE 7

| Microcontroller Input/Output Ports | | | |
|---|---|---|---|
| Port | Name | I/O | Description |
| PA0 | CPTTL | Input | Reads Command/Printer status of the RS-232 bus |
| PA1 | MEASURE | Input | Reads measure request from projector board or foot switch |
| PA2 | _BUSY | Input | Monitors readiness of LCD drivers |
| PA3 | Select0 | Output | The select lines are used to control which device is accessed by the serial load/ read mechanism (explained in detailed in FIG. 24). |
| PA4 | Select1 | Output | The select lines are used to control which device is accessed by the serial load/ read mechanism (explained in detailed in FIG. 24). |
| PA5 | Select2 | Output | The select lines are used to control which device is accessed by the serial load/ read mechanism (explained in detailed in FIG. 24). |
| PA6 | PWM | | Unused |
| PA7 | SLEEP | | Unused |
| PB0– PB7 | MAH0– MAH7 | Output | This port contains the 8 higher bits of the 16 available address bits supported by the microcontroller. |
| PC0– PC7 | D0–D7 and MAL0– MAL7 | Input/ Output | This port is multiplexed between the lower |

TABLE 7-continued

Microcontroller Input/Output Ports

| Port | Name | I/O | Description |
|------|------|-----|-------------|
|      |      |     | 8 bits of the address bus and the data bus (see description under Address Latch) |
| PD0  | MRXD | Input | Serial UART receive line (details in FIG. 16) |
| PD1  | MTXD | Output | Serial UART transmit line (details in FIG. 16) |
| PD2  | MOSI | Input | Defined as an input to sample the serial read of the push button switches |
| PD3  | MISO | Output | Defined as an output and used for the serial load data |
| PD4  | SCK  | Output | Serial clock used by the serial load and read control (details in the chapter of the serial read mechanism, FIG. 24) |
| PD5  | SS   |        | Indicates LCD command or data (FIG. 24) |
| PD6  | E    | Output | Continuous clock from the microcontroller that times the read/write cycles. |
| PD7  | AS   | Output | Control signal used to latch the lower address lines with and external latch (see Address Latch description) |
| PE0  |      | Input  | Analog minitoring 12V voltage |
| PE1  |      | Input  | Analog monitoring of 1.5V voltage |
| PE2  |      | Input  | Analog monitoring of −7V voltage |
| PE3  |      | Input  | Analog monitoring of −9.5V voltage |
| PE4  |      | Input  | Analog monitoring of base voltage, can indicate if Lensometer plugged to base |
| PE5  |      | Input  | Analog monitoring of power supply voltage P9V |
| PE6  |      | Input  | Unused |
| PE7  |      | Input  | Unused |

2.9.2. Address Latch

The microcontroller 180 drives the 8 lower bits (MAL0 to MAL7) of the address on the same lines with the data bus D0 to D7. When the address lines are driven out (on the lines designated as D0 to D7 in U20), the microcontroller also activates the AS signal (pin 4 of U20), which cause this data to be latched into the address latch 258 (U17). The controller then can send data on the data lines to the desired address or receive data through these lines.

2.9.3. Main Program Memory

The main program memory is a 64K bytes Erasable Read Only Memory EPROM 260 (U19). This memory is connected directly to the microcontroller 180 and accessed solely by the controller. Most of the Lensometer software is stored in this EPROM.

2.9.4. D/A Latch

This latch 222 (U18) is used to hold the value of the D/A that controls the CCD threshold. The latch is connected to the microcontroller data bus and loaded by a signal decoded in the image processor 250, called _DAEN (for additional details see the CCD board description). The least significant bit of this latch is not related to the D/A operation. Instead, this bit controls the RS-232 bus access, as explained regarding FIG. 16.

2.9.5. TTL Serial Communication

The serial communication lines to receive and transmit are normally routed to the RS-232 converter (see FIG. 16), however, during calibration or test, the manufacturer can connect a TTL serial connection through the headers 262, 264 (JP8, JP13). Header 264 (JP15) is a jumper to set the serial input. If the data source is a TTL level signal, the jumper connects pins 1-2; if the source is an external RS-232 signal, the jumper connects pins 2-3.

3. CCD Imager Board Schematics Description (FIG. 23)

The CCD Imager Board is located at the top of the Lensometer, it contains the CCD imager device 202, the analog amplifiers of the three video channels, the threshold circuit, and the D/A that sets the sensitivity level of the comparators.

3.1. Connection Header

The electrical connection of the imager board to the main board is handled through the header 244 (JP1). This header is detailed in FIGS. 17 and 23, mating with header 242 (JP11). The ground connection to the board is connected through a separate jack (J1).

3.2. The CCD Imager

The imager 202 (U1) is the basic element of a video camera, it provides a full picture of the reflected light source through the measured lens. The image result, which is the intensity of each of the imager sense points, is shifted out of the device through the outputs V01, V02, and V03. These serial lines are actually analog signals that represent the intensity of each pixel. The serial analog output from the imager is amplified by the operational amplifiers U5, U6, and U7 by a factor of about 10, and then compared to a threshold value by the comparators U4A, U4B, and U4C. For each comparator, if the amplified signal at the input to the comparator (pin 1) is lower than the threshold value in pin 2, the output of the comparator is negative, which means that a true signal was detected.

3.3. Threshold D/A

The threshold is needed to adjust the sensitivity of the reading with regard to the specific imager and the ambient light conditions. The Lensometer is adjusting this value automatically. The threshold is a digital voltage that is generated by the Digital to Analog converter 266 (U2). The input to the converter is a 7 bit word from a latch (described regarding FIG. 21). These 7 bits control the output analog voltage in pin 8 of the D/A.

3.4. Voltage Regulator

The voltage regulator 268 (U3 at the bottom of FIG. 23) is responsible for regulating the negative 5 Volts for the amplifiers and the comparators, it uses the negative 7 Volts as a source.

3.5. Serial Shift Jumpers

Two 3-pin jumpers JP2 and JP3 bridge the three serial image readout clocks S1, S2 and S3 from the connector 244 (JP1) to the imager 202 (U1). These digital signals are active during image readout, thus they may induce noise to the analog section (U5, U6 and U7). To reduce this interference, external jumper cables are used between 244 (JP1) and 202 (U1).

4. Projection Board (FIG. 28)

The Projection Board provides input/output functions to the Lensometer.

The input functions of this board are a MEASURE switch and _RESET switch.

The output functions are the speaker (SPK1), and LEDs. All of the output functions are controlled by a serial data stream, coming from the Main Board to output SER of U1 (a VCN5812 AF). Outputs O1 through O10 of U1 control the projection LEDs. The remaining outputs control four arrow-shaped light-emitting diodes, displaying the direction to move the lens for centration, and a square shaped green diode for indicating good lens alignment.

AUTOMATED LENSOMETER IMAGE PROCESSOR DESCRIPTION

1. Introduction

1.1 General and Scope

The image processor is designed using a field programmable gate array. The design technique is very similar to a regular logic design using schematic entry, simulation, and then compilation and programing into the device. The image processor 250 of the Lensometer contains three basic parts: the microcontroller, the CCD timing generator and the image processing circuit.

1.2. Schematics Organization

Figure 35:
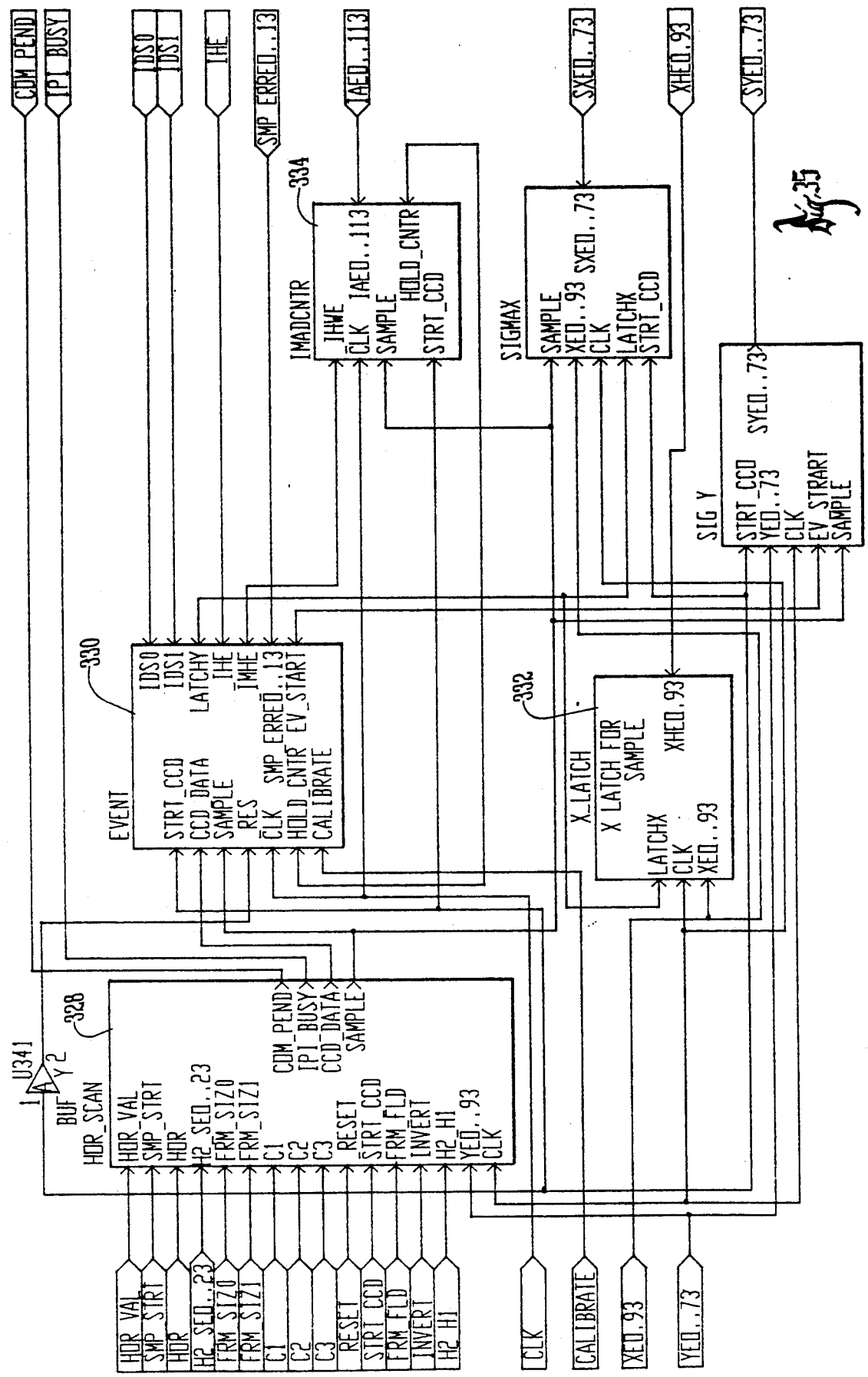
FIG. 35 is a diagram of the image processing circuit.
Figure 36:
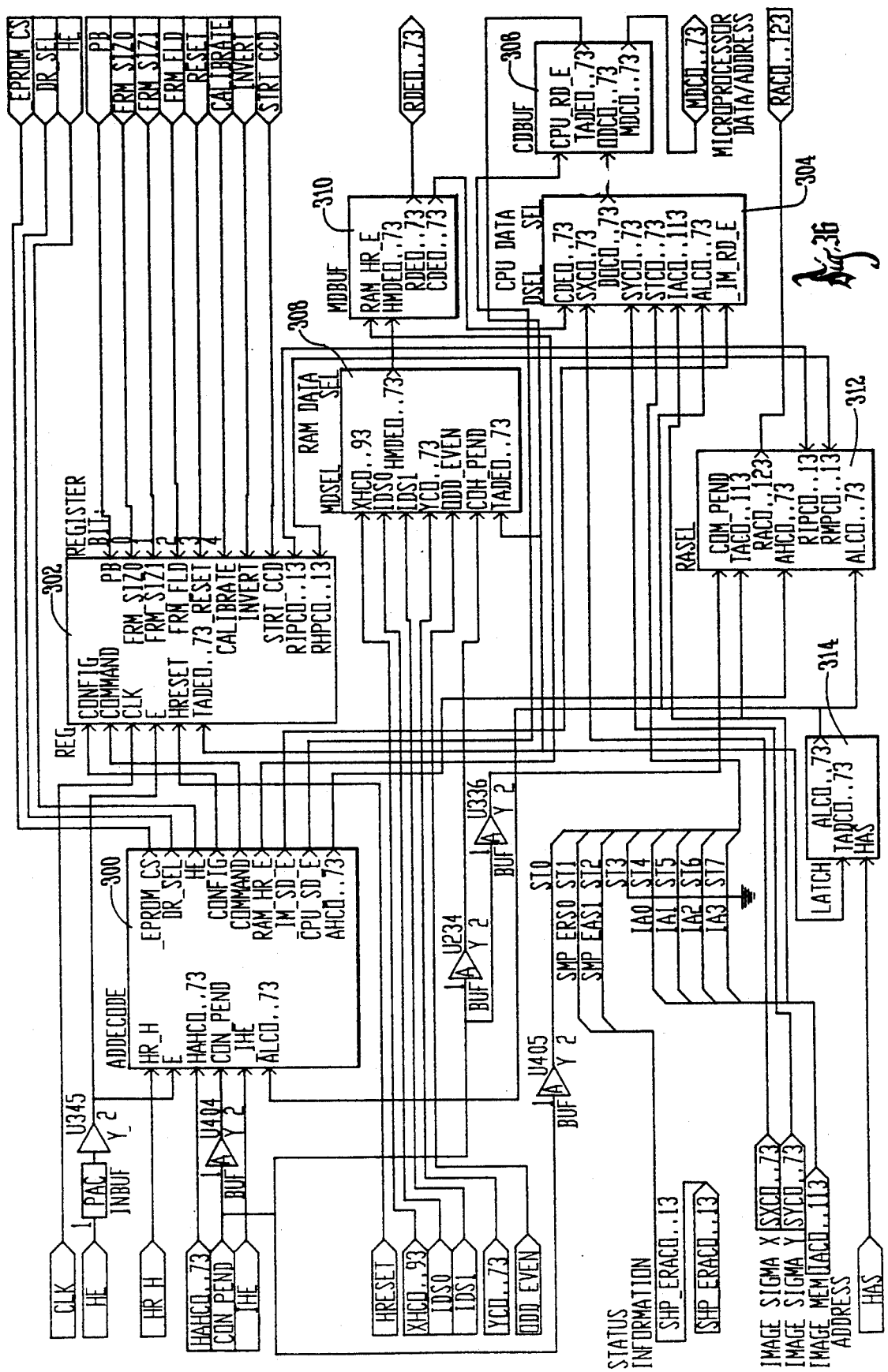
FIG. 36 is a diagram of the image processor's microcontroller interface.
Figure 37:
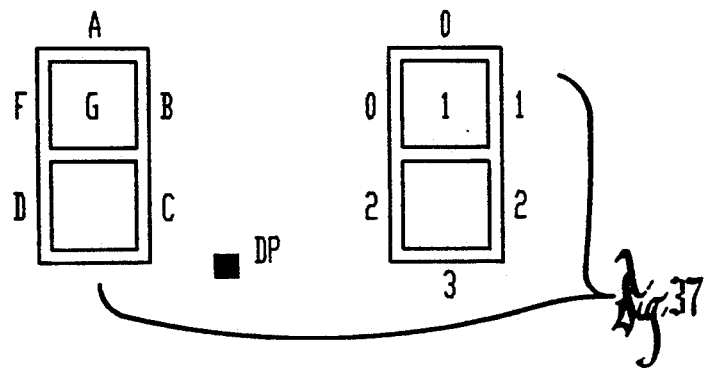
FIG. 37 illustrates the seven segment LCD display layout.

This description relies on 4 basic schematic figures, the top level (FIG. 33) that contains three main blocks designated as: MICRO 294 (FIG. 36), CCD_CONT 296 (FIG. 34), and IMAGE 298 (FIG. 35). Each of these blocks represents the level of detail that is described according to the scope of this section.

2. Microcontroller Interface Section (See FIG. 36)

The microcontroller interface is responsible for the address decoding, latching the lower byte of the microcontroller data bus, and interfacing the data and address between the microcontroller 180 and the memory.

2.1. Address Decoder 300 (ADDECODE Block)

The address decoder serves the whole Lensometer circuit and not just the image processor; it decodes all the addresses that are part of the memory map of the microcontroller. The functions that are addressed are as follows:

The program memory 260 (EPROM) which contains the program to run the microcontroller.

The Random Access Memory 252 (RAM) that stores operational variables needed by the microcontroller and the image processing results, also referred to as the Image RAM.

The digital to analog converter 266, used as threshold for the CCD Image Processor 250.

The command register, internal to this image processor 250 which controls the operational modes of the image processor.

The image processor status read, a register that provides status results of the image process.

2.2. Image Processor Command Registers 302 (REG Block)

When the microcontroller 180 writes to this register, the measurement operation begins with the parameters that are loaded at the same time. The microcontroller 180 can set the following operational parameters: frame size to be scanned (wide or narrow), whether only one field is scanned or a complete frame, whether it is a normal measurement or a factory calibration, and whether to invert the light and dark signals (if inverted then the meaning of light and dark is swapped).

2.3. Microcontroller Data Selector 304, 306 (DSEL and CDBUF Blocks)

The microcontroller data selector 304, 306 allows the controller 180 to read/write data in a few modes. During normal operation when a measurement is not activated, the microcontroller can use the RAM 252 through the image processor 202 and the image processor is basically disabled. Under specific status READ command, the selector provides the status information to the microcontroller on the data bus. During the short period of measurement time, i.e. image grabbing, the microcontroller data bus is disabled to allow the image processor to write to the RAM 252 and to load the status registers without interruption.

2.4. RAM Data Selector 308, 310 (MDSEL and MDBUF Blocks)

The RAM can be read or written by the microprocessor 180 when a measurement is not active, at that time the RAM data bus is connected to the microcontroller whenever the RAM is accessed. During measurement, the microprocessor path is disabled and the image processor drives the coordinates of the light spots identified into the RAM, the X and Y counters are routed to the RAM data bus as needed by the process algorithm (described in detail as part of the image processing algorithm section).

2.5. RAM Address Selector 312 (RASEL Block)

The RAM address selector, similar to the RAM data, is connected to the microcontroller as long as a measurement is not active. During measurement, the image processor's address counter is connected to the RAM to allow incrementing address as needed by the image processing algorithm.

2.6. Low Address Byte Latch 314 (LATCH block)

The latch receives the address/data bus and uses the AS microcontroller line to latch the lower byte of the address at the right time.

3. CCD Timing Generator Section (See FIG. 34)

The CCD timing generator provides all the timing signals needed by the CCD imager 202. The generator contains: the X and Y counters for the image scanning, the main state machine that controls the whole scanning cycle, and three generators for the basic drive signals required by the CCD.

3.1. Main Counter 316 (MAIN_CNT Block)

The main counter provides the horizontal count of the sampling points within every row, the counter provides the 786 sampling points and other taps that control operations in the CCD. The counter also contains a Y counter of 244 odd or even lines (total of 288 lines). During the capture process of the picture, the event sampler uses these values of X and Y to store in the RAM as the coordinates of the event.

3.2. State Machine 318 (STATES Block)

The state machine controls the sequence of events during a measurement cycle. From the beginning of the operation, the state machine goes through the 'priming' process of the CCD Imager 202 and then through the scanning of all the even and odd lines of the picture. The state machine receives signals from the main counter indicating the end of scanning and changes its state according to the odd, even or other service cycles required by the CCD.

3.3. Vertical Signals Generator 320 (VERT_GEN Block)

The vertical signals are required after every field of 244 lines that is scanned, this block is responsible for generating the required timing for the odd or even vertical signals to allow proper operation of the CCD.

3.4. Horizontal Region 1 Generator 322 (H1_GEN)

Every line that is scanned in the CCD is required to have a special signal at the beginning of the horizontal scan before the picture is available at the outputs of the CCD 202. This block generates the first 31 samples (first region) of every scan that are actually not seen as part of the picture to allow proper operation of the rest of the picture.

3.5. Horizontal Region 2 Generator 324 (H2_GEN)

The second region generator is responsible for "pushing" the picture out of the CCD; it provides the exact number of pulses required to receive one line of the picture.

3.6. CCD Timing Selector 326 (V_H_SEL Block)

The CCD timing selector is responsible for selecting which of the above generated 3 signals should be sent at any time to the CCD. The decision is made by the state machine that controls a set of selectors that route the appropriate generated signals to the CCD. The result is the actual lines that are sent to the CCD drivers 254, 256.

4. Image Processing Section (See FIG. 35)

This section of the image processor covers the actual image processing. For further understanding of the image process algorithm, reading the Image Processing Algorithm section is recommended. This section contains the processing control, the event processing, the X value latch, and the image counter. There are two blocks that were used to accumulate the X and Y values called SIGMAX and SIG_Y that appear in the schematics, but are not used.

4.1. Image Processing Control 328 (HOR_SCAN Block)

This block is responsible for the actual picture capture, it evaluates the requirements that are loaded by the microcontroller as to whether to sample a single frame or the whole picture, and the actual frame size, and then enables the data to flow to the event processor. This block also supports the increments of the memory counter as required. When the measurement operation is completed, this block flags the microcontroller that the operation is complete.

4.2. Events Processing 330 (EVENT Block)

The event processing block is divided into three consecutive sub blocks: the digital filter, adaptive filter and the sampler. The operation of these blocks is described in detail as part of the image processing algorithm section.

4.3. X Latch 332 (X_LATCH Block)

The X latch is used to hold the value of the x coordinate counter to ensure a stable write to the memory while the picture is processed. The latching of the X value is required since the write operation to the memory requires two consecutive write operations, and the second part of the written X is kept to prevent corruption of the value.

4.4. Image Counter 334 (IMADCNTR Block)

The image counter is responsible for generating the address of the RAM while the picture is processed. At the end of the process, the counter keeps the last address that was used and the controller can read this value and use it to know how many events were processed during that cycle.

IMAGE PROCESSING ALGORITHM

5. Introduction

The image processor circuit is implemented into a single field programmable gate array device. It contains three main parts: The microcontroller interface, the CCD Imager timing generator, and an image processor (see FIG. 33 at 294, 296, and 298). This section describes the algorithm that is implemented as part of the image processor device that processes the data scanned by the CCD imager 202 located at the top of the Lensometer.

6. High Level Description

The CCD imager 202 can scan an entire picture that contains two fields: the first field contains all the odd lines, while the second field contains the even lines of the picture. The microcontroller 180 commands the image processor 250 whether to select only one field or an entire picture (two fields) for every required measurement. The role of the image processor is to process the whole picture (or frame) in real time, to identify the light spots' locations as sensed by the CCD camera 54 and to fill a memory with the accurate XY coordinates and size of these light spots. After the measurement, the microcontroller can read the captured samples from the memory and analyze the required parameters using these coordinates. The image processing algorithm can be described as a multiple stage sequential process, each stage in the process performs one operation on the serial data received from the previous stage. The process is described in FIG. 30.

7. Image Memory Map

The processed data is written by the image processor 250 into a Random Access Memory 252 (FIG. 21) (RAM) according to identified events in the data stream. An event is defined as a single light spot that includes the transition from dark to light and then from light to dark. These transitions are sampled after the data has been filtered through the digital filter, and the adaptive filter (explained later). The memory is arranged in groups of six bytes, each group describes one event and is defined as follows:

TABLE 8

| Byte in Group | Image Memory Content | |
|---|---|---|
| | Mnemonics | Description |
| 0 | XAH | Start of light, high byte |
| 1 | XAL | Start of light, low byte |
| 2 | YH | Row Number, high byte |
| 3 | YL | Row Number, low byte |
| 4 | XBH | End of light, high byte |
| 5 | XBL | End of light, low |

TABLE 8-continued

| Byte in Group | Image Memory Content | |
|---|---|---|
| | Mnemonics | Description |
| | | byte |

Since the picture is scanned in rows, every event will start and end on the same row, a complete light spot will usually be spread over a few lines and represented by more than one group in the memory.

8. Input Data Structure

Figure 30:
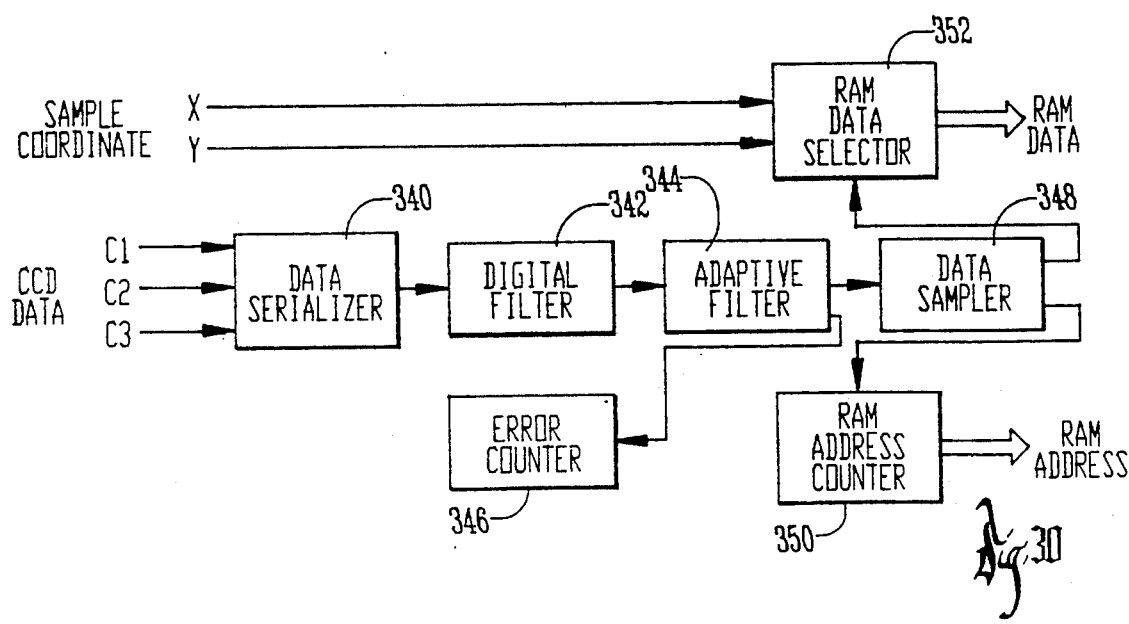
FIG. 30 is a block diagram of the image processing algorithm.
Figure 33:
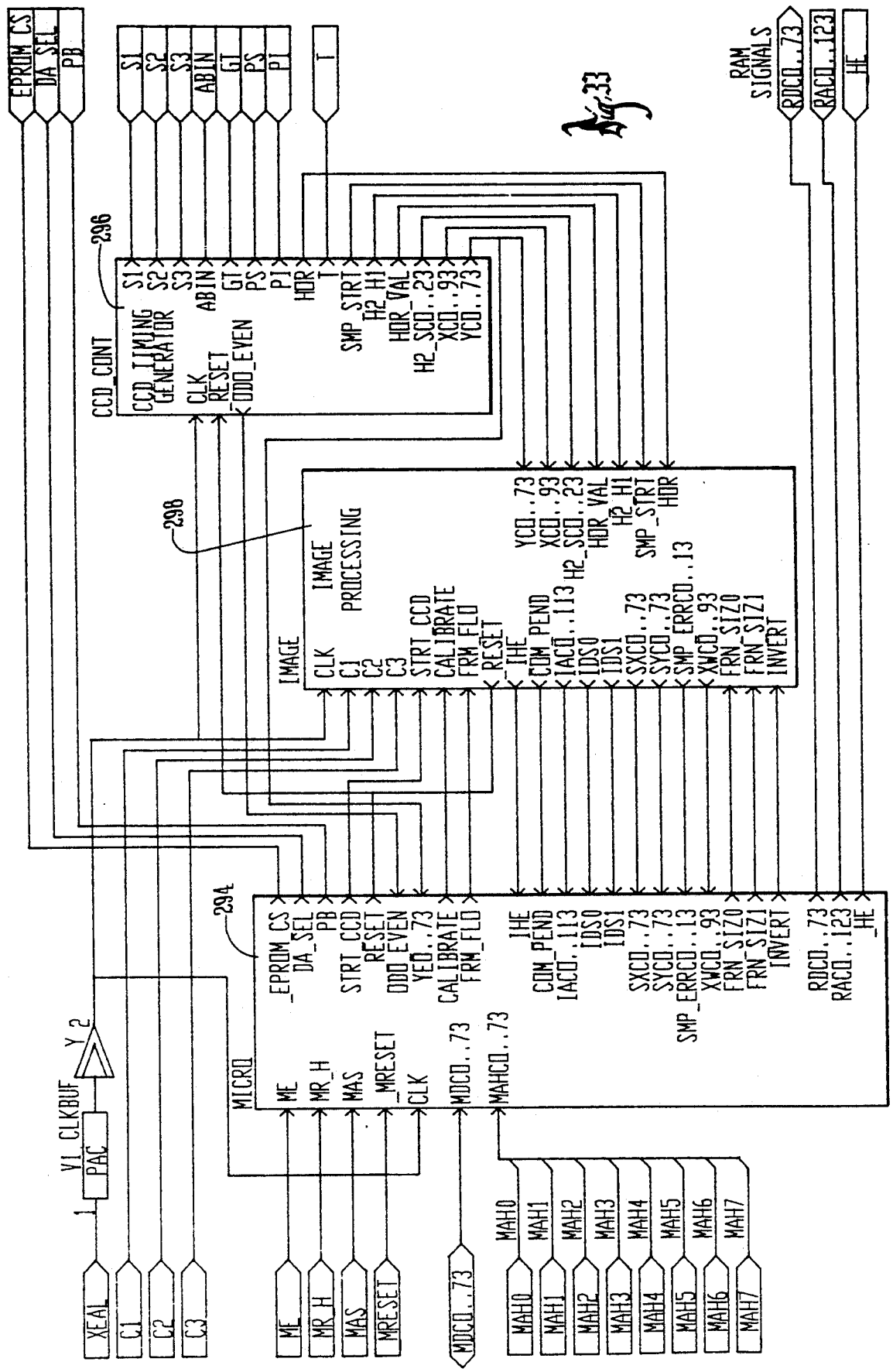
FIG. 33 is a high level description of the image processor chip.
Figure 34:
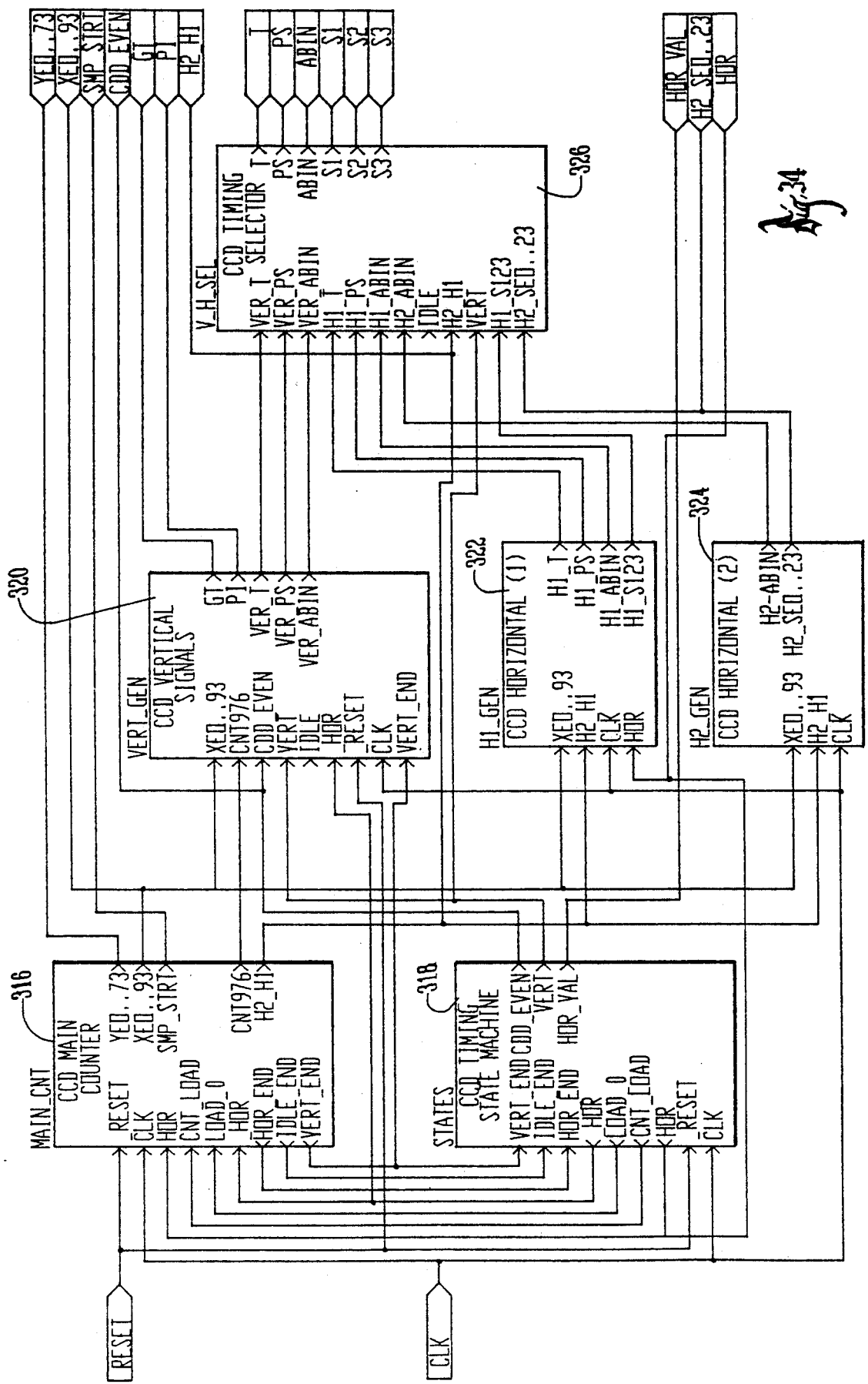
FIG. 34 is a block diagram level description of the CCD timing signals generator.

The input data is received by the image processor 250 as 3 serial lines sent from the imager board (C1, C2, and C3 in FIG. 30). These data lines contain serial data multiplexed between the three lines as shown in FIG. 31.

The data from the imager is already digitized as explained in the circuit description of the CCD Imager Board. If a 1 is found it means that the point had light in it, if it was 0, it means that there was no light at that point.

9. Serializing the Data Stream (FIG. 30 at 340)

The first operation of the image processor 250 is to combine the three input data lines into a single serial data stream. The serializer 340 samples the three input lines in a cyclic order (as shown in FIG. 31) while synchronizing the sampling with the clocks that are sent to shift data from the imager 202.

10. Digital Filter Stage (FIG. 30 at 342)

The digital filter processes the data stream while searching for single bit elements that represent noise, or un-smooth transition between light and dark. The digital filter 342 always delays the data stream, and "looks" at the content of three consecutive data bits. If during a logic 0 stream, the data changes to 1, the digital filter checks the next data bit, if it is 0, then the first 1 is considered to be noise and replaced with a 0. If the next bit is also 1, it means that this is a level change, and the first bit is not changed. The following table shows all the possible cases of 3 consecutive bits and how they are processed by the digital filter (the left bit is the first to enter the filter):

TABLE 9

| Digital Filter Transfer Function | | |
|---|---|---|
| Input | Output | Comments |
| 000 | 000 | Stream of 0, no change |
| 001 | 001 | Beginning of transition to 1, or noise, have to wait for next bit |
| 010 | 000 | Noise of 1 in a stream of 0 |
| 011 | 011 | Normal 0 to 1 transition |
| 100 | 100 | Normal 1 to 0 transition |
| 101 | 111 | Noise of 0 in a stream of 1 |
| 110 | 110 | Beginning of transition to 0 or noise, have to wait for next bit |
| 111 | 111 | Stream of 1, no change |

11. Adaptive Filter (FIG. 30 at 344)

The adaptive filter 344 is the next stage after the digital filter 342. According to the memory description above, when an event is identified, there are 4 write cycles to the memory on the dark to light transition (the first 4 locations), and then two more write cycles for the transition from light to dark, which brings the total of memory write cycles for every event to 6. The shortest event that is allowed after the digital filter contains 2 light bits. The next event can only occur after 2 dark bits; it means that in the extreme case of repeating consecutive 2 bits of light followed by 2 bits of dark, there are only 4 bit slots available for each event. The memory write cycle takes the same time as a single bit, which means that in this extreme case, the information can not be written accurately to the memory without losing information. Under normal circumstances, the distance between light sources is known, and much larger than two bits, and the extreme situation is not supposed to occur. In order to cover this extreme case, the adaptive filter is constantly monitoring the data stream to check whether there will be enough time to write all the information without losing anything.

If the adaptive filter 344 finds a violation that will not allow 6 memory cycles for an event, it will slightly change the bits in the sequence to follow the 6 bit cells rule. The design also contains a 2 bit error counter 346 associated with the adaptive filter (shown in FIG. 30). When there is a violation of the 6 bit cell rule, and the adaptive filter has to change a data bit, it also increments the content of the error counter. This counter is designed to be cleared at the beginning of the measurement, and when the counter reaches 3, which is the maximum possible value for a 2 bit counter, it stays as 3. After the completion of a measurement, the content of the error counter is available to the microcontroller. If the value is not 0, the controller knows that a violation has occurred. As stated above, under normal circumstances this correction is never activated and the violation only occurs with extreme noise or during a threshold adjustment.

12. The Data Sampler (FIG. 30 at 348)

The data sampler 348 is responsible for the sampling of the data, incrementing the memory address counter 350, and selecting (see RAM Data Selector 352) the source of data (X and Y coordinates) to be written to the memory. The sampler "looks" at the data stream following the adaptive filter which ensures that there is always time for at least 6 cycles of memory writes. The following is a more detailed sequence of events performed by the sampling process:

Wait for transition from dark to light,
    When found:
        Write X address high byte (and increment memory address)
        Write X address low byte (and increment memory address)
        Write Y address high byte
        Write Y address low byte
Wait for transition from light to dark
    When found:
        Write X address high byte (and increment memory address)
        Write X address low byte (and increment memory address)
Check if address is at the maximum allowed,
    if not: start again,
    if end of memory: stop sampling.

LENSOMETER OPERATION

13. Introduction

13.1. General

This section describes the operation of the Lensometer Circuit.

13.2. Scope

The operation of the Lensometer is controlled by the software residing in the EPROM 125 (FIG. 14B), and by the hardware executing it. This document describes the hardware operation, by means of examples.

14. Startup Description

When the power is first attached to the Lensometer, a power-on reset occurs. The voltage regulator 248, FIG. 20, U11, detects low voltage at pin 1 LBI since C50 is not charged yet. This triggers pin 2 LBO of regulator 248 (U11) to reset the circuit. The microcontroller 180 (U20) FIG. 19, senses the reset at pin 17, and goes to reset mode, which includes initial test of the various subsystems.

Once the power is on, the microcontroller starts to execute code from the EPROM. This code (software) initializes all desired registers in the system, performs self test, etc. An example of the self test is the reading of voltages at ports PE1 through PE5 (U20), and verifying that all of these voltages are within acceptable range. At the end of this reset period, the microcontroller 180 waits for user's requests from the keyboard 188, and if none exists, it enters a waiting loop, in which most of the power to the analog sections is turned "off" by forcing the signal PB (FIG. 21) to become LOW.

15. Measurement Operation Description

Assume that the Lensometer is in a waiting mode. The microcontroller's software polls the keyboard operation to wait for user's keystrokes. Suppose that the user presses the LEFT LENS key on FIG. 18. The signal K1 goes HIGH, leading to device 232 (U4) at the bottom left of FIG. 24. The microprocessor outputs a serial clock via pin PD4 (U20 FIG. 19), which reaches device 232 (U4), causing it to shift all eight bits to the line DATAOUT, also called MISO, which reaches the microprocessor's serial port PD2 pin 22. The microprocessor 180 reads this byte, and the program detects a HIGH in the bit position related to LEFT LENS. This causes the program to update its content, including updating the LCD display to show the symbol of a left lens. This display update is done by setting the SEL0 through SEL4 signals on FIG. 24, (coming from the microcontroller 180) near device 228 (U3) to binary 001, causing Y1 (pin 14 of U3) to go LOW and thus selecting U1, the LCD driver 196A (FIG. 24B). Now a sequence of bits arrives from the microcontroller via the MISO line, which is written into driver 196A (U1). This bit stream includes the appropriate command to turn ON the LCD segment on LCD 272 (U22) that shows a left lens symbol. In addition, the user gets an audible beep to indicate that the key has been read. This is done by sending a similar serial bit stream to the shift registers 230A and B, comprising U7, U6 on FIG. 24A of the Main Board, and U1 (FIG. 28) on the Projection Board, and setting _SOUND pin 5 of U7 LOW, which activates the sound via U8E and U9 238 and 240, both at the top left corner of FIG. 24B. All of the other bits of U7, U6 (FIG. 24A), and U1 (FIG. 28) are also updated, but since there is no need to change them now, the software ensures that the bit stream sent to them is identical to their previous state, and only the sound is activated. After a brief period, another bit stream is sent, this time to turn the sound OFF, so that only a short beep is heard between these two shift register updates.

The user keeps pressing various buttons, causing the program to respond as needed. Eventually, the Measure key on the Projection Board FIG. 28 may be depressed, causing the start of a measurement process.

When starting the measurement process, the microcontroller writes to the image processor 250 (U12) FIG. 21, which is accessed as a memory address. Inside the image processor there are registers used for command/indication handshake with the microcontroller 180. The microcontroller writes the command to one of these registers to turn the power ON, which sets the signal PB U12 pin 3, arriving on top left of FIG. 21, which turns ON all power supplies. At this time, the image processor outputs also all the periodic signals necessary to read the video image, such as PI, PS, GT etc. and the CCD Board is fully active. After the voltages have settled, the microprocessor sends a bit stream to the register U7, U6 (Main Board) and U1 (Projection Board FIG. 28) as discussed above, but this time the desired combination of projection LEDs are turned ON. The user starts to align the lens. The microcontroller writes a "grab image" command to the image processor. The image processor grabs images by reading the inputs C1, C2, C3 (pins 63, 64, 65 U12 FIG. 21), and runs the internally built image processing algorithm, discussed in a separate section. As useful video information is detected, the image processor 250 writes this information to the image RAM 253 (U13) FIG. 21. This information relates to the location and sizes of light spots detected. When a full video frame process is complete, the image processor indicates completion status by changing a bit in an internal status register, which is polled by the microcontroller. The microcontroller now can read the RAM via the image processor, which acts at this time merely as a switch, connecting the microprocessor address and data busses with the image RAM busses. The RAM is also used by the microcontroller to store information needed for its programs, in memory areas not used currently for image grabbing. To assist this separation between information types, the RAM is arranged as four pages of 2K bytes each, of which only one page at a time is used for the image grabbing. The microcontroller can set image processor registers that will force it to store the next images at any of those pages, leaving the other three for general purpose storage.

After an image is grabbed and processed by the microcontroller's software, the microcontroller may decide to change the video threshold to get a better image, which is done by writing to the data latch 222 (U18) (See FIG. 19), which is enabled only by writing to address 2804 hex, this address being decoded internally by the image processor, which outputs the signal _DAEN, which is active high, leading to the latch U18 pin 11. The D/A combination eventually reaches the CCD Board, changing the threshold.

The microcontroller also checks for image centering and indicates correct positioning by an audible tone and a green LED. Once stable readings are read, the microcontroller takes measurements, which means turning OFF the peripheral projection LEDs, and turning ON only the four central projection LEDs, all of the above operations are done by modifying the content of the shift registers U7, U6 (FIG. 24A), U1 (FIG. 28). Now the last image is grabbed. Its contents are processed and the desired lens parameters are calculated and displayed on the LCD. At the program's discretion, several such measurements can be taken, to average out errors. The microcontroller returns to keyboard polling routine until another key depression is read, or, if none for a few moments, return to sleep mode.

16. Other Operations

By now, the reader is familiar with the principle of operation of the circuit. Generally, the microcontroller uses its data/address bus to access the EPROM for program instructions, the image processor for commands, status, and RAM reading, and using a serial port, it can modify the setting of any LED, the LCD, the speaker, and read the keyboard. The actual sequence of any operation is thus similar to the processes described above, wherein the microcontroller, under program control, accesses the desired device.

LENSOMETER SOFTWARE THEORY OF OPERATION

1. Overview

This section is gives a basic overview of the Lensometer target software. It describes the software environment, the basic I/O system, and the major aspects of the measurement process.

Anyone should find this section usable. Programming experience, although helpful, is not a prerequisite for understanding.

1.1. Lensometry in General

A lensometer is an optical instrument which measures the vertex power of a spectacle lens. A lens is characterized by a distance power, sometimes bifocal and trifocal additions, and prism. The measurement result includes the back vertex power in two orthogonal meridians which form an ellipse, the sphere portion of any adds present, and the prism at the point on the lens where the measurement was taken. The units used to report all results except axis orientation are Diopters. The axis is reported in degrees.

The instrument helps the user align the lens, and provides a printout of the measurement.

1.2. Measurement Method

The Lensometer can measure prescription lenses in the range −20 to +20 diopters. Bifocal and trifocal adds, progressive adds, and hard contact lenses may also be measured. Tinted lenses with attenuation less than 95% are measurable.

The Lensometer uses two "masks" with identical sets of nine spots which are projected onto a charge-coupled imaging device, or CCD. This image information is read out in a "raster" fashion, much like a regular television. The analog scan data is then thresholded to provide digital values, run length encoded and stored in RAM to be processed by the Lensometer's embedded processor.

The microprocessor groups the run length encoded data in an attempt to recreate the "spots," and computes the center for each of the "spots" detected.

It can be shown that any ellipse may be characterized when three points on its surface are known. The lensometer uses the positions of three or four spots to create three "synthetic" spots which characterize the lens power. Using synthetic spots improves the accuracy and noise immunity.

The distance lens power includes sphere and either + or − cylinder with + versus − being a user selectable option. Only the difference in sphere power is reported for adds since the cylinder in these areas should match that found in the distance area.

Prism is ordinarily specified as "base in" or "base out," and "base up," or "base down." The coordinate system used is Cartesian superimposed on the glasses. Prism can also be expressed as magnitude and angle in a cylindrical coordinate system. The units of prism are Diopters. The optical center is defined as the point on the lens where the prism is zero.

Problems such as dirty lenses, poor alignment, and significant attenuation can lead to measurement errors which the instrument attempts to detect and correct.

2. Hardware/Software Interface

2.1. Microcontroller 180

2.1.1. General

The software runs on a Motorola 68HC11E1 8-bit microcontroller unit (MCU). The HC11 is a high-density CMOS component with sophisticated on-chip peripherals, including:
Serial Peripheral Interface (SPI)
Asynchronous Serial Communications Interface (SCI)
512 bytes of EEPROM
512 bytes of static RAM
Eight-channel, 8-bit Analog/Digital converter
Real-time interrupt circuit
Enhanced 16-bit timer system
Power-saving STOP and WAIT modes
Small 52-pin plastic leaded chip carrier (PLCC)
3 MHz Bus speed
64 Kbyte linear address range
Full instruction set The 68HC11 operates in expanded mode, using external EPROM and scratch-pad memory. The system oscillator runs at 12 MHz, giving a 3 MHz (333 nsec) bus clock.

2.1.2. Pin Usage

The functions of the 68HC11 I/O pins are:

| Pin | I/O | Des I/O | Name | Description |
|---|---|---|---|---|
| PA0 | Input | Input | unused | |
| PA1 | Input | Input | MEASURE | Read key |
| PA2 | Input | Input | _BUSY:LCD 8 | Busy line from LCD controller |
| PA3 | I/O | Output | SEL0:LCD5 | Peripheral select line |
| PA4 | Output | Output | SEL1:LCD6 | Peripheral select line |
| PA5 | Output | Output | SEL2:LCD7 | Peripheral select line |
| PA6 | Output | Output | PWM:LCD4 | LED PWM signal |
| PA7 | I/O | Output | | unused |
| PBx | N.A. | [Upper address byte in expanded mode] | | |
| PCx | N.A. | [Multiplexed address/data lines in expanded mode] | | |
| PD0 | I/O | Input | RxD | SCI: receive data |

-continued

| Pin | I/O | Des I/O | Name | Description |
|---|---|---|---|---|
| PD1 | I/O | Output | TxD | SCI: transmit data |
| PD2 | I/O | Input | MISO:LCD0 | SPI: master-in slave-out |
| PD3 | I/O | Output | MOSI:LCD1 | SPI: master-out slave-in |
| PD4 | I/O | Output | SCK:LCD2 | SPI: serial clock |
| PD5 | I/O | Output | SS:LCD3 | SPI: slave select |
| PE0 | Input | Input | P12V | Plus 12.0 V supply test |
| PE1 | Input | Input | P1V5 | Plus 1.5 V supply test |
| PE2 | Input | Input | N7V | Minus 7.0 V supply test |
| PE3 | Input | Input | N9V5 | Minus 9.5 V supply test |
| PE4 | Input | Input | unused | |
| PE5 | Input | Input | unused | |
| PE6 | Input | Input | unused | |
| PE7 | Input | Input | unused | |

Note: PA3 is an output-only pin on the 68HC11A1/A8 part.

2.1.3. Memory Map
The memory is mapped as:

| Description | Range | Bytes | Notes |
|---|---|---|---|
| Internal RAM | 0000-01FF | 512 | see details below |
| EPROM Block #1 | 0200-0FFF | 3582 | |
| 68HC11 Registers | 1000-103F | 64 | |
| EPROM Block #2 | 1040-1FFF | 4032 | |
| RAM | 2000-27FF | 2048 | |
| IP Registers | 2800-2FFF | 2048 | |
| EPROM Block #3 | 3000-B5FF | 34304 | |
| EEPROM | B600-B7FF | 512 | see details below |
| EPROM Block #4 | B800-FFFF | 18383 | |
| total | 0000-FFFF | 65536 | |
| Internal RAM | | | |
| MATH11 FP Regs | 0000-0009 | 10 | floating point accumulators |
| *.S07 local vars | 000A-006D | 100 | local assembly routines |
| HC11 RAM vars | 006E-00E7 | 122 | non-volatile non-paged memory |
| Stack Space | 00E8-01FF | 280 | program stack area |
| total | 0000-01FF | 512 | |
| EEPROM | | | |
| ID var | B600-B607 | 8 | instrument id code |
| CC vars | B608-B657 | 80 | camera calibration parameters |
| SC vars | B658-B70B | 180 | spot calibration parameters |
| DA vars | B70C-B751 | 70 | pre-calculated values |
| PR vars | B752-B79F | 78 | parameter record-operational |
| Unused | B7A0-B7FE | 95 | |
| Checksum | B7FF-B7FF | 1 | EEPROM checksum |
| total | B600-B7FF | 512 | |

2.2. Memory
2.2.1. EPROM
2.2.1.1. Overview

Program memory resides in one 27C512 EPROM. This device provide 64 K-bytes of program storage and comes in a 32-pin PLCC package.

2.2.1.2. Software Interface

The program memory address range is split into four blocks (see section 2.1.3). The 16-bit checksum is located at address 0200:0201 hex. The exception vector table is located from FFD6 to FFFF hex. The total amount of usable program memory is 6030 bytes.

2.2.2. RAM
2.2.2.1. Overview

The RAM is composed of four 2 K-byte pages. Each page resides at addresses 2000 to 27FF hex. Only 1 page is accessible to the processor at any time. The page selection is controlled by the microprocessor.

2.2.2.2. Software Interface

Each page has a designated use:

| Page # | Usage |
|---|---|
| 0 | General variable storage |
| 1 | Communication routines messages |
| 2 | Video data page 1 |
| 3 | Video data page 2 |

The lower two bits of the image processor register RAM_CONFIG_REGISTER (00/01/10/11 binary) determine which of the four pages is accessed. The routine SwitchToPage( ) in file PAGE.S07 does the page switches.

| Examples: | |
|---|---|
| To select page #1: | SwitchToPage(1); |
| To select page #3: | SwitchToPage(3); |

The subroutine Fifo2CMT( ) in FIFO2CMT.S07 circumvents this procedure by writing directly to the page register. This exception increases the instrument measurement speed.

2.2.3. EEPROM
2.2.3.1. Overview

The 68HC11 has 512 bytes of on-board non-volatile EEPROM. To program the EEPROM, the software must write out 10 hex to the block protect (BPROT) register within 64 cycles of reset.

2.2.3.2. Software Interface

The EEPROM memory is used to store calibration parameters, operational modes and user options. The routine ProgramEEPROMByte( ) in file EEPROM.S07 does the actual programming.

Examples write data 3C hex to B634:
ProgramEEPROMByte(0xB634, 0x3C);
Write data F5 hex to B701:
ProgramEEPROMByte(0xB701, 0xF5);

The MCU can only program bits from ones to zeros. To change a bit from zero to one, the entire byte must first be erased (all bits set to one), then reprogrammed. Since the EEPROM has limited life, the routine is optimized to limit programming the EEPROM. The routine checks the currently stored data against the data to program; if the data to program equals the data already there, nothing is done. If the data to program involves only programming more zeroes, the byte is programmed. If the data to program requires any bit to change from zero to one, the byte is erased and reprogrammed.

An 8-bit checksum of the EEPROM is stored in address B7FF hex. The routine ChecksumEEPROM( ) in EPROM.S07, calculates the checksum. The routine CommitToEEPROM( ) in EPROM.S07 stores the current checksum.

EPROM Data

Device ID

Every device contains its own unique identifier (serial number), which is stored in this section. Examples are L0000010 and L1234567. See DEVICEID.H for definition.

Camera calibration

The camera calibration parameters, which characterize the distortions in the optical system, are stored in the 68HC11 EEPROM during instrument manufacture. The parameters are:

xp, yp, f, 11, 12, 13, pl, p2, p3, z, xc, yc, zc, omega, kappa, phi. These parameters are referenced by the data structure "cc" defined in CC.H, and used in CorrectForDistortion( ) in DISTORT.S07.

Spot calibration

The spot calibration values are also stored in the 68HC11 EEPROM during instrument manufacture. These values represent the spot positions obtained when measuring a 0 D lens (no lens). Items are:

sc[m].vi[i].hor and sc[m].vi[i].ver where
m=0 to 1 (for the two masks)
and
i=0 to 8 (for the nine spots)
These parameters are referenced by the data structure "sc" defined in SC.H.

Pre-calculated values

Some terms of the computation depend only on the calibration values. To save processing time, these terms are pre-calculated and stored in the 68HC11 EEPROM. The terms are:

m11, m12, m13, m21, m22, m23, m31, m32, m33, m13z, m23z, m33z, quadZero, threshFactor. These parameters are referenced by the data structure "da" defined in DA.H.

Operational values

These include user selectable operational modes, and the z and y distance values used in distance computations. The complete list includes:

cylinderType, resolution, prismNotation, speakerStatus, lcdContrast, dacValue[4], minArea, doThresholding, dumpData, highBaud, measRefAngle, torricLimit, zdistance, yDkPower[5], yDist[5]

These parameters are referenced by the data structure "pr" defined in PR.H.

2.3. Imaging System 2.3.1. Imager 202

The imager is a charge-coupled device (CCD) made by Texas Instruments, part number TI-245. The optical area measures 8.0 mm diagonally; 6.4176 mm wide by 4.7795 mm high. The optical area is divided into 755 columns by 484 rows. Physically, there are 242 rows of pixels, but electronic interpolation produces 484 effective rows. This interpolation provides two "fields": one even and the other odd. The fields are interleaved to make a frame. There is no space between pixels. The pixel size is 8.5 um wide by 9.875 um high (19.75 um high, "physical" pixel). There are 117.6470588 pixels per mm horizontally, and 101.2658228 pixels per mm vertically.

2.3.2. Image Processor 250

2.3.2.1. Overview

The image processor (IP) is implemented in an ACTEL A1020A ASIC (Application-Specific Integrated Circuit). It comes in a 68-pin PLCC package. The image processor run length encodes data from the CCD. Each "run" contains three pieces of information: beginning column (X), row (Y), and ending column +1. Each item is two bytes long, making each run six bytes in length. There are two pages where the image data, or "FIFO", can be stored. Each page is 2048 bytes deep, so the maximum number of runs a page can store is 2048/6=341. Each value recorded in the run sextet is shifted by a fixed amount due to delays in the hardware. The shifts are 103 for X data and 22 for Y data. These offsets are subtracted from every term in the spot collection routine Fifo2CMT( ). When collecting FIFO data, the IP sometimes records an ending X which is less than the beginning X. In this case, the ending X is set to the maximum value (755).

The registers available to the MCU are:

| Bit | Name | Description |
|---|---|---|
| COMMAND_REGISTER: (write-only; address = 2800 hex) bit | | |
| 7 | IPRAM PAGE 1 | Selects current RAM page |
| 6 | IPRAM PAGE2 | Selects current RAM page |
| 5 | PB (IP POWER | IP power on (1)/ off (0) |
| 4 | INVERT | Image normal (0)/ inverted (1) |
| 3 | _RESET | Devise reset (0)/ normal operation (1) |
| 2 | FRM/FLD | Process frame (1)/ feild (0) |
| 1 | FRM_SIZ E1 | Enable processing of top of image (1) |
| 0 | FRM_SIZ E0 | Enable processing of bottom of image (1) |
| RAM_CONFIG_REGISTER: (write-only; address = 2802 hex) | | |
| 2 | CALIB | Calibrate mode (1)/ normal mode (0) |
| 1 | MPRAM PAGE1 | Selects FIFO page to store video data |
| 0 | MPRAM PAGE0 | Selects FIFO page to store video data |
| STATUS_REGISTER: (read-only; address = 2800 hex) | | |
| 7 | A3 | Last address of video data, lower four bits |

-continued

| Bit | Name | Description |
|---|---|---|
| 6 | A2 | Last address of video data, lower four bits |
| 5 | A1 | Last address of video data, lower four bits |
| 4 | A0 | Last address of video data, lower four bits |
| 3 | unused | |
| 2 | ER1 | Error indicator bit |
| 1 | ER0 | Error indicator bit |
| 0 | CP | Command-pending (1) |

DAC_REGISTER:
(write-only; address = 2804 hex)

| | | |
|---|---|---|
| 7– 0 | | D/A converter value for the video threshold |

LAST_ADDRESS:
(read-only; address = 2803 hex)

| | | |
|---|---|---|
| 7– 0 | | last address, upper eight bits, combined with A3–A0 from above |

The image processor stores the run length encoded page memory starting at address 2000 hex. The image processor computes the "last address plus 1" of the video data. The last address is twelve bits wide, and is composed of the LAST_ADDRESS register concatenated with bits A3–A0 of the STATUS_REGISTER. Please note that the video data is also referred to as "FIFO" data.

2.3.2.2. Software Interface

The files IMAGER.C and IMAGER.H contain drivers for the image processor. The routine GetFifo( ) commands the IP to take a field or frame of data, waits for the completion of the task, and retrieves the last address and error bits. The procedure DoubleFifoBurst( ) does the same thing, but takes two successive images, thus increasing measurement throughput.

Examples:

Take an image during measurement process and put the data into page 1:
GetFifo (MEASURING, FIFO1_PAGE);
Take a burst of two images during measurement: DoubleFifoBurst( );

2.3.3. D/A Converter 2.3.3.1. Overview

The output of an 8-bit DAC provides an analog voltage threshold which is compared to the analog video data. Higher digital input values increase the threshold so that more light is needed to turn a pixel "on". Lower digital values decrease the threshold so that less light is needed to turn a pixel on.

2.3.3.2. Software Interface

The routine SetDACOutput( ) in DRIVERS.C can be used to set the imager threshold. Note that bit 0 is not part of this value. The imager routines in IMAGER.C directly write to the MIP_DAC_REGISTER.

2.4. Serial Peripheral Interface (SPI)

The eight signals which comprise the Synchronous Serial Interface (SPI) include:
MISO:master-in slave-out data line
MOSI:master-out slave-in data line
SCK:serial clock
SS:command/_data signal to LCD drivers (uPD7225)
SEL2:select lines to enable particular device,
SEL1:e.g. LCD drivers, keypad shift register, or
SEL0:RCLK of 8-bit serial/parallel shifters
_BUSY:busy indicator from LCD drivers The SEL2, SEL1, and SEL0 lines select which device connected to the SPI is accessed via a 3-to-8 decoder 224, FIG. 24A (U3). The SS line indicates to the LCD drivers whether the incoming byte is a command or data. The LCD drivers accept the data, and hold _BUSY low until they are ready for another byte. The keypad is read via a 74HC165 parallel-to-serial shift register 232 (U4). The two serial-to-parallel shift registers 230A and B (U7/U6) control the speaker, LCD contrast, alignment LEDs, projector LEDs, LCD driver reset, and calibration RAM pointer reset.

The files DRIVERS.C & DRIVERS.H contain the keypad and 74HC595 driver routines. The low level LCD drivers are in LCD.C & LCD.H, and the high level display drivers are in DISPLAY.C & DISPLAY.H.

2.4.1. LCD Display 186

2.4.1.1. Overview

The LCD display is composed of 416 segments including 50 seven segment numbers and 66 individual icons. The drivers are NEC uPD7225 ICs 1964A-D, FIGS. 24 B-C (U1/U2/U23/U24) configured as a master with 3 slaves. Each segment is individually controlled, and can blink at either of two rates.

SEGMENT IDENTIFICATION:
SEGMENT COM CONNECTIONS: (QUADRUPLEXED) SEE FIG. 37

| Controller RAM allocation for each segment: | |
|---|---|
| n+1: | d:e:g:f |
| n: | dp:c:b:a |

Four outputs of shift register 230A, FIG. 24B (U7) control the contrast of the LC segments. All outputs set to ones gives maximum contrast. For further information, refer to NEC uPD7225 Intelligent AlphaNumeric LCD Controller/Driver Technical Manual (stock #500250), and NEC uPD7225 Application Note (stock #501102).

2.4.1.2. Software Interface

The low level drivers for the LCD are in files LCD.C and LCD.H. The procedure Icons( ) controls the 66 individual icons, and the procedure Digits( ) controls the seven-segment numbers. The icons are all single-segment items, such as the distance vision icon, the printer icon, and the speaker icons.

Examples

Turn the printer icon on:Icon (ICON_PRINTER, LCD_STEADY);
Turn the sound-on icon off:Icon (ICON_SOUND_ON, LCD_ALL_OFF);
Flash the cylinder icon:Icon (ICON_CYLINDER, LCD_FLASHING);

The 50 digits are in two sets of 25; half for the left lens and half for the right. The left lens digits are numbered left to right, top to bottom, from 1 to 25. The right digits are numbered from 26 to 50.

Examples

Put a "1" in location #15:Digit(15, '1', LCD_DR_ON);
Put a blank in location #40:Digit(40, ' ', LCD_STEADY);
To display a complete numerical value, call DisplayNumber( ).

Examples

Display 5.12 in group 1 (left lens distance vision sphere):
DisplayNumber (1, 5.12, LCD_DR_ON, TRUE);
Display 123 in group 3 (left lens axis):
DisplayNumber (3, 123.0, LCD_DR_ON, TRUE);

The high level display driver, Display( ) is in files DISPLAY.C and DISPLAY.H. The function displays a particular set of segments based on the current operating mode and results.

Examples

Display the current measurement mode:
Display (D_MEAS_MODE);
Display the current selected lens:
Display(D_SELECTED_LENS);

The contrast is adjustable from 0 (no contrast) through 15 (maximum contrast).

Example

Set contrast to 7:SetLCDContrast (7);

2.4.2. Mask LEDs
2.4.2.1. Overview

Figure 38:
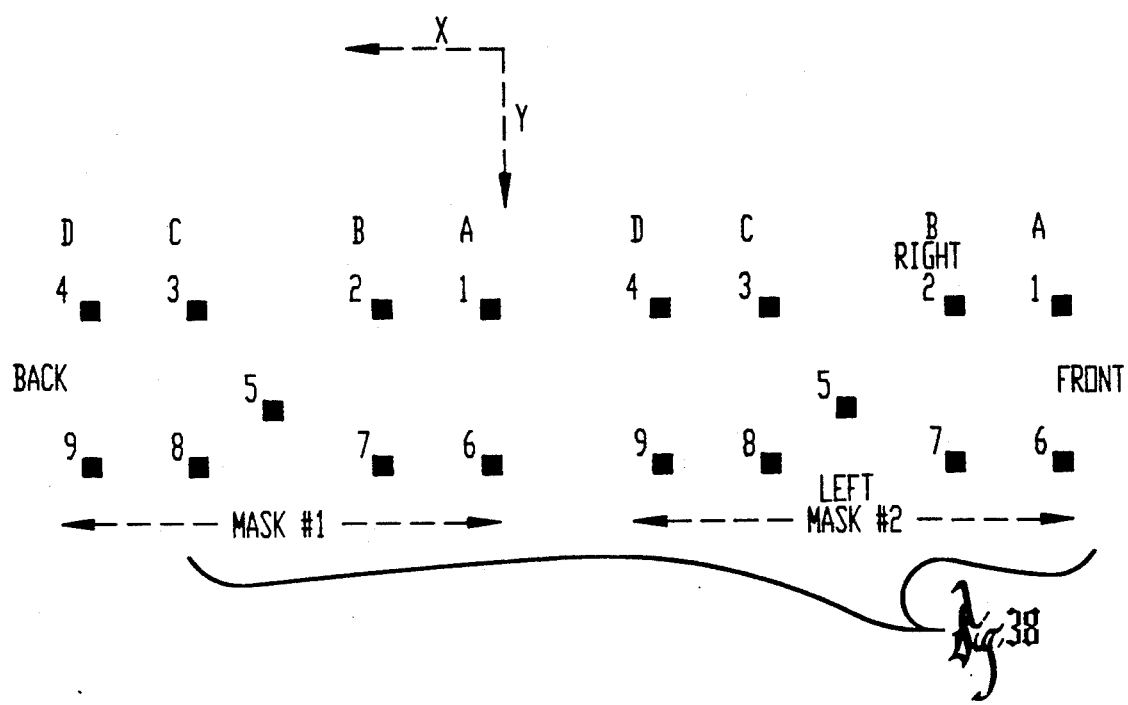
FIG. 38 is the layout of the lensometer mask LEDs.
Figure 39:
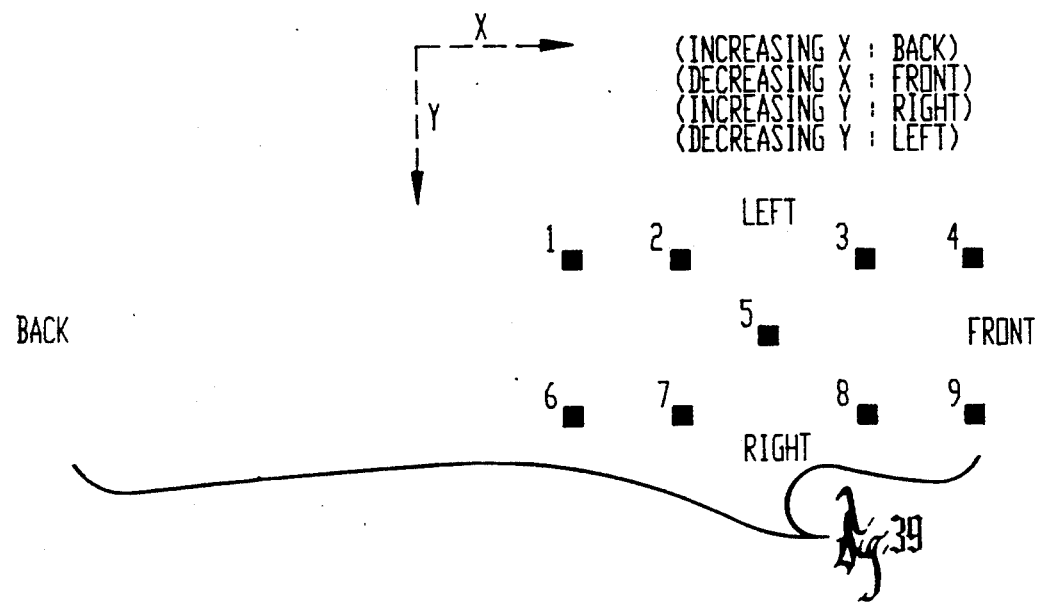
FIG. 39 illustrates the pattern of the mask LEDs as projected on the imager.

In one embodiment, each mask is composed of nine LEDs shining through nine pinholes. Mask 2 is farther away optically from the camera lens. The physical layout of the holes is shown in FIG. 38. The pattern they form on the imager is shown in FIG. 39.

2.4.2.2. Software Interface

A 20 bit serial-to-parallel converter on the nose board (see FIG. 28) drives the mask and alignment LEDs. This 20-bit converter is treated as three distinct 8-bit converters in the software. All output bits are active high. Each section (A, B, C, D and spot 5) for each mask is controlled separately. For example, if mask 1 section B is turned on, then only spots 2 and 7 of mask 1 are lit. If mask 2 section C is turned on, then only spots 3 and 8 of mask 2 are lit. The bit definitions are in DRIVERS.H:

| LED Name | Shift Register | Bit | Controls Spots |
|---|---|---|---|
| mask 1 section A | 2 | 3 | 1 & 6 |
| mask 1 section B | 2 | 2 | 2 & 7 |
| mask 1 section C | 2 | 1 | 3 & 8 |
| mask 1 section D | 2 | 0 | 4 & 9 |
| mask 1 spot 5 | 1 | 0 | 5 |
| mask 2 section A | 2 | 7 | 1 & 6 |
| mask 2 section B | 2 | 6 | 2 & 7 |
| mask 2 section C | 2 | 5 | 3 & 8 |
| mask 2 section D | 2 | 4 | 4 & 9 |
| mask 2 spot 5 | 1 | 1 | 5 |

2.4.3. Alignment LEDs
2.4.3.1. Overview

In an embodiment, there are eight alignment, four green status and four red directional LEDs which are used to help the user align the lens being measured. Their layout is shown in FIG. 40.

The red LEDs indicate the direction the user should move the lens. The green LEDs light up in unison to indicate correct alignment.

2.4.3.2. Software Interface

The alignment LED control bits are also in the nose electronics (see FIG. 28). Each of these is active high. See DRIVERS.H for definitions.

| LED name | Shift Register | Bit |
|---|---|---|
| top red directional | 1 | 2 |
| bottom red directional | 1 | 3 |
| left red directional | 1 | 4 |
| right red directional | 1 | 5 |
| top left status | 1 | 6 |
| top right status | 1 | 7 |
| bottom left status | 0 | 0 |
| bottom right status | 0 | 1 |

2.4.4. Speaker SPK1, FIG. 28
2.4.4.1. Overview

The beeper is a piezo-electric speaker driven by an LM555 timer. The timer has two control lines: one is an on/off signal and the other controls the pitch (either high or low).

2.4.4.2. Software Interface

The high level function Speaker( ) controls the beeper.

Examples

Turn speaker on high pitch:Speaker(SPKR_HIGH);
Turn speaker off:Speaker (SPKR_OFF);

2.4.5. Keypad 188, FIG. 18
2.4.5.1. Overview

In an embodiment, the keypad has nine keys: LEFT_KEY (left lens measure), RIGHT_KEY (right lens measure), SELECT_KEY (select options), SCROLL_KEY (scroll options), CLEAR_KEY (clear readings or stop measurement) GLASSES_KEY (measuring glasses), CONTACTS_KEY (measuring contacts), PRINT_KEY (print results ticket), and READ_KEY (store current reading).

2.4.5.2. Software Interface

All keys except the READ_KEY are read from U4 (FIG. 24A at 233), a 74HC165 8-bit parallel-to-serial converter, over the synchronous link. The READ_KEY comes into MCU port A, bit 1. All signals are active high and are polled by the software. The low level keypad driver ReadKeyboard( ) returns the current status of the keypad sense lines. The high level routine CheckKeyboard( ) monitors key press, debounce, and release. Upon depress, it makes a key "click" sound. See DRIVERS.C for routines.

2.4.6. Reset Lines
2.4.6.1. Overview

The LCD drivers can be reset by pulling line U7-6 low. The calibration RAM pointer is reset in the same manner via U7- 7.

2.4.6.2. Software Interface

Examples

Reset LCD drivers:ResetLCD( );
Reset cal RAM pointer:ResetCalRAMPointer( );

2.5. Serial Communications Interface (SCI)
2.5.1. Overview

The two signals which comprise the SCI system are:
RxD:Receive data line into MCU
TxD:Transmit data line out of MCU This interface outputs a ticket to the printer and communicates with a PC system for testing, calibrating and transferring results.

2.5.2. Software Interface

The low level asynchronous communication module in files COMM.C & COMM.H formats, receives, transmits, and extracts messages to and from the PC and sends ticket information to the system printer.

The high level driver which communicates with the PC resides in PCCOMM.C & PCCOMM.H. In PC-to-MCU mode, the PC initiates all communications with an ENQuire byte, then waits for the MCU to respond with an ACKnowledge byte. The PC then sends a command and data (if any), and waits for the MCU to return a response code and data (if any).

An output line, bit 0 of the DAC register, enables (1) or disables (0) the transfer of results to the printer. See ProduceTicket( ) in PRINT.C for its usage.

2.6. Calibration Module

During camera calibration, the Lensometer must store much more data than in normal operation. A calibration RAM module used for this purpose provides 32 K-bytes of RAM storage for the FIFO. The module is accessed sequentially, not randomly.

To start the calibration process, the calibration RAM pointer is reset by the ResetCalRAMPointer( ) routine. The IP stores a frame of data in the RAM module. After the pointer is reset again, the data is retrieved by reading address 2000 hex. A write to address 2000 hex increments the address pointer, the process is repeated until all FIFO data has been read.

3. Software Organization
3.1. Vendor Packages
   3.1.1.  Archimedes C-compiler, assembler, linker and librarian
   3.1.2.  Sage Software Polymake dependency generator and make facility
   3.1.3.  NOHAU EMUL-68 emulator control package
   3.1.3.1.  File Descriptions
     3.1.3.1.1. C source files, *.C, LENSO directory

| | | |
|---|---|---|
| aa) | DA: | pre-calculated values |
| ab) | DISPLAY: | high level LCD display drivers |
| ac) | DRIVERS: | low level device drivers |
| ad) | DUMP: | dumps test data out the comm port |
| ae) | GL: | global data declaration |
| af) | GROUPID: | identifies groups of four spots |
| ag) | HARDCONT: | special code for measuring hard contact lenses |
| ah) | HC: | internal 68HC11 RAM usage |
| ai) | HIDDEN: | options hidden from normal user |
| aj) | IMAGER: | low level image processor driver |
| ak) | INIT: | initialization and startup routines |
| al) | LCD: | low level LDC drivers |
| am) | MAIN: | main program control modules |
| an) | MEASURE: | controls the measurement process |
| ao) | MISC: | miscellaneous subroutines |
| ap) | OPTIONS: | user-selectable options |
| aq) | PR: | parameter record of operational variables |
| ar) | PRINT: | prints results tickets |
| as) | PROGADDS: | drives the alignment for varilux adds |
| at) | QU: | results queue data declaration |
| au) | RE: | results data declaration |
| av) | RESULTS: | handles storing/loading results |
| aw) | SC: | spot calibration data declaration |
| ax) | UM: | user mode data declaration |
| ay) | VA: | intermediate calculation variables data declaration |

3.1.3.1.2. C source files. *.C, COMMON directory

| | | |
|---|---|---|
| aa) | BORDER: | defines active useful area on image |
| ab) | CALIBRAT: | controls camera calibration functions |
| ac) | CC: | camera calibration data structure |
| ad) | CM: | declare center of mass data |
| ae) | COMM: | low level asynch serial communication module |
| af) | DEVICEID: | data definition for device identifying code |
| ag) | ERROR: | handles system errors |
| ah) | GETPUT: | C procedures getchar( ) and putchar( ) |
| ai) | II: | instrument info; copyright and version |
| aj) | MARKSPOT: | marks and removes unusable spots |
| ak) | PCCOMM: | C serial communication interpreter/processor |
| al) | REALCNST: | MATH11 REAL constants |
| am) | SELFTEST: | hardware self test routines |

3.1.3.1.3. C header files, *.H, LENSO directory

| | | |
|---|---|---|
| aa) | APPL: | application-specific constant definitions |
| ab) | AXISAMPL: | header |
| ac) | CALC: | header |
| ad) | DA: | pre-calculated values data definition |
| ae) | DISPLAY: | header |
| af) | DRIVERS: | header |
| ag) | DUMP: | header |
| ah) | FILTERS: | header |
| ai) | GL: | global variables data definition |
| aj) | GROUPID: | header |
| ak) | HARDCONT: | header |
| al) | HC: | 68HC11 RAM variables data definition |
| am) | HIDDEN: | header |
| an) | ID: | dummy header |
| ao) | IDSPOTS: | header |
| ap) | IMAGER: | header |
| aq) | INIT: | header |
| ar) | IO: | system I/O definitions and adresses |
| as) | LCD: | header |
| at) | MAIN: | header |
| au) | MEASURE: | header |
| av) | MISC: | header |
| aw) | MO: | dummy header |
| ax) | MOREASM: | header |
| ay) | OPTIONS: | header |
| az) | PR: | parameter record data definition |
| ba) | PRINT: | header |
| bb) | PRISM: | computes prism and corrects for prism |
| bc) | PROGADDS: | header |
| bd) | PWM: | header |
| be) | QU: | que data definition |
| bf) | QUEUE: | header |
| bg) | RE: | results data definition |
| bh) | RESULTS: | header |
| bi) | SC: | spot calibration data definition |
| bj) | UM: | user mode data definition |
| bk) | VA: | intermediate calculation variable data definition |
| bl) | VECTOR: | header |

3.1.3.1.4. C header files, *.H, COMMON directory

| | | |
|---|---|---|
| aa) | ASCII: | ASCII constants |
| ab) | BORDER: | header |
| ac) | CALIBRAT: | header |
| ad) | CC: | camera calibration data definition |
| ae) | CM: | center-of-mass data definition |
| af) | COMM: | header |
| ag) | CONST: | constants |
| ah) | DASM: | header |
| ai) | DEVICEID: | device id data definition |
| aj) | DISTORT: | header |
| ak) | EEPROM: | header |
| al) | EPROM: | header |
| am) | ERROR: | error code definitions |
| an) | FIFO2CMT: | header |
| ao) | FORMAT: | header |
| ap) | GENERAL: | system-wide header file |
| aq) | GETPUT: | header |
| ar) | GPURPOSE: | header |
| as) | II: | header |
| at) | MARKSPOT: | header |

-continued

| | | |
|---|---|---|
| au) MATH2: | header | |
| av) PAGE: | header | |
| aw) PAGE1: | comm messages data definition | |
| ax) PCCOMM: | header | |
| ay) RAM: | header | |
| az) REAL: | REAL data type definition | |
| ba) REALCMS: | header | |
| bb) REALCNST: | MATH11 REAL constants | |
| bc) REGS6811: | 68HC11-specific register addresses | |
| bd) RMATH: | header | |
| be) SELFTEST: | header | |
| bf) TOSSBAD: | header | |

3.1.3.1.5. Assembly source files, *.S07, LENSO directoy

| | |
|---|---|
| aa) AXISAMPLE: | computes major and minor axis amplifications |
| ab) CALC: | calculates base curves, axis and torricity |
| ac) FILTERS: | power filter |
| ad) IDSPOTS: | identifies spots |
| ae) MOREASM: | formats results |
| af) PRISM: | calculates prism |
| ag) QUEUE: | queue handlers |
| ah) VECTOR: | picks spots, computes vectors and synthetic spots |

3.1.3.1.6. Assembly source files, *.S07, COMMON directory

| | |
|---|---|
| aa) CSTARTUP: | C program start up and exception vector table |
| ab) DASM: | various math-related subroutines |
| ac) DISTORT: | convert image points to object points via lens correction |
| ad) EEPROM: | EEPROM control functions |
| ae) EPROM: | EPROM test routines |
| af) FIFO2CMT: | converts image data to center-of-mass table |
| ag) FORMAT: | formats sphere/cylinder/axis results |
| ah) GPURPOSE: | general purpose routines |
| ai) MATH11: | fast floating point math library obtained from Motorola |
| aj) MATH2: | general math functions |
| ak) PAGE: | switches RAM pages |
| al) PAGE1: | comm messages data declaration |
| am) RAM: | RAM test routines |
| an) REALCMS: | converts pixel data to floating point centers-of-mass |
| ao) RMATH: | MATH11 REAL functions |
| ap) TOSSBAD: | removes marked bad spots |

3.1.3.1.7. Assembly include files, *.INC, LENSO directory

| | |
|---|---|
| aa) APPL: | application-specific values |
| ab) DA: | pre-caluclated values data header |
| ac) FILTERS: | header |
| ad) GL: | global variables data header |
| ae) HC: | 68HC11 RAM data header |
| af) IO: | system I/O definitions and addresses |
| ag) MO: | mode variables data header |
| ah) MOREASM: | header |
| ai) RE: | parameter record data header |
| aj) QU: | queue data header |
| ak) RE: | results data header |
| al) SC: | spot calibration data header |
| am) VA: | intermediate calculation variables data header |

3.1.3.1.8. Assembly include files, *.INC, COMMON directory

| | |
|---|---|
| aa) CC: | camera calibration data header |
| ab) CM: | center-of-mass data header |
| ac) DASM: | header |
| ad) FIFO2CMT: | header |
| ae) MACROS: | macro definitions |
| af) MATH11: | header |
| ag) PAGE: | RAM paging header |
| ah) REAL: | REAL data type data header |
| ai) REALCNST: | MATH11 REAL constants |
| aj) REGS6811: | 68HC11-specific register addresses |

3.1.3.1.9. Make files a) MAKEFILE.MAK
This file controls the "make" or compile/assemble/link process. Typing MAKE <Enter> at the DOS prompt executes the make facility and builds the MAIN.A07 which can be downloaded into the NOHAU emulator. Typing MAKE PROM.MOT <Enter> creates the output files PROM.MOT and PROM.MAP. PROM.MOT is the Motorola S-record format accepted by an EPROM programmer. Use this to burn PROMs. The make file can also update the MAKEFILE.MAK dependencies when the user types MAKE DEPS <Enter>. MAKE CLEANUP <Enter> first deletes all *.BAK files then executes Norton's directory sort (DS) program to arrange the files alphabetically.

3.1.3.2. Main State Machine
The main program control is handled in files MAIN.C and MAIN.H. A finite state table sequences the procedures at the appropriate times.
The STATES are:

| | |
|---|---|
| HOLD_STATE: | LCD display and backlight are both off |
| DISPLAY_STATE: | Results for both lenses display on LCD, idle |
| MEASURE_STATE: | Measurement is in process |
| OPTIONS_STATE: | User going through selectable options |
| HIDDEN_STATE: | Hidden options are being accessed |

The EVENTS are:
1. No category

| | |
|---|---|
| a. NO_EVENT: | no events occurred |

2. Keypad entry events

| | |
|---|---|
| a. SELECT_KEY_EVENT: | Select key depressed |
| b. SCROLL_KEY_EVENT: | Scroll key depressed |
| c. CLEAR_KEY_EVENT: | Clear key depressed |
| d. RIGHT_KEY_EVENT: | Right Lens key depressed |
| e. LEFT_KEY_EVENT: | Left Lens key depressed |
| f. PRINT_KEY_EVENT: | Print key depressed |
| g. GLASSES_KEY_EVENT: | Glasses key depressed |
| h. CONTACTS_KEY_EVENT: | Contacts key depressed |
| i. MEASURE_KEY_EVENT: | Measure (Read) key depressed |

3. Procedure return status

| | |
|---|---|
| a. ENTRY_FLAG: | First time into routine |
| b. REPEAT_FLAG: | Routine should try again |
| c. EXIT_FLAG: | Routine exiting |
| d. FAILED_FLAG: | Routine failed |

4. Other

| | |
|---|---|
| a. PC_COMMAND: | PC wanting to communicate |

4. Equations 4.1. Overview

The measurement process is controlled by routines in the file MEASURE.C, which contains most of the decision and flow statements encountered when measuring. An overview of some of the functions are:

PreMeasure( ): This is called immediately prior to starting a measurement. It initializes all pertinent variables, turns on the first mask, turns the image processor on, clears the results record "re", clears the display, initializes the queue, and will dump the debug header if the dump option is enabled.

PostMeasure( ): This is called immediately after the measurement is over. It turns all alignment, status and mask LEDs off, turns the image processor off, and restores some variables.

Measure( ): This contains a small two-state state machine that conditionally calls either WideFieldAlign( ) or Measuring( ).

WideFieldAlign( ): This routine performs a coarse alignment and thresholding adjustment on the lens under test. When it successfully completes, flow proceeds to Measuring( ).

Measuring( ): This routine is the heart of the measurement computation. Although it does very little math itself, it controls the entire flow of operation during measuring. In a nutshell, it:
1) acquires the FIFO image data
2) converts the run-length encoded data into groups, or spots
3) identifies the spots
4) verifies the validity of the spots
5) removes those spots deemed invalid
6) decides how many spots to use in the computation
7) converts the pixel positions to millimeters
8) corrects the image space coordinates to object space
9) calculates the center-of-mass for the entire image
10) computes the vectors, as necessary
11) computes the synthetic spots
12) if measuring contact lens, modifies the synthetic spots
13) determines the prism
14) corrects the synthetic spots because of prism
15) calculates the axis amplifications for both masks
16) computes the diopter results
17) verifies the validity of these results
18) if measuring glasses, calculates power ratios
19) corrects the axis amplifications because of two angles
20) determines best Y distance to use from table
21) re-calculates the diopter results
22) drives the alignment LEDs
23) adds the current results to the results queue
24) performs hysteresis on the values
25) saves the results in data structure
26) sets variables for next time through this loop
27) optionally dumps the debug data out the serial port At each step in this process, errors must be detected and handled correctly.

PerformHysteresis( ): This routine computes "display-precision" values based on the last displayed value and resolution. This helps keep the display from jumping back-and-forth when a value is close to a cross-over point.

PreviousMeasure( ): This routine is called from the main state machine whenever the user hits the "clear" button, which signals the desire to back up a level (e.g. change from measuring the first add to measuring the distance vision).

NextMeasure( ): This routine is called from the main state machine whenever the user hits the read button, which signals the desire to record the current measurement. If certain criteria are met, it saves the current result and prepares for measuring the next item.

SelectSpots( ): This is a utility routine that turns on the desired mask LEDs based on the input parameters mask, lens type, and current group.

DriveArrows( ): This routine determines which alignment LEDs to turn on/off based on current measurement mode and calculated values.

4.2. Coarse Alignment And Thresholding

When entering the measurement mode, the first objective is to check the coarse alignment of the lens and the video threshold setting. (See routine WideFieldAlignment( ) in MEASURE.C.) This is accomplished by turning on mask 2, group Y5 (spots 2-3-5-7-8) and taking a field of data. When examination of the field data show that the criteria are met, the program continues through the actual measurement computation code.

If spots 2, 3 or 4 are visible, the user is guided toward optimal alignment. It is not possible to provide any alignment help if spots 0 or 1 are visible. When 5 spots are visible, the coarse alignment is finished. To pass coarse alignment, at least three of the five spots must be identified.

The threshold is adjusted by comparing the average of all regular sized spots (not spot 5) to the nominal spot height. Adjustments in the DAC value are made until the spot heights meet the value to within a tolerance level. When at least 3 spots of nominal size are identified, the coarse alignment/thresholding is terminated and the fine alignment/measurement process is begun. (See Measuring( ) in MEASURE.C).

4.3. Take An Image

The routine GetFifo( ) in IMAGER.C acquires a video image. The Image Processor 250 (IP) is initialized by writing to the RAM_CONFIG_REG and MIP_COMMAND_REG registers. When the IP signals completion, the routine reads and stores the IP error status and last address of the scanned data.

4.4. Gather Spots

The run length encoded video data is grouped into a center-of-mass, or CM, table. Each entry in this table contains information about a particular spot. This information includes: horizontal and vertical base positions, vertical weighted sum of runs, sum of all run lengths (area), the floating point center-of-mass (H & V), spot identifier, bad spot flag, convert flag, and active flag. The base positions are the horizontal and vertical values of the first run found for that particular spot. The vertical weighted sum of runs is obtained by multiplying each run length by its row, then adding all of these terms together. See CM.H for a definition of the CM data type.

The routine Fifo2CMT( ) in FIFO2CMT.S07 looks at each run, determining if it is within a prescribed distance from the base position of any known spot. If so, the run is added to that spot, otherwise this run becomes the base position for a new spot. This process continues until all runs have been assigned or the CM table becomes full.

4.5. Identify Spots

There are two files that perform the spot identification function. They are IDSPOTS.S07 and GROUPID.C.

IdentifySpots( ) in IDSPOTS.S07 is used whenever the central spot (#5) is on. It expects it to be the biggest spot, then identifies all others based on their relative positions to this one. For example, spots 1 and 2 are always to the left and above spot 5, and spot 1 is always to the left of spot 2. This identification algorithm is extremely fast.

IdentifyGroupSpots( ) in GROUPID.C is used whenever a group of four spots is visible. The possible groups are: X (spots 1-2-6-7), Y (spots 2-3-7-8), and Z (spots 3-4-8-9). This routine will identify the spots if there are 2, 3 or 4 spots in the CM table.

4.6. Classifying/Marking Spots

Spots in a CM table need to be classified and marked. Marking is based on certain criteria, such as spot too small or spot outside of useful image area. The routines that these tasks are in are MARKSPOT.C and are listed below:

MarkSmallSpots( ): Any spot whose number of runs or area is less than desired has its "badSpot" field marked with BS_TOO_SMALL.

MarkRadiusSpots( ): Any spot whose position is outside of the desired area has its "badSpot" field marked with one of: BS_TOO_FAR_BOTTOM, BS_TOO_FAR_TOP, BS_TOO_FAR_LEFT, BS_TOO_FAR_RIGHT.

MarkLoneColumnSpot( ): When there are exactly three spots, the one which is in a column to itself is marked with BS_LONER.

MarkBadAreaSpots( ): When there are exactly two spots, if one's area is less than 50% of the other, then it is marked BS_RELATIVE_AREA.

MarkSpotNumber( ): This marks the spot whose "ident" field matches the passed parameter with BS_GENERIC.

TossBadSpots( ): This routine removes from the CM table any spot whose "badSpot" field is marked.

4.7. Calculate Centers-Of-Mass For Each Spot

The routine CalculateRealCMs( ) in REALCMS.S07 calculates the horizontal and vertical centers-of-mass in millimeters for each spot whose "convert" field is TRUE.

Horizontal CM Equation:

$$realHor = \frac{(sum\ of\ all\ beg\ x\ and\ end\ x\ values)}{(number\ of\ runs) * (2) * (horizontal\ pixels\ per\ mm)}$$

where: horizontal pixels per mm = 117.6470588, constant in the system

Example:

| Run Number | beg X | row | end X |
|---|---|---|---|
| 1 | 114 | 71 | 129 |
| 2 | 115 | 73 | 131 |
| 3 | 113 | 75 | 132 |
| 4 | 114 | 77 | 128 |

Sum of all beg X and end X values =
114+129−1 + 115+131−1 + 113+132−1 + 114+128−1 = 972.
Therefore, the CM field "realHor" = 1.03275 mm.

Note: all runs have been corrected for offsets.
Vertical CM Equation:

$$realVer = \frac{(sum\ of\ all\ (run\ rows * run\ length))}{(sum\ of\ all\ run\ lengths) * (vertical\ pixels\ per\ mm)}$$

where: vertical pixels per mm = 101.2658228, constant in the system. See above example:
Sum of all (run rows*run length) = 71*15+73*16+75*19+77*14 = 4736.
Sum of all run lengths = 15+16+19+14 = 64.
Therefore, the CM field "realVer" = 0.73075 mm.

4.8. Correct Spot Centroids For Lens Distortions

Each spot must be corrected for the distortions in the optical train by feeding the "image space" spot coordinates into a transformation equation which gives the "object space" coordinates. The equation parameters are derived during camera calibration. The result of the equation is non-deterministic, so an iterative solution is required. The general equation is:

$$xbar + x \cdot (l_1 + l_2 r^2 + l_3 r^4) +$$

$$(p_1 \cdot [r^2 + 2x^2] + 2p_2 x^2 y^2) \cdot (1 + p_3 r^2) +$$

$$f \cdot \frac{m_{11} \cdot [x - x_c] + m_{12} \cdot (y - y_c) + m_{13} \cdot (z - z_c)}{m_{31} \cdot (x - x_c) + m_{32} \cdot (y - y_c) + m_{33} \cdot (z - z_c)} = 0$$

$$ybar + y \cdot (l_2 r^2 + l_3 r^4) + (2p_1 xy + p_2 \cdot [r^2 + 2y^2]) \cdot (1 + p_3 r^2) +$$

-continued $$f \cdot \frac{m_{21} \cdot (x - x_c) + m_{22} \cdot (y - y_c) + m_{23} \cdot (z - z_c)}{m_{31} \cdot (x - x_c) + m_{32} \cdot (y - y_c) + m_{33} \cdot (z - z_c)} = 0$$

where:
xbar = x − $x_p$
ybar = y − $y_p$
$r^2$ = xbar$^2$ + ybar$^2$

The equations are solved for the x and y transformed (object) points. The input and output values are the CM fields "realHor" and "realVer". See the camera cal documentation for further details.

4.9 Pick Spots To Vectorize

PickSpotsToVectorize( ) in VECTOR.S07 chooses the spots that will be used. The cases it handles are:

Group Y5 (spots 2-3-5-7-8):must have all five spots; uses spots 2-3-7-8.
Group X (1-2-6-7), Y (2-3-7-8) or Z (3-4-8-9):must have exactly four spots; uses all spots.
Exactly 3 Spots:each spot is used.
Exactly 2 Spots:each spot is used.
Measuring Adds:spots 2-5-7 are picked for vectorizing, and all spots are marked for converting. The spots are marked in va[ ].sp[ ] and va[ ].spv[ ] arrays.

4.10. Get CM Of Entire Image

CalculateMarkedCMs( ) in VECTOR.S07 calculates the center-of-mass of the entire image to determine prism. The X and Y positions of all spots whose "convert" field is TRUE are averaged. The routine also determines the corresponding calibration CM from the spots calibration positions. The results are stored in va[ ].cmMeas[ ] and va[ ].cmCal[ ], respectively.

4.11. Vectorize Spots

The spot centroids are "vectorized," by calculating the differences in X and Y between pairs of measured spots. The calibration positions of the measured spots and their resultant vectors were computed during calibration. The vectorization creates "synthetic" spots, used to calculate axis amplifications, and lens power. The routine VectorizeSpots( ) in VECTOR.S07 is used if exactly four spots are found. The routine FakeSyntheticSpots( ) is called when three spots are found. When only two spots are found no vectors are calculated, and only sphere power may be computed. In general, four vectors, are computed.

```
VectorizeSpots( ), simplified:
    measured:
        vector 1:
            vecMeas0H = cm[sp2] · hor − cm[sp1] · hor
            vecMeas0V = cm[sp2] · ver − cm[sp1] · ver
        vector 2:
            vecMeas1H = cm[sp4] · hor − cm[sp3] · hor
            vecMeas1V = cm[sp4] · ver − cm[sp3] · ver
        vector 3:
            vecMeas2H = cm[sp3] · hor − cm[sp1] · hor
            vecMeas2V = cm[sp3] · ver − cm[sp1] · ver
        vector 4:
            vecMeas3H = cm[sp4] · hor − cm[sp2] · hor
            vecMeas3V = cm[sp4] · ver − cm[sp2] · ver
    calibration:
        vector 1:
            vecCal0H = sc[sp2] · hor − sc[sp1] · hor
            vecCal0V = sc[sp2] · ver − sc[sp1] · ver
        vector 2:
            vecCal1H = sc[sp4] · hor − sc[sp3] · hor
            vecCal1V = sc[sp4] · ver − sc[sp3] · ver
        vector 3:
            vecCal2H = sc[sp3] · hor − sc[sp1] · hor
            vecCal2V = sc[sp3] · ver − sc[sp1] · ver
        vector 4:
```

-continued

VectorizeSpots( ), simplified:

```
    vecCal3H = sc[sp4] · hor − sc[sp2] · hor
    vecCal3V = sc[sp4] · ver − sc[sp2] · ver
where: cm is the measured center-of-mass table
    sc is the spot calibration coordinates
    spn is the short-hand for index into desired spot
    vecMeas is the measurement vector
    vecCal is the calibration vector
```

Picture the simplest case first: spots 2-3-7-8 are present and are in order in the CM table. Vector 0 is the difference between spot 3 and spot 2 (sp1=2, sp2=3, sp3=7, sp4=8), vector 1 is the difference between spot 8 and spot 7, etc.

The spn index is used when the spots are not in ascending order in the CM table. The order could be 3-2-7-8 or 2-3-8-7, for example. PickSpotsToVectorize( ) will set the va[ ].spv[ ] (=spn) indexes correctly.

4.12. Synthesize Spots

SynthesizeSpots( ) in VECTOR.S07 is used to generate synthetic spots va[ ].synMeas[ ][ ] and va[ ].synCal[ ][ ] from the vectors of the measurement and calibration spots.

The reason for the use of "synthetic spots" is that the equation which determines the axis amplification is based on the assumption that three spots (hence the term "three spot equation") are used. But sometimes when four spots are present using all of them improves accuracy. The four measured spots are converted into three artificial spots, one of which is located at (0, 0), the other two of which are based on the vectors, described earlier.

```
SynthesizeSpots( ):
    measured spots:
        synthetic spot 1:
            horizontal = 0.0;
            vertical = 0.0;
        synthetic spot 2:
    synMeas[0][0] = vecMeas[0][0] + vecMeas[1][0]; hor
    synMeas[0][1] = vecMeas[0][1] + vecMeas[1][1]; ver
        synthetic spot 3:
    synMeas[1][0] = vecMeas[2][0] + vecMeas[3][0]; hor
    synMeas[1][1] = vecMeas[2][1] + vecMeas[3][1]; ver
    calibration spots:
        synthetic spot 1:
            horizontal = 0.0;
            vertical = 0.0;
        synthetic spot 2:
    synCal[0][0] = vecCal[0][0] + vecCal[1][0]; hor
    synCal[0][1] = vecCal[0][1] + vecCal[1][1]; ver
        synthetic spot 3:
    synCal[1][0] = vecCal[2][0] + vecCal[3][0]; hor
    synCal[1][1] = vecCal[2][1] + vecCal[3][1]; ver
FakeSyntheticSpots( ):
    measured spots:
        synthetic spot 1:
            horizontal = 0.0;
            vertical = 0.0;
        synthetic spot 2:
    synMeas[0][0] = cm[2] · realHor − cm[1] · realHor;
    synMeas[0][1] = cm[2] · realVer − cm[1] · realVer;
        synthetic spot 3:
    synMeas[1][0] = cm[3] · realHor − cm[1] · realHor;
    synMeas[1][1] = cm[3] · realVer − cm[1] · realVer;
    calibration spots:
        synthetic spot 1:
            horizontal = 0.0; vertical = 0.0;
        synthetic spot 2:
    synCal[0][0] = cm[2] · realHor − cm[1] · realHor;
    synCal[0][1] = cm[2] · realVer − cm[1] · realVer;
        synthetic spot 3:
    synCal[1][0] = cm[3] · realHor − cm[1] · realHor;
```

-continued

```
    synCal[1][1] = cm[3] · realVer − cm[1] · realVer;
```

4.13. Calculate Prism

Prism is a measure of deflection, not amplification, that light undergoes as it passes through the portion of the lens being tested. Prism is calculated by using the synthetic spots by the routine CalculatePrism( ) in PRISM.S07. The approximate horizontal displacement from the calibration spots is calculated using the horizontal coordinates of synthetic spot 2. This approximation is valid because the vertical component of this synthetic spot is approximately 0:

mx1 = va[0].synMeas[0][0]/va[0].synCal[0][0];
mx2 = va[1].synMeas[0][0]/va[1].synCal[0][0];

The approximate displacement of the measured spots to calibration spots is computed using synthetic spot 3. The approximation is valid because the horizontal component of this synthetic spot is approximately 0:

my1 = va[0].synMeas[1][1]/va[0].synCal[1][1];
my2 = va[1].synMeas[1][1]/va[1].synCal[1][1];

Using the horizontal component of the entire image center-of-mass:

dx1 = va[0].cmMeas[0] − va[0].cmCal[0];
dx2 = va[1].cmMeas[0] − va[1].cmCal[0];

Using the vertical component of the entire image center-of-mass:

dy1 = va[0].cmMeas[1] − va[0].cmCal[1];
dy2 = va[1].cmMeas[1] − va[1].cmCal[1];

Using the above terms, compute up/down prism (a positive value means prism up):

$$re.prismUpDown = \frac{-(100.0 * (dx1 - dx2))}{(mx1 * mx2 * zDistance)}$$

Now compute the in/out prism (a positive value means prism in for right lens):

$$re.prismInOut = \frac{-(100.0 * (dy1 - dy2))}{(my1 * my2 * zDistance)}$$

Therefore the prism magnitude and angle are:

re.prismMag = sqrt(sqr(re.prismInOut) + sqr(re.prismUpDown));
re.prismAngle = arctan(re.prismUpDown/re.prismInOut);
if (re.prismAngle < 0.0)
    re.prismAngle = re.prismAngle + 180.0;
else if (re.prismUpDown < 0.0)
    re.prismAngle = re.prismAngle + 180.0;
The coordinate system is:

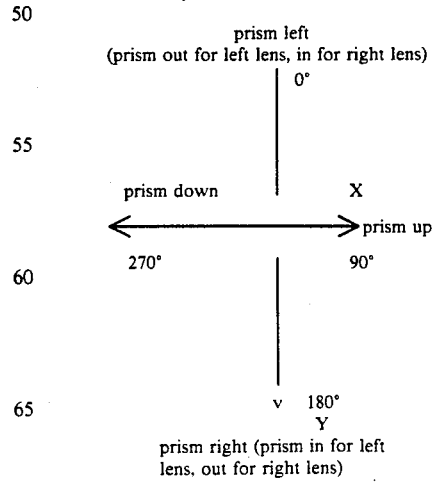

-continued

Prism up moves spots in the +X direction.
Prism down moves spots in the -X direction.
Prism left moves spots in the +Y direction. (left lens = out)
Prism right moves spots in the -Y direction. (left lens = in)

Notes:
1) Prism cannot be calculated with only 1 or 2 spots.
2) These equations were derived for use with a square grid of four measured spots (e.g. spots 2-3-7-8), but will also work with three.

4.14. Determine Axis Amplifications

CalculateAxisAmplifications( ) in AXISAMPL.S07 uses the synthetic spots to compute major and minor axis amplifications and an angle for both masks. This "three-spot" equation solves a quadratic, i.e. $A(x^{**}2)+B(x)+C=0$. When only two measured spots are present, only spherical power (no cylinder or angle) can be calculated; in this situation CalcAxisAmpl( ) is called, which is also in AXISAMPL.S07.

---

CalculateAxisAmplifications( ):

Determine the A coefficient:

```
aterm  =  (x2b * y3b) - (x3b * y2b);
       =  (synCal[0][0] * synCal[1][1]) -
          (synCal[1][0] * synCal[0])
```

Determine the B coefficient:

```
bterm  =  - ((x2c * y3b) + (y3c * x2b) -
          (x3c * y2b) - (y2c * x3b))
```

Determine the C coefficient:

```
cterm  =  (x2c * y3c) - (x3c * y2c);
```

Determine the S term (the familiar B-squared times 4-A-C):
```
sterm = bterm * bterm - 4.0 * aterm * cterm;
if (sterm < da.quadZero)
    sterm = 0.0;
sterm = sqrt(sterm);
```
The two solutions to the quadratic are the axis magnifications
```
major = (-bterm - sterm)/(2.0 * aterm);
minor = (-bterm + sterm)/(2.0 * aterm);
if (major > minor)
    swap(major, minor);
```
Finally, the angle is computed:
```
if (sterm = 0.0)
    angle = 0.0;
else
    angle = arctan(-(x2c-major*x2b)/(y2c-major*y2b));
or
    angle = arctan(-(x3c-major*x3b)/(y3c-major*y3b));
if (axis < 0.0)
    axis = axis + 180.0;
if (cylinder < 0.125)
    axis = 0.0;
```

Notes:
1) The major magnification is always less than the minor magnification; this means that the major axis power is always greater than the minor axis power.
2) da.quadZero is a value stored in EEPROM that represents a value that is so close to zero, that it is treated as zero.
3) The angle is calculated by one of the two given equations based on threshold criteria. See the source for complete information.

---

CalcAxisAmpl( )

Determine the magnification of the measured spots:
measMag = synMeas[0][h/v] - synMeas[1][h/v];
Determine the magnification of the calibration spots:
calMag = synCal[0][h/v] - synCal[1][h/v];
The amplification is therefore:
major = measMag/calMag;
minor = 0.0;
angle = 0.0;

Notes:
1) The term [h/v] is an index [0/1] which indicates whether the spot pair is a horizontal or vertical set.

4.15. Calculate Base Curve Powers And Angle

CalcDiopterResults( ) in CALC.S07 computes the diopter powers of both base curves using the function MagToDiopters( ). The major axis is used to compute base curve 1 for each mask. The minor axis is used to compute base curve 2 for each mask. The conversion from amplification to diopters is:

$$D\ power = \frac{1000.0}{((mag2 * zDistance)/(mag2 - mag1)) + yDistance}$$

This routine also ensures that the base curve 1 power is less than or equal to the base curve 2 power.

4.16. Correct Spots For Prism

Prism introduces a magnification error along the axis of prism. CorrectSpotsForPrism( ) in PRISM.S07 corrects the error by altering the synthetic spots based on the measured prism.
angle = 90.0 - re.prismAngle;
term1 = sqr(re.prismMag)/7500.0;
term2 = cos(angle);
term3 = sin(angle).
For each of the synthetic spots in both masks, do:
term4 = synMeas[s][0]*term2 + synMeas[s][1]*term3;
synMeas[s][0] = synMeas[s][0] + (term1*term2*term4);
synMeas[s][1] = synMeas[s][1] + (term1*term3*term4).

4.17. Queue And Average Results

A running average of the last eight results is kept, which consists of two base curves and an axis for each item. The functions are in QUEUE.S07 and the data definition is in QU.H.

InitQueue( ): clears out entire "qu" structure.
PrimeQueue( ): Takes the current results in "re" and copies them into every "qu" location when a first measurement, lens movement, or a sudden power change is detected.
AddToQueue( ): Puts the current results "re" into the "qu", replacing the oldest set of results.
AvgQueueResults( ): Averages the eight readings for both base curves and the axis. The axis average is a special case. For example, it is not valid to average 5 and 145 degrees by using $(5+145)/2 = 75$ degrees. Since these angles are different by more than 90 degrees the average becomes $(5+(145-180))/2 = -15$, or 165 degrees. $(145+(5-180))/2 = 165$ degrees is also valid. (Ideally the angles are all fairly close to each other. In cases when the cylinder is small, inadequate resolution may cause this problem). The routine takes the last axis angle (assumed most accurate) and references all angles with respect to it, coming up with the correct average.

4.18. Calculate Torricity

Torricity is a measure of how well the lens under test may be modeled by a torric surface. The torricity of the lens is computed using the measurement and calibration vectors from mask 2. The vectors must have been derived from four actual spots to be valid. CalcTorricity( ) in CALC.S07 performs the following:

$$torricity = \frac{abs\ (vecMeas[2][0] - vecMeas[3][0] - vecCal[2][0] + vecCa)}{abs\ (vecMeas[0][1] - vecMeas[1][1] - vecCal[0][1] + vecCa)}$$

-continued torricity = 100.0 * torricity;

where:
vecMeas is vector calculated from measured spots,
vecCal is vector calculated from calibration spots,
 [i][j] index i is vector number (relative to 0)
 index j is horizontal (0) or vertical (1)
If this torricity value is greater than pr.torricLimit, the re.nonTorric flag is set.

Notes:
1) This equation is only valid with four measured spots.

4.19. Drive Alignment Arrows

During the measurement process lens position is monitored continually, and signals are given to the operator via four red arrow LEDs to indicate which direction the lens should be moved to improve alignment. When optimal alignment is achieved, a square green LED indicates success. There are several methods used to determine what indications to give depending on the current alignment.

During regular distance vision measurement, "power ratios" and prism are used for alignment. CalculatePowerRatios( ) in PRISM.S07 computes the variables needed to drive the arrows. They are:

$dx = va[0].dxy$ = MagToDiopters($va[0].mx, va[1].mx$);
if $(abs(dx) < 0.125)$
 $x0 = 0.0$;
else
 $x0 = va[0]$.powerRatio = 10.0 * re.prismUpDown/$dx$;
$dy = va[1].dxy$ = MagToDiopters($va[0].my, va[1].my$);
if $(abs(dy) < 0.125)$
 $y0 = 0.0$;
else
 $y0 = va[1]$.powerRatio = 10.0 * re.prismInOut/$dy$;
$r0 = va[0]$.polarRatio = sqrt(sqr($x0$) + sqr($y0$));
theta = $va[1]$.polarRatio = arctan($y0/x0$);
theta = abs(theta); make the angle between 0 and 90 degrees.

A different technique is used for adds. Procedures InitProgressive( ) and ProgressiveAddArrows( ) in PROGADDS.C require that all 5 center spots be visible. The routine uses spots 2-5-7 to calculate a cylinder value, and compares it to the cylinder found using spots 3-5-8. If these match, then alignment in the left and right direction is deemed correct. Using spots 2-3-5 it calculates a sphere value, then compares it to the sphere found using spots 5-7-8. If these match, then alignment in the up and down direction is deemed correct. This routine was optimized for progressive alignment, and is designed to detect user alignment in the progressive corridor and direct the user to the progressive add.

4.20. Hard Contact Lenses

Measurement of hard contact lenses is complicated by optical distortion in the contact lenses due to the highly curved front surfaces. The problem is particularly evident in lenses with significant positive diopter power. The measured spot positions must be corrected to remove distortion prior to the calculation of lens power.

The spots are gathered, converted to object-space floating point coordinates, and synthetic spots are generated. The routine HardContacts( ) in HARDCONT.C using distortion tables, indexed by the rough lens power, corrects the measured spot positions, and returns to the main program flow.

4.21. Check For Reasonable Results

When the base curve powers of the lens have been computed, a validity check is performed. PowerFilter( ) in FILTERS.S07 checks that the magnitude of both base curve powers is less than 45.0 diopters and the cylinder is less than 12.0 diopters.

4.22. Display Results

To display the results:
1) load the display-precision base curves into re structure,
2) round values to desired resolution (0.01/0.125/0.25)
3) convert distance vision values to plus or minus cylinder
4) if no cylinder is present, set axis=0
 Note:0< =axis< =180°
5) if no prism is present, set prism angle=0
 Note:0< =angle< =180°
6) convert from MATH11REAL format to IEEE floating point
7) call Display( ) to display the results on the LCD. Example:Display (D_SHP_CYL_ANG), Display (D_ADD_1), etc. See DISPLAY.C and .H and LCD.C and .H

| ITEM | ASS'Y | REFER. DESIG. | DESCRIP | PCKG |
|---|---|---|---|---|
| 1 | MAIN | C1,C2,C3,C5, C8,C9,C10, C11,C12,C13 | CAP CC .1M/50 | 1206 |
| 2 | MAIN | C14,C15,C16, C17,C18,C19, C20,C21 | CAP CC .1M/50 | 1206 |
| 3 | MAIN | C22,C23,C33, C35,C41,C42, | CAP CC .1M/50 | 1206 |
| 4 | MAIN | C6,C24 | CAP CT 47M/10 | 7343 |
| 5 | MAIN | C7,C25,C26, C30 | CAP CT 33M/16 | 7343 |
| 6 | MAIN | C34,C38 | CAP CT 22M/16 | 7343 |
| 7 | MAIN | C27,C28 | CAP CT 47M/6.3 | 7343 |
| 8 | MAIN | C4,C31 | CAP CC .01M/50 | 1206 |
| 9 | MAIN | C39,C40 | CAP CC 27pF/50 | 1206 |
| 10 | MAIN | C36 | 1UF | |
| 11 | MAIN | C37 | CAP CT 2.2M/25 | 6032 |
| 12 | MAIN | C43 | 2200UF/16V | |
| 13 | MAIN | C32 | CAP AEA 470M/16 | AXIAL |
| 14 | MAIN | C44 | CAP CT 47M/6.3 | 1206 |
| 15 | MAIN | C46 | CAP CT 4.7M/16 | 1206 |
| 16 | MAIN | C47 | CAP CT 4.7M/6.3 | 1206 |
| 17 | MAIN | C48 | CAP CT 10M/16 | 1206 |
| 18 | MAIN | C49 | CAP CT 10M/6.3 | 1206 |
| 19 | MAIN | D30 | DIODE BAT54 | SO-23 |
| 20 | MAIN | D31,D32,D34, | DIODE PRLL5817 | SOD-87 |
| 21 | MAIN | D33 | DIODE PRLL5819 | SOD-87 |
| 22 | MAIN | D35,D41,D42, D43,D44 | DIODE DL4001 (MELF) | DL-41 |
| 23 | MAIN | D29,D36,D37, D38,D40 | DIODE DL4148 | DL-35 |
| 24 | MAIN | D39 | DIODE REF LM336- | SO-8 |

| ITEM | ASS'Y | REFER. DESIG. | DESCRIP | PCKG |
|---|---|---|---|---|
| 25 | MAIN | LS1 | 2.5V AK-11 | |
| 26 | MAIN | L1,L2,L3,L4 | INDUCTOR SMT 10uH | *DWG |
| 27 | MAIN | Q5, Q11, Q12 | TRANSIT OR MTD3055E | TO-251 |
| 28 | MAIN | Q6,Q8,Q9, Q13,Q14 | TRANSIST OR BSS138 | SOT-23 |
| 29 | MAIN | Q7,Q10 | TRANSIST OR TP0104N8 | SOT-89 |
| 30 | MAIN | R48 | RES 200K 1/8W 1% MF SO | 1206 |
| 31 | MAIN | R49,R52 | RES 100K 1/8W 1% MF SO | 1206 |
| 32 | MAIN | R33,R35,R42, R43,R44,R45, R46,R47,R50 | RES 10K 1/8W 5% CF SO | 1206 |
| 33 | MAIN | R76,R77,R79, R81,R82,R88, R90,R91 | RES 10K 1/8W 5% CF SO | 1206 |
| 34 | MAIN | R30,R31,R32, R36,R51,R55 | RES 4.7K 1.8W 5% CF SO | 1206 |
| 35 | MAIN | R67,R68,R83, R84,R85,R86 | RES 4.7K 1/8W 5% CF SO | 1206 |
| 36 | MAIN | R34,R53 | RES 20K 1/8W 5% CF SO | 1206 |
| 37 | MAIN | R66 | RES 10M 1/8W 5% CF SO | 1206 |
| 38 | MAIN | R13 | RES 2.4K 1/8W 5% CF SO | 1206 |
| 39 | MAIN | R14,R17,R20, R23,R35 | RES 2K 1/8W 5% CF SO | 1206 |
| 40 | MAIN | R73,R74 | RES 82R 1/8W 5% CF SO | 1206 |
| 41 | MAIN | R56,R57 | RES 24K 1/8W 5% CF SO | 1206 |
| 42 | MAIN | R58,R61 | RES 1K 1/8W 5% CF SO | 1206 |
| 43 | MAIN | R59 | RES 6.2K 1/8W 5% CF SO | 1206 |
| 44 | MAIN | R62,R63,R64, R92 | RES 100R 1/8W 5% CF SO | 1206 |
| 45 | MAIN | R37,R71 | RES 2.4K 1/8W 5% CF SO | 1206 |
| 46 | MAIN | R38,R39,R41 | RES 18K 1/8W 5% CF SO | 1206 |
| 47 | MAIN | R40,R560, R72,R75,R78 | RES 2K 1/8W 5% CF SO | 1206 |
| 48 | MAIN | R54 | RES 280K 1/8W 1% CF SO | 1206 |
| 49 | MAIN | R89 | RES 100K 1/8W 5% CF SO | 1206 |
| 50 | MAIN | R65 | RES 51R 1/8W 5% CF SO | 1206 |
| 51 | MAIN | S1,S2,S3,S4, S5,S6,S7,S8, S9 | Pushbutton | N/A |
| 52 | MAIN | T1 | TRANSFOR MER TXFMR6 | *DWG |
| 53 | MAIN | U1,U2,U23, U24 | UPD7225 | 52 PLCC |
| 54 | MAIN | U3 | 74HC138 | SO16 |
| 55 | MAIN | U4 | 74HC165 | SO16 |
| 56 | MAIN | U7 | 74HC595 | SO16 |
| 57 | MAIN | U8 | 74HC05 | SO14 |
| 58 | MAIN | U9 | LMC555CM | SO18 |
| 59 | MAIN | U10 | 74HC390 | SO16 |
| 60 | MAIN | U11 | IC MAX641 | SO-8 |
| 61 | MAIN | U17,U18 | IC 74HC373 | SO-20 |
| 62 | MAIN | U20 | IC 68HC11E1 | 52PLCC |
| 63 | MAIN | U12 | IC MIPP10 | 68PLCC |
| 64 | MAIN | U13 | IC 7C185 | SO-28 |
| 65 | MAIN | U14 | OSC XTAL FSO-8.000 MHz | *DWG |
| 66 | MAIN | U15 | IC TMS3473B | *DWG |
| 67 | MAIN | U16 | IC SN28846 | *DWG |
| 68 | MAIN | U19 | IC 27C256 | 32PLCC |
| 69 | MAIN | U25 | RS232 Trans | so24 |
| 70 | MAIN | U26 | ANALOG SW | s016 |
| 71 | MAIN | U21 | LM7805 | TO220 |
| 72 | MAIN | U27 | 74HC08 | s014 |
| 73 | MAIN | Y1 | OSC XTAL FSO-13.200 MHz | *DWG |
| 74 | MAIN | UA1 | SOCK PLCC 32P | 32PLCC |
| 75 | MAIN | UA2 | SOCK PLCC 52P | 52PLCC |
| 76 | MAIN | J1 | GP | |
| 77 | MAIN | JP6 | Header 2 | |
| 78 | MAIN | JP8 | Header 3 | |
| 79 | MAIN | UA3 | SOCK PLCC 68P | 68PLCC |
| 80 | MAIN | U22 | LCD168 | |
| 81 | MAIN | JP9,JP10 | 5 × 2 low prof header | |
| 82 | MAIN | JP11 | 10 × 2 pin header | |
| 83 | MAIN | PWB-1 | PRINTED WIRING BOARD MAIN | *DWG |
| 1 | CCD | C1 | CAP CT 22M/16 | 6032 |
| 2 | CCD | C2,C6,C9, C12,C13,C14, C15,C18, | CAP CC .1M/50 | 1206 |
| 3 | CCD | C19,C22,C23 | CAP CC .1M/50 | 1206 |
| 4 | CCD | C3,C4,C8, C11,C17,C21 | CAP CT 4.7UF | 1206 |
| 5 | CCD | C5 | CAP CC .022M/50 | 1206 |
| 6 | CCD | C7 | CAP CT 1M/16 | 1206 |
| 7 | CCD | C10 | CAP CC 470pF/50 | 1206 |
| 8 | CCD | C16,C20,C24 | CAP CC 15pF/50 | 1206 |
| 9 | CCD | J1 | GP | |
| 10 | CCD | JP1 | Header | |

-continued

| ITEM | ASS'Y | REFER. DESIG. | DESCRIP | PCKG |
|---|---|---|---|---|
| 11 | CCD | R1 | 10 × 2 RES 1.2K 1/8W 5% CF SO | 1206 |
| 12 | CCD | R2 | RES 4.7K 1/8W 5% CF SO | 1206 |
| 13 | CCD | R3,R4,R5 | RES 20K 1/8W 5% CF SO | 1206 |
| 14 | CCD | R6,R11,R18,R23 | RES 100R 1/8W 5% CF SO | 1206 |
| 15 | CCD | R7 | RES 120R 1/8W 5% CF SO | 1206 |
| 16 | CCD | R8,R9 | RES 27R 1/8W 5% CF SO | 1206 |
| 17 | CCD | R10,R14,R15,R16,R17,R21,R22,R26 | RES 110R 1/8W 5% CF SO | 1206 |
| 19 | CCD | 1R2,R19,R24 | RES 10K 1/8W 5% CF SO | 1206 |
| 20 | CCD | R13,R20,R25 | RES 910R 1/8W 5% CF SO | 1206 |
| 21 | CCD | U1 | IC TC245 (W/SOCK.) | |
| 22 | CCD | U2 | IC DAC8070 | 16-SOIC |
| 23 | CCD | U3 | VR LM79L05A CM | 8-SOIC |
| 24 | CCD | U4 | IC MAX900 | 20-SOIC |
| 25 | CCD | U5,U6,U7 | IC VA711 | DIP-8 |
| 26 | CCD | UA1 | SOCK 20P DIP (MODIFIED) | *DWG |
| 27 | CCD | PWB-2 | PRINTED WIRING BOARD CCD | *DWG |
| 1 | OPT | | LENS, ARCHROMAT | |
| 2 | OPT | | LENS, APERTURE, TELECENTRIC | |
| 3 | OPT | | PRISM, RA, HYPOTENUSE, ALUMINZD. | |
| 4 | OPT | | MASK, PINHOLE | |
| 5 | OPT | | BEAMSPLITTER, CUBE | |
| 6 | OPT | | ENCL., REFL., SPECULAR | |
| 7 | OPT | | LED ARRAY (14) | |
| 8 | OPT | | LED SUPPROT | |
| 9 | OPT | | 3 mil single matte vellum | |
| 1 | OPT/MECH | | SETSCR. CONE PT. #6-32 × .250 | |
| 2 | OPT/MECH | | SCREW, PAN HD. #2-56 × .250 | |
| 3 | OPT/MECH | | O-RING #008 | |
| 4 | OPT/MECH | | CLAMP SLIDE | |
| 5 | OPT/MECH | | DWL PIN, 3/32 × 5/16 LG. | |
| 6 | OPT/MECH | | VERTICLE SLICD ROD BEARING | |
| 7 | OPT/MECH | | VERTICLE SLIDE ROD | |
| 8 | OPT/MECH | | SCREW, BUT HD.#3-48 × 1/4 | |
| 9 | OPT/MECH | | MARKER SLIDE | |
| 10 | OPT/MECH | | SPRING PIN, 1/16 × 5/8 | |
| 11 | OPT/MECH | | NEGATOR SPRING | |
| 12 | OPT/MECH | | SPRING DRUM | |
| 13 | OPT/MECH | | DOWEL PIN, 1/8 × 3/4 LG. | |
| 14 | OPT/MECH | | CAMERA MOUNT | |
| 15 | OPT/MECH | | MARKER SPRING | |
| 16 | OPT/MECH | | MARKER PIVOT SHAFT | |
| 17 | OPT/MECH | | MARKER HOLDER | |
| 18 | OPT/MECH | | SCREW, BUT HD. #6-32 × 5/8 | |
| 19 | OPT/MECH | | CAMERA ADJUSTMENT BLOCK | |
| 20 | OPT/MECH | | CCD MOUNT | |
| 21 | OPT/MECH | | CAMERA PINHOLE MOUNT | |
| 22 | OPT/MECH | | LENS RETAINER | |
| 23 | OPT/MECH | | O-RING #013 | |
| 24 | OPT/MECH | | LENS RETAINER TUBE | |
| 25 | OPT/MECH | | CAMERA TUBE | |
| 26 | OPT/MECH | | SCREW, BUT HD. #4-40 × 7/8 | |
| 27 | OPT/MECH | | LENS BACKSTOP SLDIE BEARING | |
| 28 | OPT/MECH | | LENS BACKSTOP MOUNT | |
| 29 | OPT/MECH | | PRISM MOUNT | |
| 30 | OPT/ | | LENS | |

-continued

| ITEM | ASS'Y | REFER. DESIG. | DESCRIP | PCKG |
|------|-------|---------------|---------|------|
|      | MECH  |               | BACKSTOP SLIDE ROD | |
| 31 | OPT/MECH | | CAMERA PINHOLE | |
| 32 | OPT/MECH | | CAMERA PINHOLE RETAINER | |
| 33 | OPT/MECH | | SCREW, SOC HD. #6-32 × 5/8 | |
| 34 | OPT/MECH | | DOWEL PIN, 1/8 × 5/8 LG. | |
| 35 | OPT/MECH | | CLAMP BALL | |
| 36 | OPT/MECH | | CLAMP PINS | |
| 37 | OPT/MECH | | PIN SOCKETS | |
| 38 | OPT/MECH | | PEN PINS | |
| 39 | OPT/MECH | | PRISM | |
| 40 | OPT/MECH | | VELLUM | |
| 41 | OPT/MECH | | LED PCB ASSY | |
| 42 | OPT/MECH | | SOC HD. #4-40 × 5/8 | |
| 43 | OPT/MECH | | SPACER | |
| 44 | OPT/MECH | | CAMERA PCB ASSY | |
| 45 | OPT/MECH | | SPACER | |
| 46 | OPT/MECH | | SCREW, SOC HD. #4-40 × 1 1/8 | |
| 47 | OPT/MECH | | FLAT HD. #4-40 × 3/8 | |
| 1 | MECH | | BASE | |
| 2 | MECH | | TOP PLATE | |
| 3 | MECH | | SWITCH, VANITY COVER | |
| 4 | MECH | | EXTRUSION | |
| 5 | MECH | | SPINE | |
| 6 | MECH | | TOP ROD | |
| 7 | MECH | | BOTTOM VANITY ROD | |
| 8 | MECH | | TOP ROD SPACER | |
| 9 | MECH | | TOP CAP | |
| 10 | MECH | | BOTTOM SKIN | |
| 11 | MECH | | MEASURE BUTTON | |
| 12 | MECH | | LENS COVER | |
| 13 | MECH | | LENS STOP | |
| 14 | MECH | | REST BAR | |
| 15 | MECH | | INK CASE, ASSY | |
| 16 | MECH | | TOP SKIN | |
| 17 | MECH | | TRAP DOOR | |
| 18 | MECH | | INK CASE, SPRING | |
| 19 | MECH | | CLIP SCREW, SOCKET HD #6-31 × .375 | |
| 20 | MECH | | SCREW, PAN HD. #6-32 × .250 | |
| 21 | MECH | | SCREW, SOCKET HD #6-32 × .750 | |
| 22 | MECH | | SCREW, SOCKET HD. #6-32 × .500 | |
| 23 | MECH | | SCREW, SOCKET HD. #2-56 × .375 | |
| 24 | MECH | | SCREW, FLAT HD. #6-32 × .375 | |
| 25 | MECH | | SCREW FLAT HD. #4-40 × .250 | |
| 26 | MECH | | SCREW, SOCKET HD. #4-40 × .750 | |
| 27 | MECH | | SCREW, PAN HD. #2-56 × .094 | |
| 28 | MECH | | CLIP NUT | |
| 29 | MECH | | SCREW, SET #4-40 × .094 | |
| 30 | MECH | | SCREW, FLAT HD. #4-40 × .375 | |
| 31 | MECH | | MARKING PADDLE | |
| 32 | MECH | | PADDLE BAR | |
| 33 | MECH | | LEVER CATCH | |
| 34 | MECH | | CLAMPING PADDLE | |
| 35 | MECH | | CLP RCL BUTTON | |

What is claimed is:

1. A lensometer for measuring refractive power parameters of an eyeglass or contact lens including spherical refractive power, cylindrical refractive power, and prism power, comprising:
   means for holding the lens in a fixed position relative to an axis;
   means for projecting a pattern of light sources generally along the axis through the lens from a first distance relative to the lens, and through the lens from a second distance relative to the lens;
   means for capturing images of the pattern of lights projected from the first and second distances; and
   means for analyzing the images and deriving the refractive parameters from a comparison of the images.

2. The lensometer of claim 1 further comprising a frame means including a base, an extension connected to the base, means for holding the lens, and a camera means.

3. The lensometer of claim 1 wherein the means for holding the lens includes releasable means for releasably holding the lens.

4. The lensometer of claim 1 wherein the means for projecting includes an array of light sources arranged in a geometric pattern.

5. The lensometer of claim 4 further comprising first and second arrays of light sources.

6. The lensometer of claim 5 wherein the projected light sources are associated with a beam splitter which projects the sources along a common axis but where the distance of travel of each array of light sources differs a known distance.

7. The lensometer of claim 1 wherein the means for capturing the images includes a camera means.

8. The lensometer of claim 7 wherein the camera means includes a lens, a telecentric aperture stop, and a CCD means.

9. The lensometer of claim 1 wherein the means for analyzing the images comprises an image processing means and a processor means.

10. The lensometer of claim 1 further comprising a support means which is translatable with respect to the means for holding.

11. The lensometer of claim 1 further comprising a marker means which is translatable with regard to the means for holding to impose a mark on the lens.

12. The lensometer of claim 1 further comprising a display means for displaying the refractive power parameters obtained by the lensometer.

13. The lensometer of claim 1 further comprising a power source to provide electrical power to the lensometer.

14. The lensometer of claim 1 further comprising a housing means to fix the means for holding the lens a known distance from the means for projecting a pattern of lights, and to align the means for projecting a pattern of lights, the means for holding lens, and the means for capturing the images generally along an axis.

15. An automated lensometer for the measurement of properties of optical lenses for glasses and contacts comprising:
a base means for positioning the lensometer means on a surface;
an upwardly extending arm means connected to the base means;
a camera means mounted to the arm means;
a projector means mounted to the arm means between the base means and the camera means;
a lens holding means associated with the arm means and located between the projector means and camera means, which are aligned along an axis;
the lens holding means releasably holding the lens along the axis;
the projector means including first and second arrays of light source means, each light source means located a fixed but different distance from a lens held in the lens holding means; and
processor means for measuring properties of the lens from differences in images from the light source means.

16. The lensometer of claim 15 wherein the base means includes a bottom side with support portions capable of placement of the base on a surface comprising a table top.

17. The lensometer of claim 15 wherein the base includes a control panel means and display means.

18. The lensometer of claim 15 wherein the arm means extends no more than approximately three feet vertically.

19. The lensometer of claim 15 wherein the arm means includes adjustment means for adjusting the relationship between the projector means, the camera means, and the base means.

20. The lensometer of claim 15 wherein the camera means includes a lens, telecentric aperture stop, and an imaging CCD means.

21. The lensometer of claim 15 wherein the projector means includes multiple light sources, pin holes, and an optic system to project multiple light sources along the axis.

22. The lensometer of claim 21 wherein the optic system includes one or more beam splitters.

23. The lensometer of claim 15 wherein the lens holding means is translatable with respect to the projector means.

24. The lensometer of claim 15 wherein the processor means includes a storage means, a discerning means for determining the center of mass of each captured light source; a calculating means to calculate the geometric center of the captured array of light sources; and a comparing means for comparing the arrays captured by camera means.

25. The lensometer of claim 15 wherein the processor means includes a storage means, means to determine the optical center of the lens, means to indicate the direction to move the lens to reach its optical center along the axis.

26. A method of measuring optical properties of eyeglass and contact lenses comprising:
positioning a lens along an axis;
positioning the optical center of the lens along the axis;
projecting a geometric pattern of light sources through the lens along the axle;
capturing the geometric pattern and recording the pattern;
determining the geometric center of each light source and the relationship of each geometric center to one another;
storing that information in a storage means;
projecting a second pattern of light sources through lens, but along a different and longer optical path from the first projected array of light sources;
capturing the second projected geometric pattern of light sources;
determining the geometric center of each light source and with respect to one another;
storing that information in a storage means;
comparing the stored information of both projected geometric patterns, calculating the distance between geometric centers of corresponding light spots; and
computing the optical properties of the lens from the comparison.

* * * * *